United States Patent [19]

Hayashi et al.

[11] Patent Number: 5,148,023
[45] Date of Patent: Sep. 15, 1992

[54] ULTRAVIOLET RAY MEASURING APPARATUS FOR PREDICTING SUNBURN LEVEL AND FOR OBTAINING SPF VALUES OF COSMETICS

[75] Inventors: Mutsumi Hayashi, Otsu; Ryoji Takamura, Shiga; Chikayasu Yamazaki, Otsu; Minoru Ueda; Ichiro Kumo, both of Shiga, all of Japan

[73] Assignee: Toray Industries, Inc., Tokyo, Japan

[21] Appl. No.: 506,240

[22] Filed: Apr. 9, 1990

[30] Foreign Application Priority Data

Apr. 12, 1989 [JP] Japan .................. 1-42601[U]

[51] Int. Cl.$^5$ ................................. G01J 1/42
[52] U.S. Cl. ......................................... 250/372
[58] Field of Search ........................... 250/372

[56] References Cited

U.S. PATENT DOCUMENTS

| | | | |
|---|---|---|---|
| 4,010,372 | 3/1977 | Adler et al. | 250/372 |
| 4,372,680 | 2/1983 | Adams et al. | 356/51 |
| 4,428,050 | 1/1984 | Pellegrino et al. | 364/414 |
| 4,535,244 | 8/1985 | Burnham | 250/372 |
| 4,962,910 | 10/1990 | Shimizu | 250/372 |
| 4,985,632 | 1/1991 | Bianco et al. | 250/372 |

FOREIGN PATENT DOCUMENTS

| | | | |
|---|---|---|---|
| 2352817 | 4/1975 | Fed. Rep. of Germany | 250/372 |
| 0070430 | 6/1981 | Japan | 250/372 |
| 8621719 | 4/1987 | United Kingdom | 250/372 |

Primary Examiner—Carolyn E. Fields
Assistant Examiner—James Beyer
Attorney, Agent, or Firm—Birch, Stewart, Kolasch & Birch

[57] ABSTRACT

An ultraviolet ray measuring apparatus is provided which comprises first and second photodiodes having substantially the same spectral sensitivity at least in an ultraviolet band, and a first optical filter arranged in front of a light-receiving face of the second photodiode, for shielding only light of at least a part of the ultraviolet band. The apparatus measures the light intensity and its accumulated value in accordance with the difference between electric signals output from the first and second photodiodes. It is preferable that a second optical filter, which has a main transmitting band in the ultraviolet band and a sub-transmitting band in the visible light range, be arranged in front of the light-receiving faces of the first and second photodiode. A multi-step bar graph display device displays indices, such as an MED multiple value and an SPF value, which represent the measured light intensity and accumulated value in association with a reference MED value, so that this apparatus can suitably serve as a sunburn monitor.

15 Claims, 41 Drawing Sheets

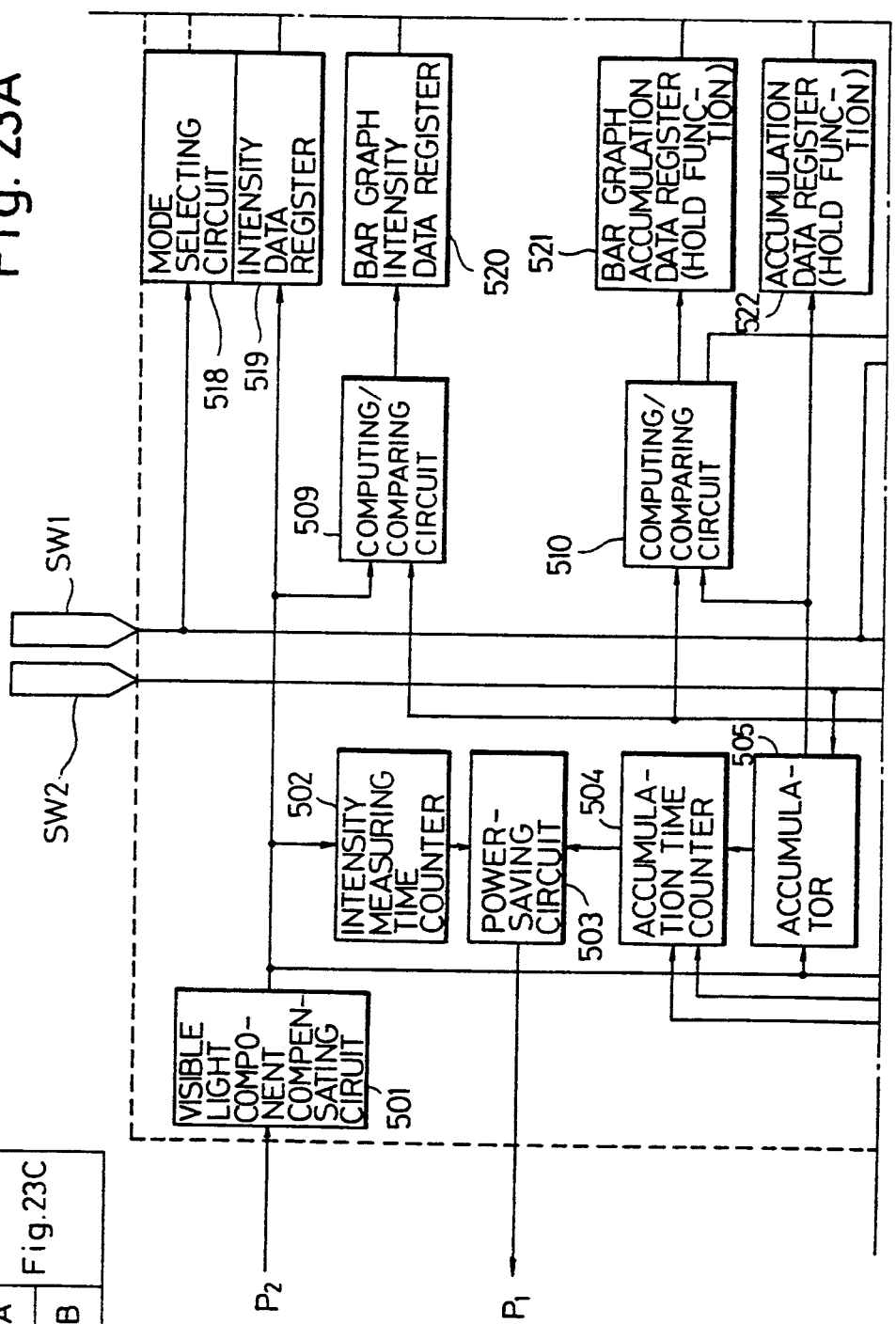

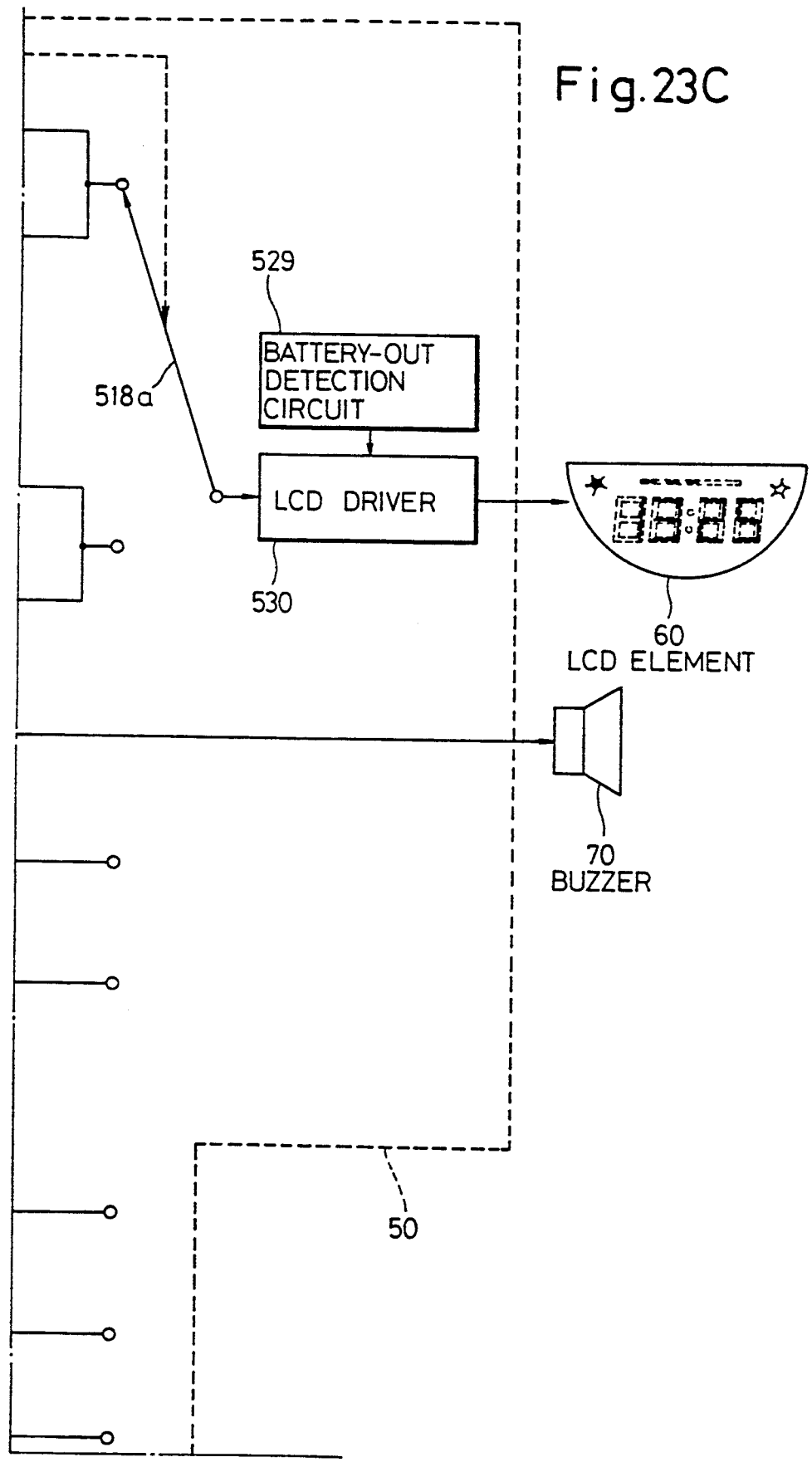

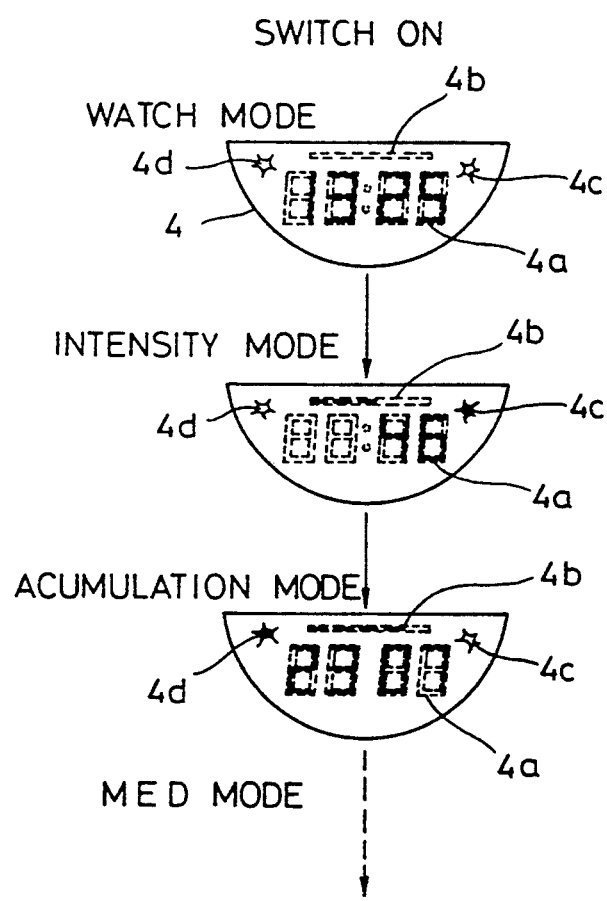

Fig. 28

| | LIGHT INTENSITY (W/m²) | | | | | | | |
|---|---|---|---|---|---|---|---|---|
| | A | B | C | D | --- | --- | | |
| SKIN TYPE 1 | | | | | | | | |
| 2 | | | | | | | | |
| 3 | | | | | | | | |
| 4 | | | | | | | | |
| ⋮ | | | | | | | | |
| ⋮ | | | | | | | | |
| | | | | | | | | |

Fig. 31

| | ACCUMULATED LIGHT INTENSITY (KJ/m²) | | | | | | | |
|---|---|---|---|---|---|---|---|---|
| | J | K | L | M | --- | --- | | |
| SKIN TYPE 1 | | | | | | | | |
| 2 | | | | | | | | |
| 3 | | | | | | | | |
| 4 | | | | | | | | |
| ⋮ | | | | | | | | |
| ⋮ | | | | | | | | |
| | | | | | | | | |

| Fig. 35A | Fig. 35B |

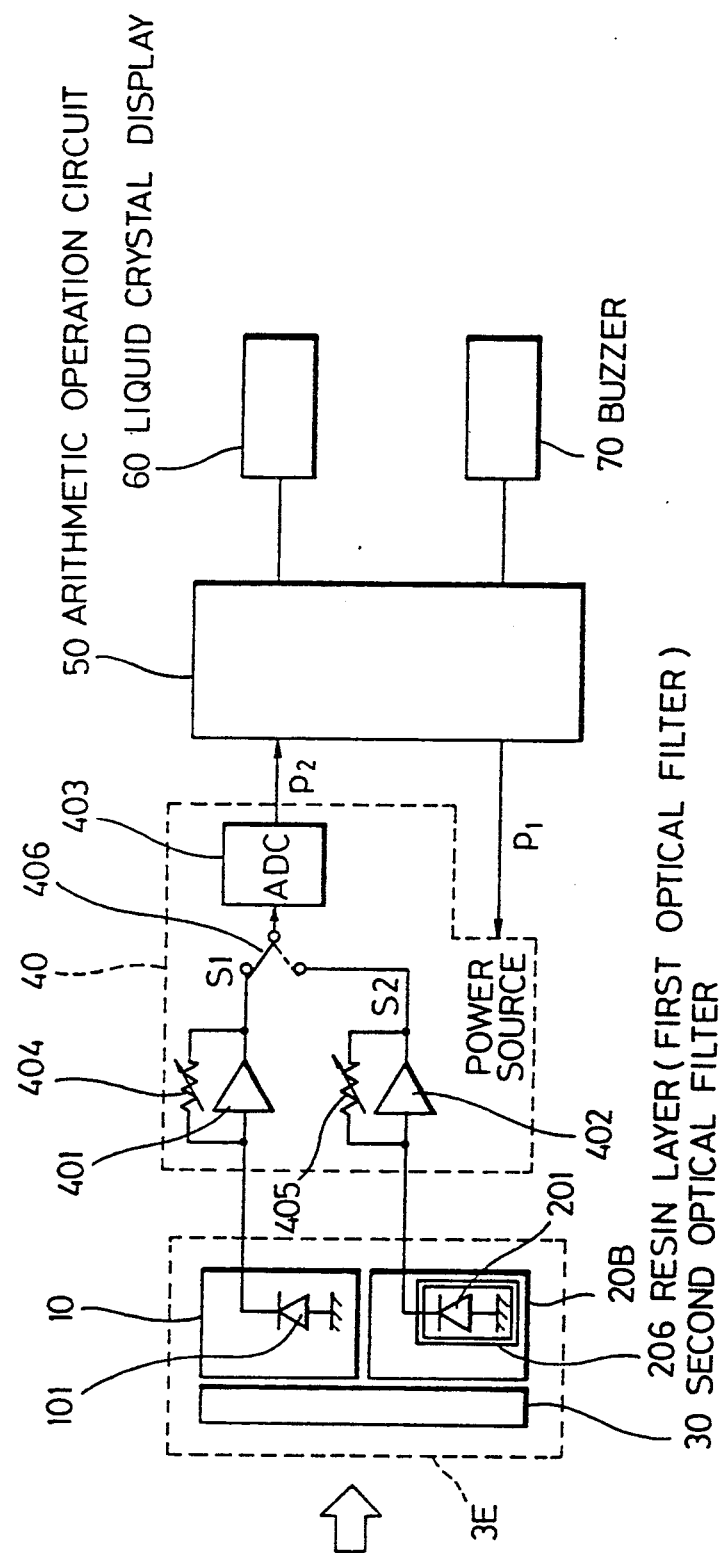

ULTRAVIOLET RAY MEASURING APPARATUS FOR PREDICTING SUNBURN LEVEL AND FOR OBTAINING SPF VALUES OF COSMETICS

BACKGROUND OF THE INVENTION

1. Field of the Invention

The present invention relates to a small-sized, portable ultraviolet ray measuring apparatus suitable for a so-called sunburn monitor which can measure, at high accuracy, the light intensity of an ultraviolet band of sunlight and the amount of irradiation obtained by accumulating the intensity as the time proceeds, and can inform a user of sunburn before his or her skin gets inflamed.

2. Description of the Related Art

The skin, when bathed in the sun for a long period of time, is inflamed due to the light (ultraviolet rays) of an ultraviolet band included in the sunlight. The degree of the skin inflammation depends on the amount of irradiated ultraviolet rays. This amount of irradiated ultraviolet rays is defined as a product of the intensity of ultraviolet rays (watt/m$^2$) and the irradiation time (seconds) and is expressed in the unit of Joul/m$^2$.

There are various ways to express the amount of irradiated ultraviolet rays; MED (Minimum Erythema Dose) and SPF (Sun Protection Factor) are used as a skin-related index.

Of these indexes, the MED is defined by the minimum amount of irradiated ultraviolet rays required to cause "slight erythema" when ultraviolet rays are irradiated on a plurality of portions on the skin while changing the amount of irradiation. In other words, the MED is a reference for a threshold value to predict the beginning of sunburn.

The MED is said to take specific values for different skins, such as for different races or different skin types; for example, the average MED for Japanese people is said to fall within a range of approximately 40 to 100 kJ/m$^2$.

The SPF, on the other hand, is an index to indicate how many times greater the MED becomes when a sun screen is coated on the skin. In other words, it is an index to indicate how many times the amount of irradiated ultraviolet rays are prevented by the use of the sun screen, as compared with when no sun screen is used.

Therefore, the SPF and MED have the relation expressed by the following equation:

$$SPF = \frac{MED \text{ when the sun screen is coated}}{MED \text{ when no sun screen is coated}}.$$

A conventional apparatus for quantitatively measuring the light of an ultraviolet band in the sunlight comprises a silicon photodiode having a spectral sensitivity in the ultraviolet band and an ultraviolet-ray transmitting/visible-ray absorbing type glass filter provided on the light-receiving face of this photodiode for canceling the spectral sensitivity in other bands except the ultraviolet band of the silicon photodiode. However, the glass filter has a sub-transmitting band near the wavelength range of 650 to 1000 nm and the spectral sensitivity of the silicon photodiode extends to the infrared band. This conventional apparatus, therefore, has a spectral sensitivity not only in the ultraviolet band but also in the near infrared band, thus providing a lower measuring accuracy. Since the light transmittance of the ultraviolet-ray transmitting/visible-ray absorbing type glass filter varies when ultraviolet rays are irradiated for a long period of time, the measuring accuracy or sensitivity varies with time.

A solution to the above shortcomings is proposed in Japanese Laid-Open Patent Publication No. 60-178321; in which the silicon photodiode in the aforementioned apparatus is replaced with a gallium-arsenic-phosphorus photodiode having no spectral sensitivity in the wavelength of 680 nm or above. However, the gallium-arsenic-phosphorus photodiode has a very low spectral sensitivity, under ⅓ of that of the silicon photodiode, in the ultraviolet band of the wavelength of 390 nm or below, and its spectral sensitivity would be further lowered by a combination of the gallium-arsenic-phosphorus photodiode with an ultraviolet-ray transmitting/visible-ray absorbing glass filter. The proposed apparatus, therefore, has a lower sensitivity.

Further, there is a demand of users for a function that provides an at-a-glance visual confirmation of the intensity of actually bathing light of the ultraviolet band and the amount of irradiation of already bathed light of the ultraviolet band in the form of, for example, a bar graph to take a proper action or measures to prevent the undesired sunburn, in addition to a numerical display of the light intensity of the ultraviolet band and an accumulated value of the light intensity (i.e., the amount of irradiated ultraviolet rays).

As mentioned earlier, the influence of the light intensity and the accumulated value of the light intensity on sunburn differs depending on the types of skins. More specifically, in a case where two persons, A and B, bathe in the same amount of ultraviolet rays of the same light intensity, A may get severely sunburned while B may not get sunburned so much.

In this respect, some people using this kind of ultraviolet ray measuring apparatus as a sunburn monitor want to know information as to what the value of the light intensity and the accumulated value of the light intensity measured by the apparatus mean to the sunburn state of their own skins. That is, people want to know if, the light intensity of the ultraviolet band and the accumulated value of the light intensity will excessively advance the sunburn and become dangerous to their type of skin. For instance, users want to know how much damage will be caused to their skins if they keep bathing in the bathing light of the ultraviolet band for a prescribed period of time, how many multiples of the standard MED value correspond to that amount of irradiated ultraviolet rays what SPF value the cosmetics they are using should have to prevent the sunburn due to such ultraviolet rays, etc. In other words, when the ultraviolet ray measuring apparatus is used as a sunburn monitor, some people desire that the light intensity to be measured and the accumulated value of the light intensity be directly displayed as the numerals representing how many times greater these values are as compared with the standard MED value for the type of the skin of the user, or that the SPF value be also displayed at the same time in association with the numerals.

OBJECTS AND SUMMARY OF THE INVENTION

Accordingly, it is an object of this invention to provide a small-sized, portable ultraviolet ray measuring apparatus which can measure the light intensity of the ultraviolet band of sunlight at high accuracy and high sensitivity, and can also measure the amount of irradiation (accumulated value of light intensity) by accumulating the measured light intensities.

It is another object of this invention to provide an ultraviolet ray measuring apparatus which can display the light intensity of the ultraviolet band of sunlight and the amount of irradiation directly as digital numerals or by multi-step display means, and can present various functions based on these data, such as a function to predict sunburn and a function to generate an alarm according to the degree of the actual sunburn, as a bar graph, for example.

According to this invention, there is provided an ultraviolet ray measuring apparatus comprising:

first photoelectric converting means having a first light-receiving face and a spectral sensitivity at least in an ultraviolet band of light received from the first light-receiving face, for outputting an electrical signal in accordance with an intensity of received light;

second photoelectric converting means having a second light-receiving face and substantially the same spectral sensitivity as the first photoelectric converting means, for outputting an electrical signal according to an intensity of received light;

first optical filter means, arranged in front of the second light-receiving face of the second photoelectric converting means, for shielding only light of at least a part of the ultraviolet band;

arithmetic operation means for computing at least a light intensity in accordance with a difference between the electrical signal values of the first and second photoelectric converting means; and display means for displaying a computation result from the arithmetic operation means.

Preferably, second optical filter means, which has a main transmitting band in the ultraviolet band and a sub-transmitting band on a longer wavelength side than the ultraviolet band, and can pass only the light having a wavelength of these main transmitting band and sub-transmitting band, is provided in front of the first and second light-receiving faces.

The arithmetic operation means may be designed to include accumulating means for accumulating computed light intensities for each lapse of a predetermined time and converting means for converting the computed light intensities into an index representing the relation between the degree of inflammation of a skin caused upon bathing light of the ultraviolet band and the amount of irradiated ultraviolet rays.

The display means displays not only the light intensity computed by the arithmetic operation means, but also the accumulated value of the light intensities accumulated by the accumulating means, an index value representing the correlation between an MED reference value and a value obtained by multiplying the computed value of the light intensity by a prescribed time coefficient, and an index value representing the correlation between the MED reference value and a value obtained by accumulating computed light intensities for each lapse of a predetermined time.

The display means may be constituted by a multi-step bar graph display means having a plurality of light-emittable segments so as to present a bar graph display of a computation result from the arithmetic operation means by lighting those segments which correspond to the computation result.

Preferably, a correlation table showing degrees of skin inflammation which is probably caused when the skin is bathed in light with this light intensity of the ultraviolet band or when the skin is bathed with this amount of irradiated ultraviolet rays in association with the types of skins and light intensities of the ultraviolet band or the types of skins and accumulated values of the light intensity of the ultraviolet band, may be provided, and information on the degree of skin inflammation is acquired from this correlation table based on the light intensity or the accumulated value of the light intensity, both displayed by the display means, and the type of a measurer's skin.

The above objects and other objects of the present invention as well as the features and advantages thereof will readily become obvious from the following description given with reference to the accompanying drawings.

BRIEF DESCRIPTION OF THE DRAWINGS

FIGS. 23A to 23C, constituting FIG. 23, are circuit diagrams illustrating the internal structure of an arithmetic operation circuit section 50 shown in FIG. 5;

FIGS. 24A through 24C are diagrams illustrating operation procedures for switching modes;

FIG. 28 is a diagram showing a correlation table for providing the degree of skin inflammation from the light intensity and the skin type;

FIG. 51 is a block diagram illustrating the arrangement of a modification of an ultraviolet ray measuring apparatus designed to increase the light-receiving angle.

DETAILED DESCRIPTION OF THE PREFERRED EMBODIMENT

Figure 1:
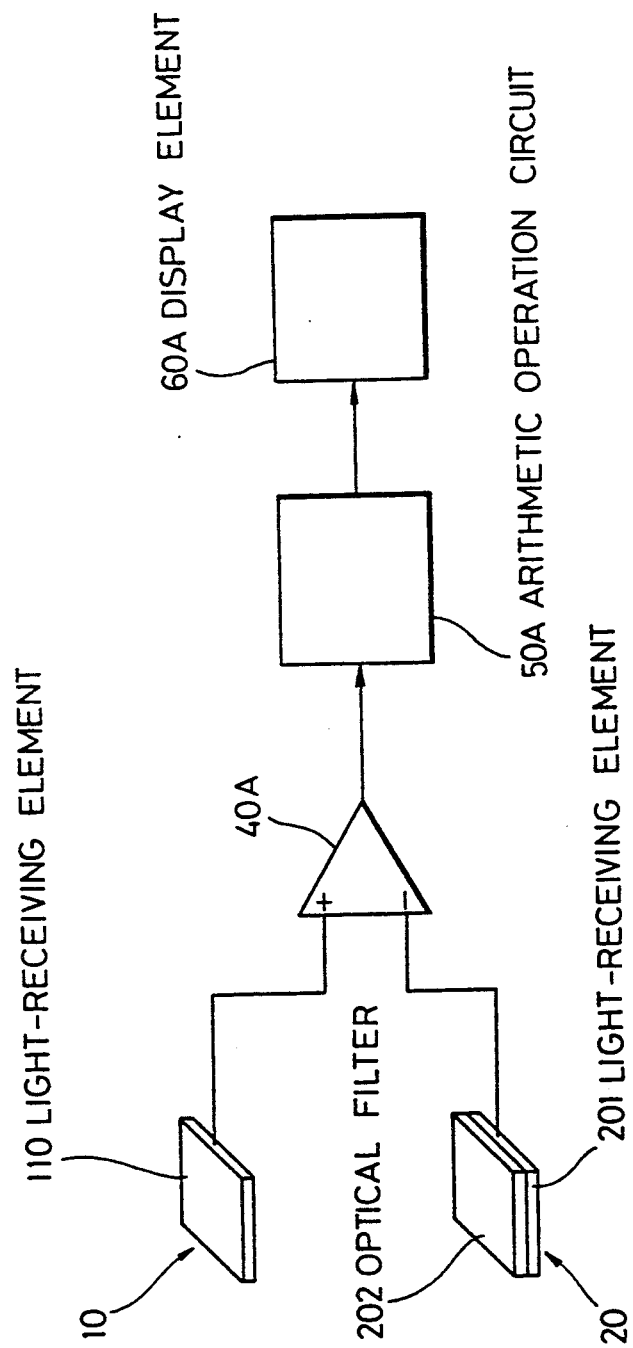
FIG. 1 is a block diagram illustrating the arrangement of an ultraviolet ray measuring apparatus of the first mode of the present invention.

The operational principle of an ultraviolet ray measuring apparatus of the present invention will be described below referring to FIGS. 1 through 4.

The present apparatus comprises two light receivers 10 and 20, the former on the measuring side and the latter on the referring side. The light receiver 10 comprises a light-receiving element 101, such as a silicon photodiode. The other light receiver 20 comprises a light-receiving element 201, such as a silicon photodiode, having the same spectral sensitivity as the one used in the light receiver 10, and an optical filter 202, such as a colored glass filter, disposed at the light-receiving face of the light-receiving element 201.

Figure 2:
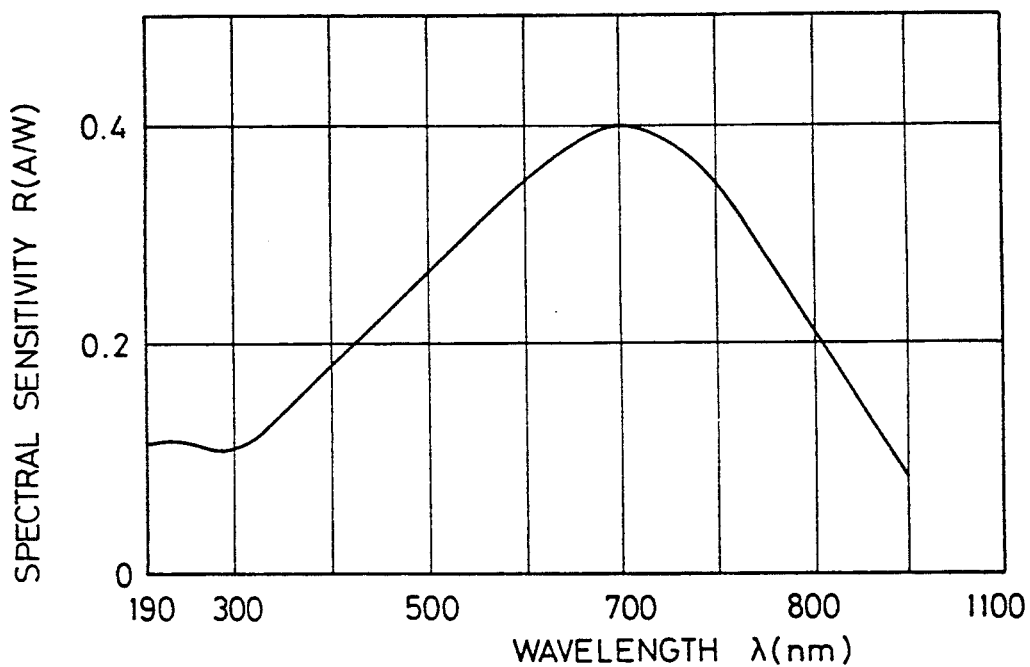
FIG. 2 is a graph illustrating the spectral sensitivities of light-receiving elements 101 and 201 shown in FIG. 1.
Figure 3:
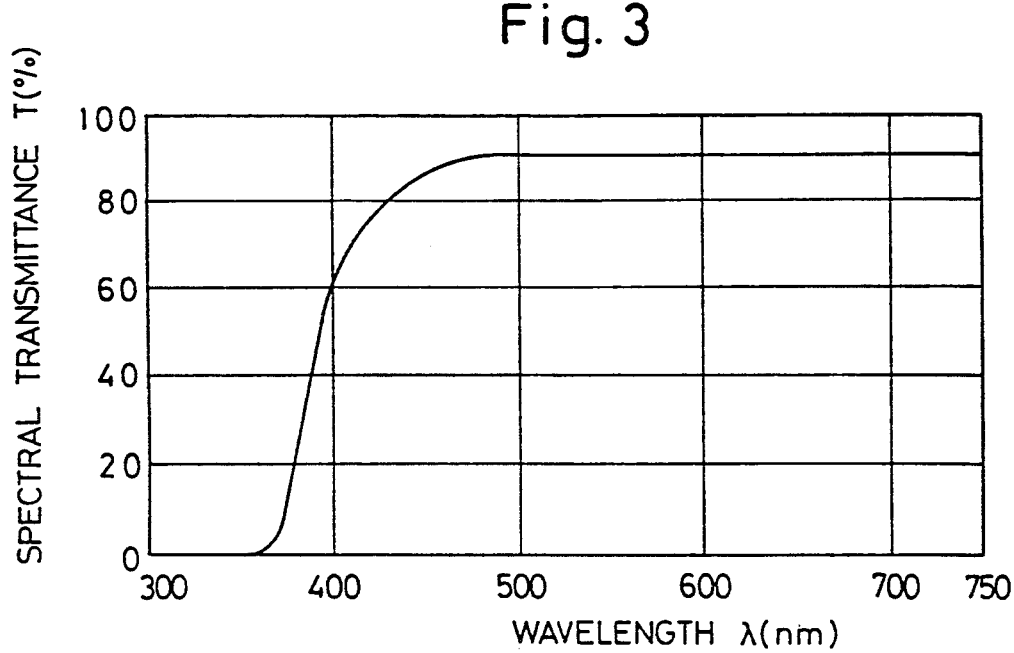
FIG. 3 is a graph illustrating the spectral transmittance of an optical filter 202 shown in FIG. 1.

The light-receiving elements used in the light receivers 10 and 20 have a spectral sensitivity not only in the ultraviolet band but also over a range extending from the ultraviolet band to an infrared band, as shown in FIG. 2 in which λ is a wavelength and R is a spectral sensitivity. In contrast, the optical filter 202 is generally a so-called sharp cut type colored glass filter which shields only the light of the ultraviolet band and passes light of other bands, as shown in FIG. 3 in which λ is likewise a wavelength and T is a spectral transmittance.

The light-receiving element 201 used in the light receiver 20 has the spectral sensitivity as shown in FIG.

Figure 4:
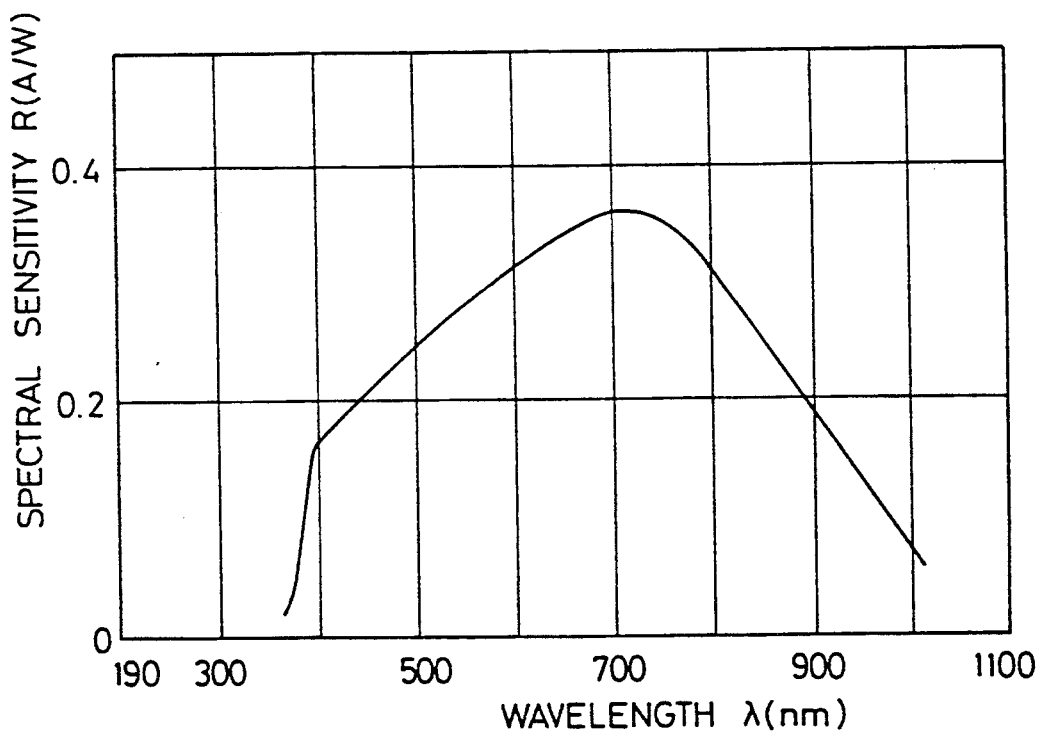
FIG. 4 is a graph illustrating the spectral sensitivity of a light receiver 20 on the referring side shown in FIG. 1.

2. Therefore, the spectral sensitivity of the light receiver 20 is given by the product of the spectral sensitivity of the light-receiving element 201 and the spectral transmittance of the optical filter 202 and is as shown in FIG. 4. It should be noted that in other bands than the ultraviolet band, the spectral sensitivity shown in FIG. 4 is slightly lower than, but substantially the same as, the spectral sensitivity of the light-receiving element shown in FIG. 2. This means that regarding the difference between the outputs of the light receiver on the measuring side and the light receiver on the referring side, the outputs of both light receivers based on the light in other bands than the ultraviolet band cancel each other and the output based only on the light of the ultraviolet band is obtained.

As described above, the difference between the outputs of the two light receivers is based only on the light of the ultraviolet band. From this difference, therefore, the light intensity of the ultraviolet band can be obtained by an arithmetic operation circuit 50A.

More specifically, referring to FIG. 1, a differential amplifier 40A is connected to the light receiver 10 constituted by the silicon photodiode 101, and the light receiver 20 in which the sharp cut type colored glass filter 202 that shields only the light of the ultraviolet band is arranged on the light-receiving face of the silicon photodiode 201, which is the same as the silicon photodiode 101. The differential amplifier 40A is connected to the arithmetic operation circuit 50A, which is connected to a liquid crystal display element 60A.

In using this ultraviolet ray measuring apparatus, the differential amplifier 40A is adjusted to zero output, with no light of the ultraviolet band hitting either the light receiver 10 or 20.

Then, when light enters the light receivers 10 and 20, the outputs of both light receivers cancel out each other for those of the light equally entering them which is of other bands than the ultraviolet band. As a consequence, the differential amplifier 40A provides an output which is based only on the light of the ultraviolet band entering the light receiver 10. Since this output corresponds to the light intensity of the ultraviolet band, the intensity is acquired through a computation done in the arithmetic operation circuit 50A and the obtained intensity is displayed on the liquid crystal display element 60A.

In this invention, it is possible to acquire an accumulated value of the light intensity by the arithmetic operation circuit 50A as well as to simply obtain the light intensity. The arithmetic operation circuit 50A can also be provided with an additional function to display the light intensity of the ultraviolet band and the its accumulated value, either digital or analog, or give an alarm in terms of sounds, colors, pictures, etc.

As the present ultraviolet ray measuring apparatus acquires the difference between the outputs of the light receiver on the measuring side and the light receiver on the referring side to eliminate the effect of light of other bands than the ultraviolet band, the measuring accuracy is significantly improved. Further, a silicon photodiode having an excellent sensitivity and being less expensive as compared with a gallium-arsenic-phosphorus photodiode can be used for the light-receiving elements, and the output is based only on the sensitivity of the light receiver on the measuring side without involving any optical filter which is a cause for light reduction and is accompanied with a change in spectral transmittance with time. This can not only improve the measuring accuracy and sensitivity, but also prevent the adverse influence of chronological change of the performance of the optical filter or the like.

The light intensity of the ultraviolet band can be measured at higher accuracy and higher sensitivity if a second optical filter having a main transmitting band in the ultraviolet band and a sub-transmitting band on the side of a longer wavelength than the ultraviolet band, is provided in front of the light receivers on the measuring and referring sides.

Figure 5:
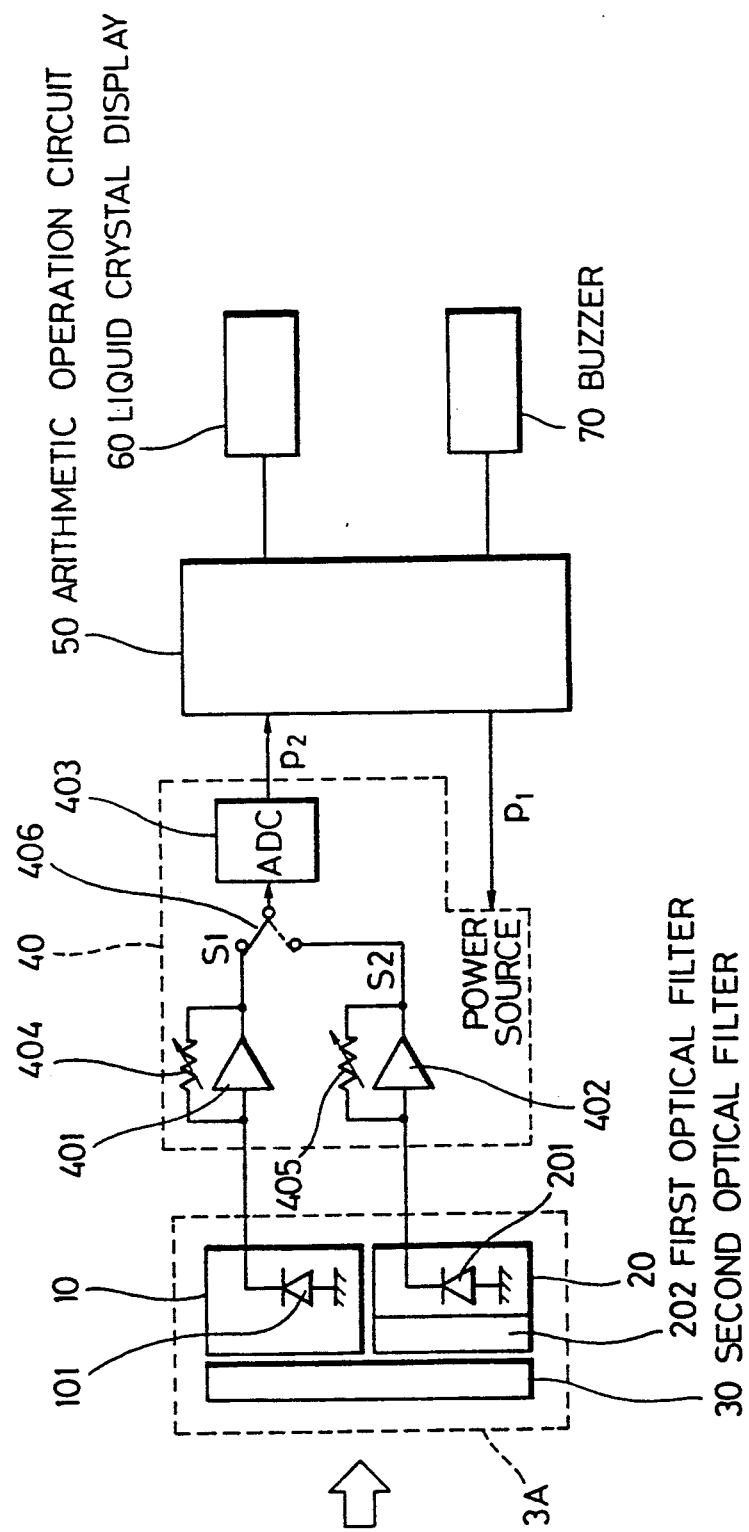
FIG. 5 is a block diagram illustrating the arrangement of an ultraviolet ray measuring apparatus of the second mode of the present invention.

FIG. 5 illustrates an ultraviolet ray measuring apparatus of the second mode which has the aforementioned second optical filter. This apparatus likewise comprises two light receivers 10 and 20, the former on the measuring side and the latter on the referring side. The light receiver 10 comprises a light-receiving element 101, such as a silicon photodiode. The other light receiver 20 comprises a light-receiving element 201, such as a silicon photodiode, having the same spectral sensitivity as the one used in the light receiver 10, and a first optical filter 202, such as a colored glass filter, disposed at the light-receiving face of the light-receiving element 201.

A second optical filter 30 is arranged at the light-receiving faces of these two light receivers, i.e., the light-receiving face of the light-receiving element 101 used in the light receiver 10 and that of the first optical filter 202.

The light-receiving elements 101 and 201 used in the light receivers 10 and 20 have a spectral sensitivity not only in the ultraviolet band but also over a range extending from the ultraviolet band to an infrared band, as shown in FIG. 2. The first optical filter 202 arranged at the light-receiving face of the light-receiving element 201 of the light receiver 20 is generally a so-called sharp cut type colored glass filter which shields only the light of the ultraviolet band and passes light of other bands, as shown in FIG. 3.

Figure 6:
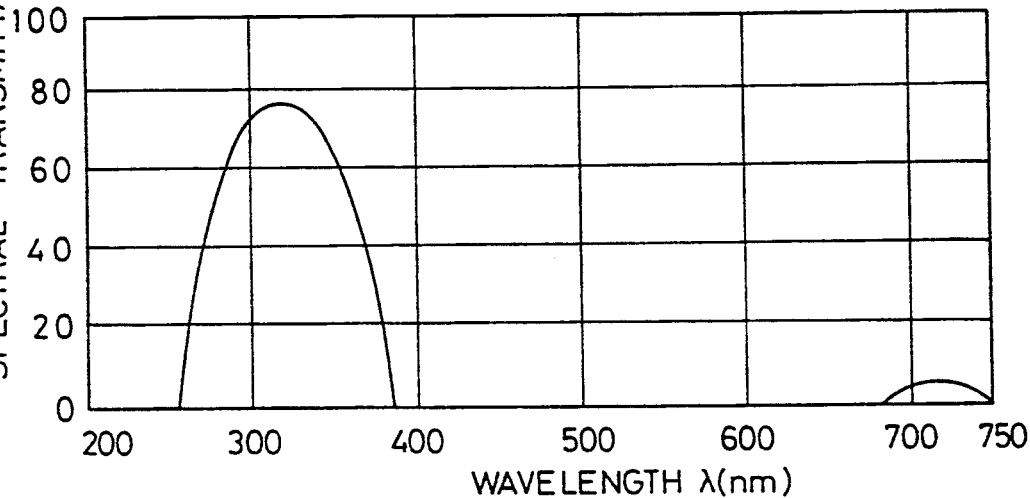
FIG. 6 is a graph illustrating the spectral transmittance of a second optical filter 30 shown in FIG. 5.

In contrast, the second optical filter 30 arranged commonly at the light-receiving faces of the two light receivers passes only light of the ultraviolet band and light of the sub-transmitting band in the wavelength range of from 650 to 1000 mm and shields the light of other bands as shown in FIG. 6. When sunlight penetrates the second optical filter 30 and enters the light receiver 10 on the measuring side, the output corresponding to the light of the sub-transmitting band is about 30% of the output corresponding to the light of the ultraviolet band (main transmitting band).

Figure 7:
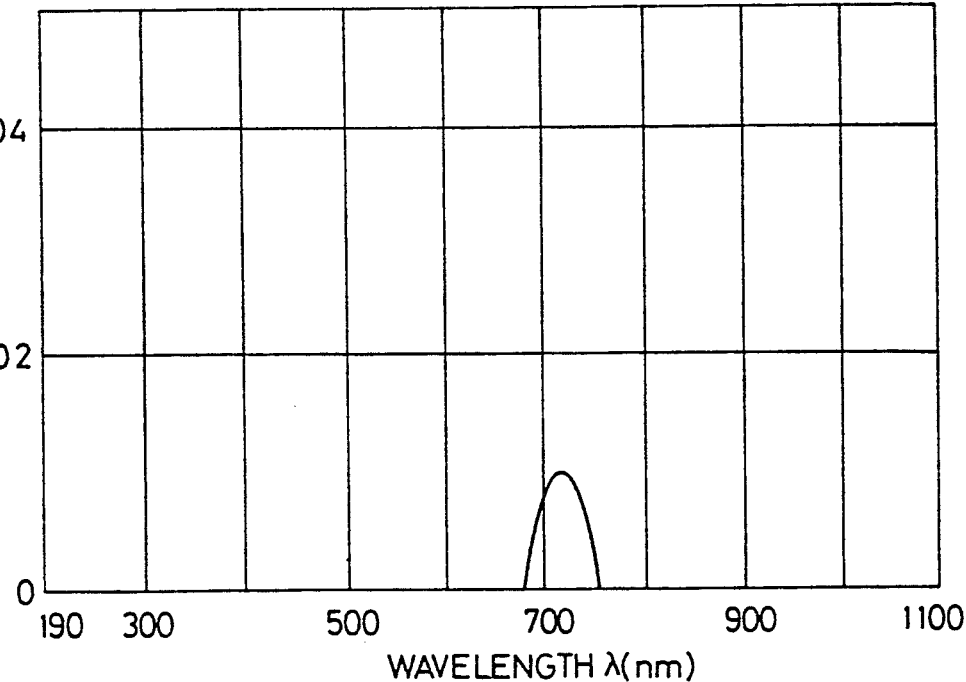
FIG. 7 is a graph illustrating the spectral sensitivity of a light receiver 20 on the referring side shown in FIG. 5.

In the light receiver 20, therefore, the second optical filter 30 selectively passes only the light of the profile shown in FIG. 6, or the light of the ultraviolet band and the light of the sub-transmitting band. Subsequently, only the light of the ultraviolet band is shielded by the first optical filter 202 arranged at the light-receiving face of the light-receiving element 201 while the light of the sub-transmitting band reaches the light-receiving element 201, passing through this first optical filter 202. Then, with regard to the light of the sub-transmitting band, the light receiver 20 outputs a signal corresponding to a spectral sensitivity given by the product of the spectral sensitivity of the light-receiving element 201 and the spectral transmittances of the first and second optical filters 202 and 30. The resultant spectral sensitivity would be as shown in FIG. 7.

Figure 8:
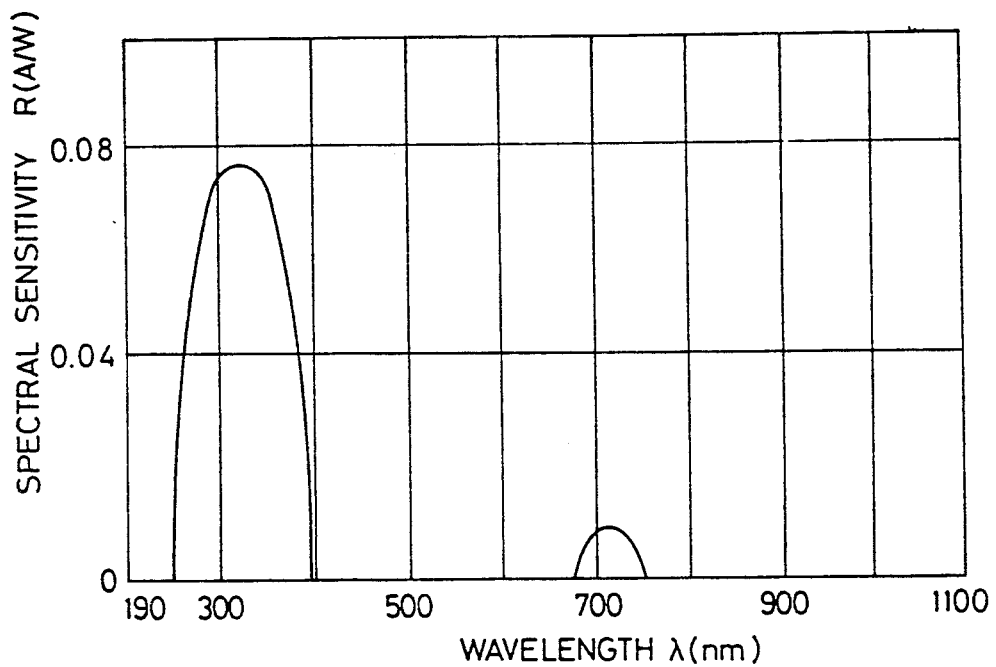
FIG. 8 is a graph illustrating the spectral sensitivity of a light receiver 10 on the measuring side shown in FIG. 5.

In the light receiver 10, on the other hand, the light of other bands than the ultraviolet band and the sub-transmitting band is shielded by the second optical filter 30 commonly arranged with the light receiver 20, and the light with the profile as shown in FIG. 6 reaches the light-receiving element 101. Then, the light receiver 10 outputs a signal corresponding to a spectral sensitivity given by the product of the spectral sensitivity of the light-receiving element 101 and the spectral transmittance of the second optical filter 30. The resultant spectral sensitivity would be as shown in FIG. 8.

Figure 9:
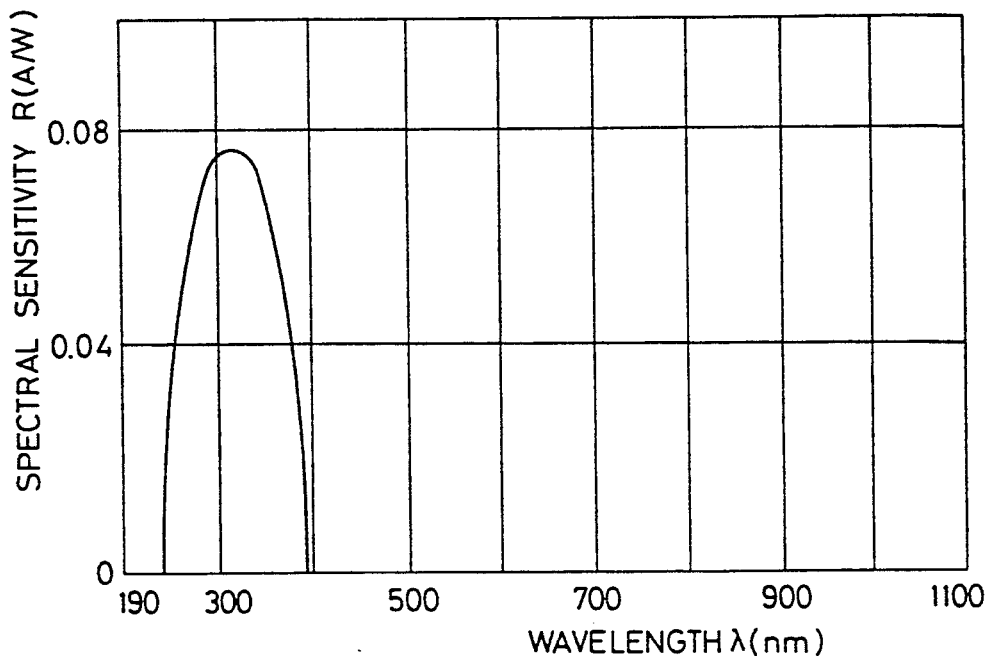
FIG. 9 is a graph illustrating the difference between the spectral sensitivities of the light receivers 10 and 20 shown in FIG. 5.

The difference between the outputs from the light receivers 10 and 20 is based only on the light of the ultraviolet band since the output based on the spectral sensitivity originated from the light of the sub-transmitting band is canceled. The difference at this time would be an output based on the spectral sensitivity as shown in FIG. 9.

In order to obtain the difference of the outputs of the light receivers, therefore, these outputs are amplified by an input circuit section 40 located at the subsequent stage, then are sent to the arithmetic operation circuit section 50 after A/D conversion to thereby provide the light intensity of the ultraviolet band. The light intensity is accumulated as the time proceeds, as will be described in detail later, and based on the values, various information about the light intensity of the ultraviolet band and its accumulated value are displayed on a liquid crystal display section 60.

With the ultraviolet ray measuring apparatus of the first and second modes placed under the sunlight to detect the light of the ultraviolet band whose intensity is 100 W/m², the visible light compensating accuracy would be as follows.

The light receiver 10 of the first mode apparatus shown in FIG. 1 provides an output corresponding to $$S_1 = 100 + 6400 = 6500 \ W/m^2$$

based on the light intensity of the ultraviolet band, 100 W/m², and the light intensity of other bands, 6400 W/m².

The light receiver 20 provides an output corresponding to $$S_2 = 6400 \ W/m^2$$

based only on the light intensity of other bands than the ultraviolet band, 6400 W/m². Accordingly, the differential amplifier 40A provides an output corresponding to $$S_1 - S_2 = 6500 - 6400 = 100 \ W/m^2$$

based only on the light of the ultraviolet band.

Assuming that the light detection accuracies of the individual light receivers 10 and 20 are ±1% of the full scale, then an error in measurement for both light receivers would be $$\pm (6500 \times 0.01) = \pm 65 \ W/m^2.$$

Therefore, the visible light compensating accuracy of the first mode apparatus is $$S_1 - S_2 = (6500 \pm 65) - (6400 \pm 65)$$
$$= 100 \pm 130 \ W/m^2.$$

That is, the measuring error of this apparatus is ±130%.

The visible light compensating accuracy of the second mode apparatus shown in FIG. 5 would be as follows.

As the output $S_1$ of the light receiver 10 is based on the light of the ultraviolet band and the light of the sub-transmitting band, it is $100 + 30 = 130$ W/m². The output $S_2$ of the light receiver 20 is 30 W/m² because it is based only on the light of the sub-transmitting band. Accordingly, the arithmetic operation circuit 50 provides an output corresponding to $$S_i - S_2 = 130 - 30 = 100 \ W/m^2$$

based only on the light of the ultraviolet band.

Assuming that the light detection accuracies of the individual light receivers 10 and 20 are ±1% of the full scale, as in the previous case in which an error in measurement for both light receivers is ±1% of 6500 W/m², the error in this case would be $$\pm (130 \times 0.01) = 1.3 \ W/m^2$$

due to the visible light component of other bands than the ultraviolet band being 30 W/m².

Therefore, the visible light compensating accuracy of the second mode apparatus is $$S_1 - S_2 = (130 \pm 1.3) - (30 \pm 1.3)$$
$$= 100 \pm 2.6 \ W/m^2.$$

That is, the measuring error of this apparatus is ±2.6%.

At the time of detecting light of the ultraviolet band of 100 W/m², therefore, the visible light compensating accuracy of the second mode apparatus, as compared with that of the first mode apparatus, is 130/2.6 which is approximately 50, i.e., about 50 times greater, which is significantly high.

The light of the ultraviolet band includes ultraviolet rays of a long wavelength of from 315 to 390 nm (hereinafter referred to as A wave), ultraviolet rays of an intermediate wavelength of from 280 to 315 nm (hereinafter referred to as B wave) and ultraviolet rays of a short wavelength of from 180 to 280 nm (hereinafter referred to as C wave).

The A wave is considered to be a cause for freckles and the like. As the B wave has a shorter wavelength than the A wave, it easily penetrates inside the skin and is thus a major component to advance sunburn of the skin, and is considered to cause keloid sunburn when people are exposed to a large amount of the B wave.

As the freckles are feared and disliked most by those women who care about cosmetic treatment, there is a strong demand for some means to measure the intensity of, and the amount of, the A wave component, a cause for freckles, so that they can select a cosmetic having the proper SPF value based on the measurement. There is also a demand for some means to selectively measure the intensity of, and the amount of, only the B wave of the light of the ultraviolet band.

Figure 10:
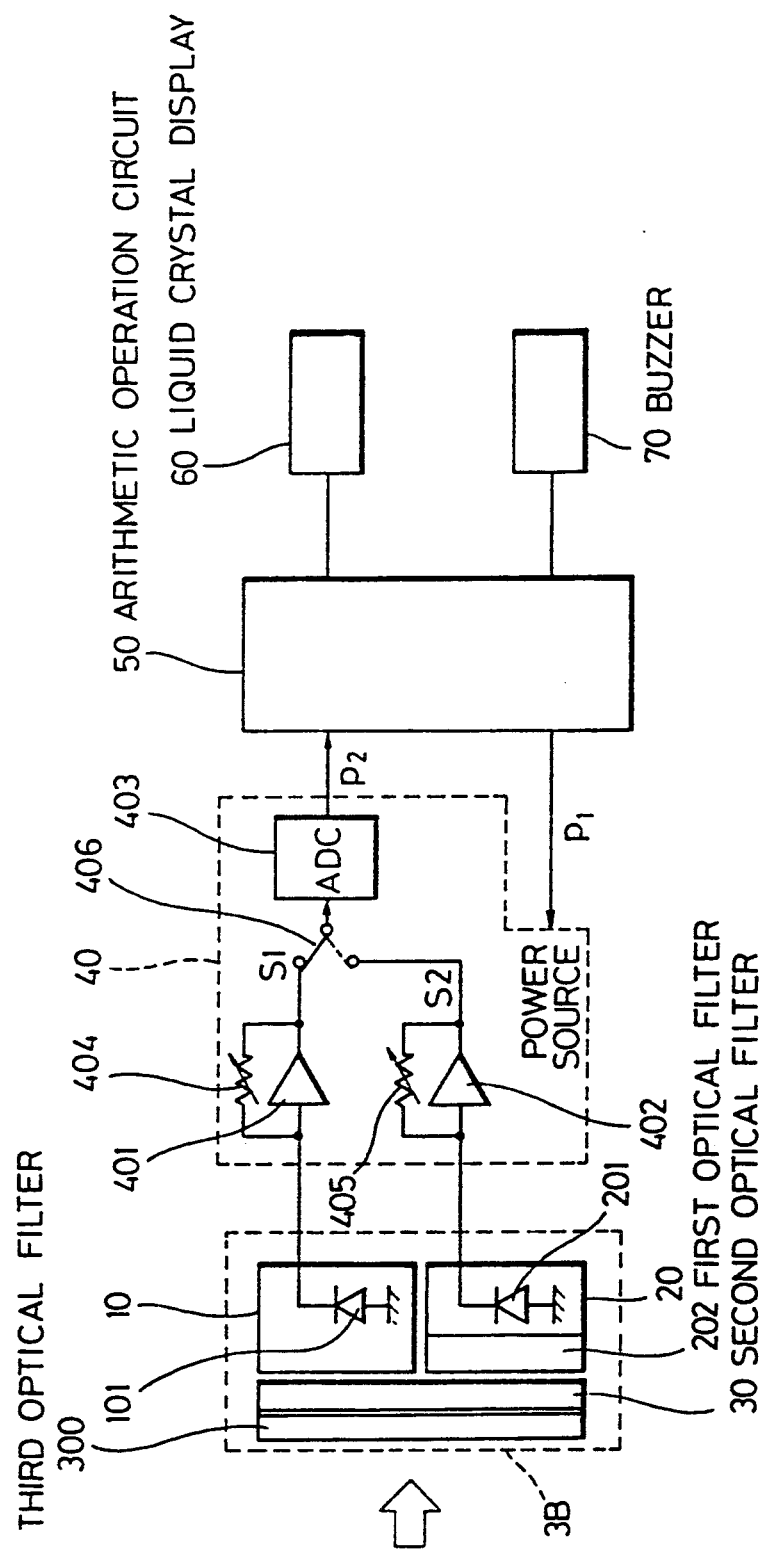
FIG. 10 is a block diagram illustrating the arrangement of an ultraviolet ray measuring apparatus of the third mode of the present invention.

FIG. 10 illustrates an ultraviolet ray measuring apparatus of the third mode, which selectively measures the intensity of only the A wave of the ultraviolet band in the sunlight at high accuracy and high sensitivity and accumulates the measured intensities to find the amount of irradiation.

This apparatus comprises a light-receiving circuit section 3B which has a third optical filter 300 detachably arranged at the light-receiving face of the second optical filter 30 of the second mode apparatus shown in FIG. 5. This third optical filter 300 shields the B and C waves and passes light of other bands.

The light-receiving elements 101 and 201 used in the light receivers 10 and 20, the first optical filter 202 arranged at the light-receiving face of the light-receiving element 201 of the light receiver 20, and the second optical filter 30 arranged commonly at the light-receiving faces of the two light receivers 10 and 20 have the characteristics as shown in FIGS. 2, 3 and 6 respectively.

Figure 11:
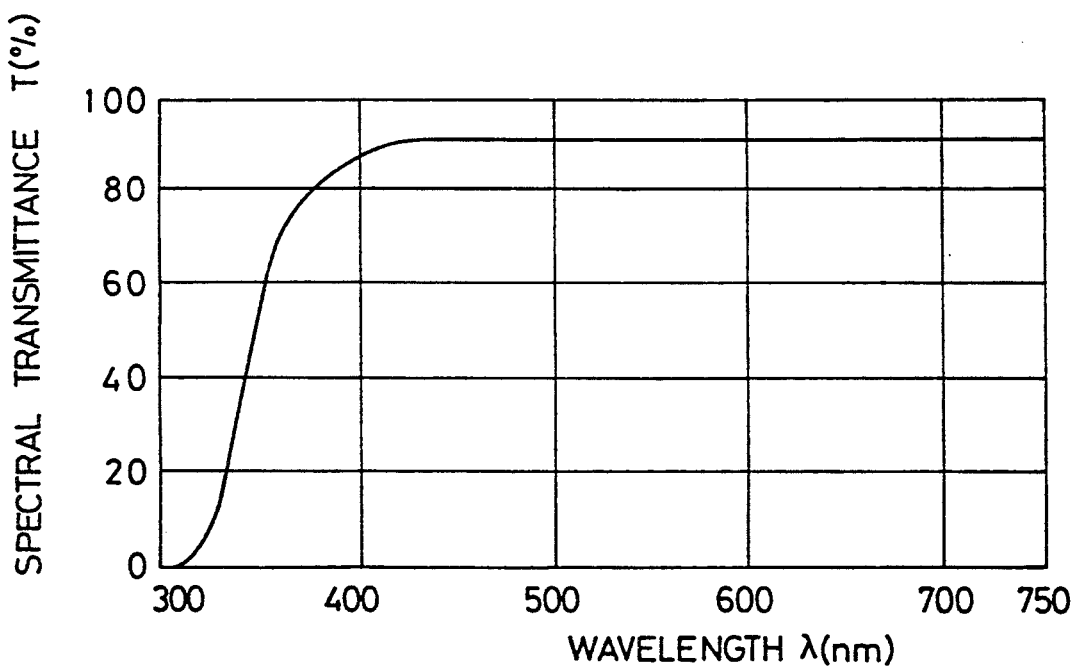
FIG. 11 is a graph illustrating the spectral transmittance of a third optical filter 300 shown in FIG. 10.

The third optical filter 300 arranged at the light-receiving face of the second optical filter 30 passes the A wave of light of the ultraviolet band and the light of visible light band, and shields only the light of a range corresponding to the B and C waves, as shown in FIG. 11.

Figure 12:
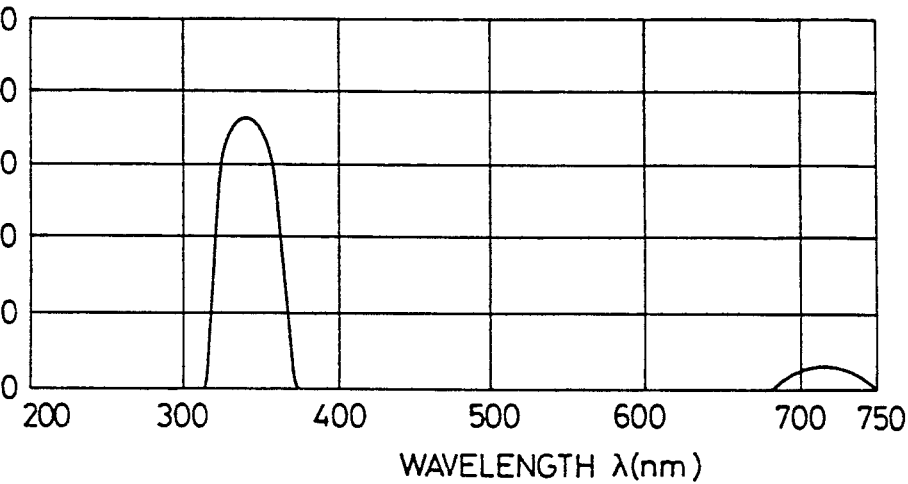
FIG. 12 is a graph illustrating a spectral transmittance obtained by multiplying the spectral transmittance of second optical filter 30 by that of third optical filter 300 shown in FIG. 10

In the light receiver 20 on the referring side, therefore, the third optical filter 300 shields the B and C waves and passes the A wave and all the light having a longer wavelength than the A wave, as shown in FIG. 11. Subsequently, all of the components of this light excluding the A wave and the light of the sub-transmitting band are shielded by the second optical filter 30. The only remaining components, the A wave and the light of the sub-transmitting band, reach the light-receiving face of the first optical filter 202, as shown in FIG. 12.

Finally, the first optical filter 202 shields the A wave and passes the light of the sub-transmitting band, which in turn reaches the light-receiving face of the light-receiving element 201.

Figure 13:
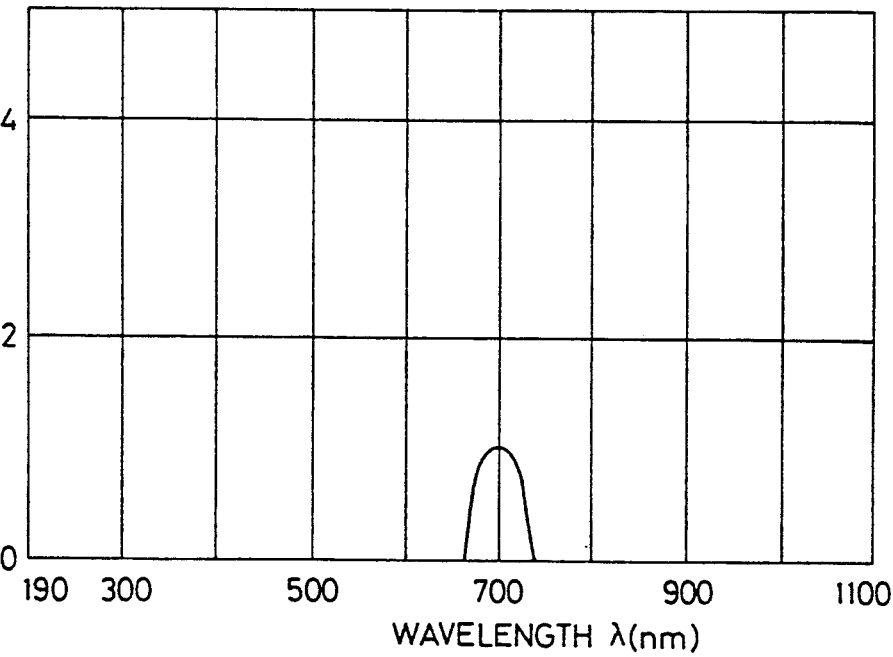
FIG. 13 is a graph illustrating the spectral sensitivity of a light receiver 20 on the referring side shown in FIG. 10.

As a result, with regard to the light of the sub-transmitting band, the light receiver 20 outputs a signal corresponding to a spectral sensitivity given by the product of the spectral sensitivity of the light-receiving element 201 and the spectral transmittances of the first through third optical filters 202, 30 and 300. The resultant spectral sensitivity would be as shown in FIG. 13.

In the light receiver 10, on the other hand, the B and C waves are shielded by the third optical filter 300, while the other light components including the A wave pass and the light as shown in FIG. 11 reaches the light-receiving face of the second optical filter 30. Then, the second optical filter 30 passes only the A wave and the light of the sub-transmitting band, which in turn reach the light-receiving face of the light-receiving element 101, as shown in FIG. 12.

Figure 14:
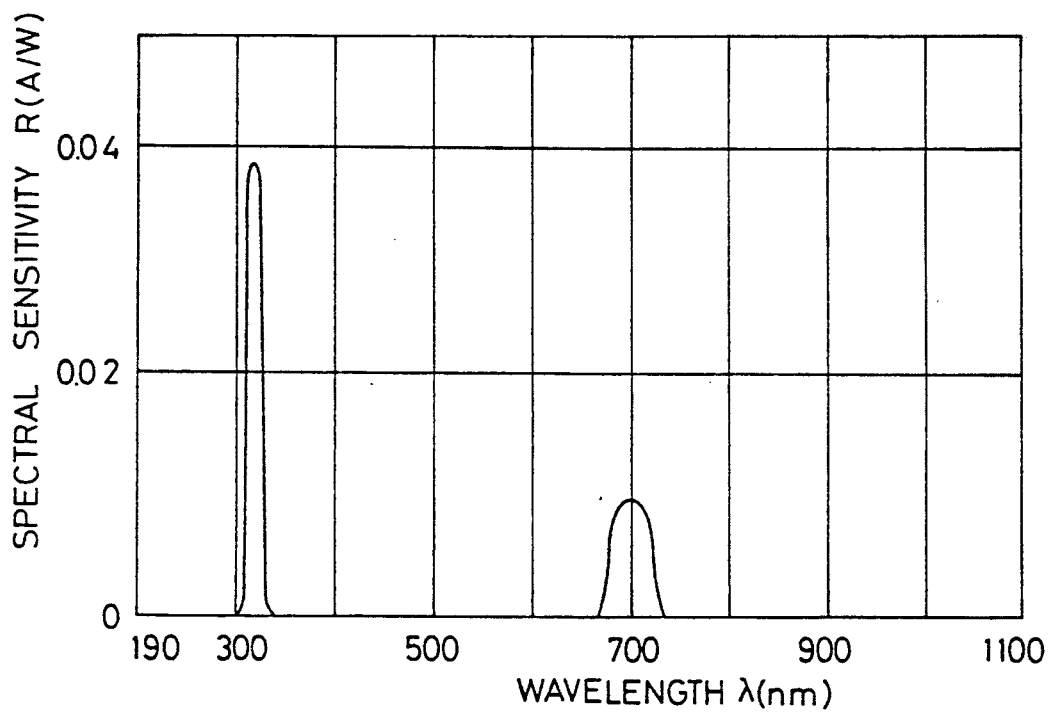
FIG. 14 is a graph illustrating the spectral sensitivity of a light receiver 10 on the measuring side shown in FIG. 10.

With regard to the A wave and the light of the sub-transmitting band, therefore, the light receiver 10 provides an output corresponding to a spectral sensitivity given by the product of the spectral sensitivity of the light-receiving element 101 and the spectral transmittances of the second and third optical filters 30 and 300. The resultant spectral sensitivity would be as shown in FIG. 14.

Figure 15:
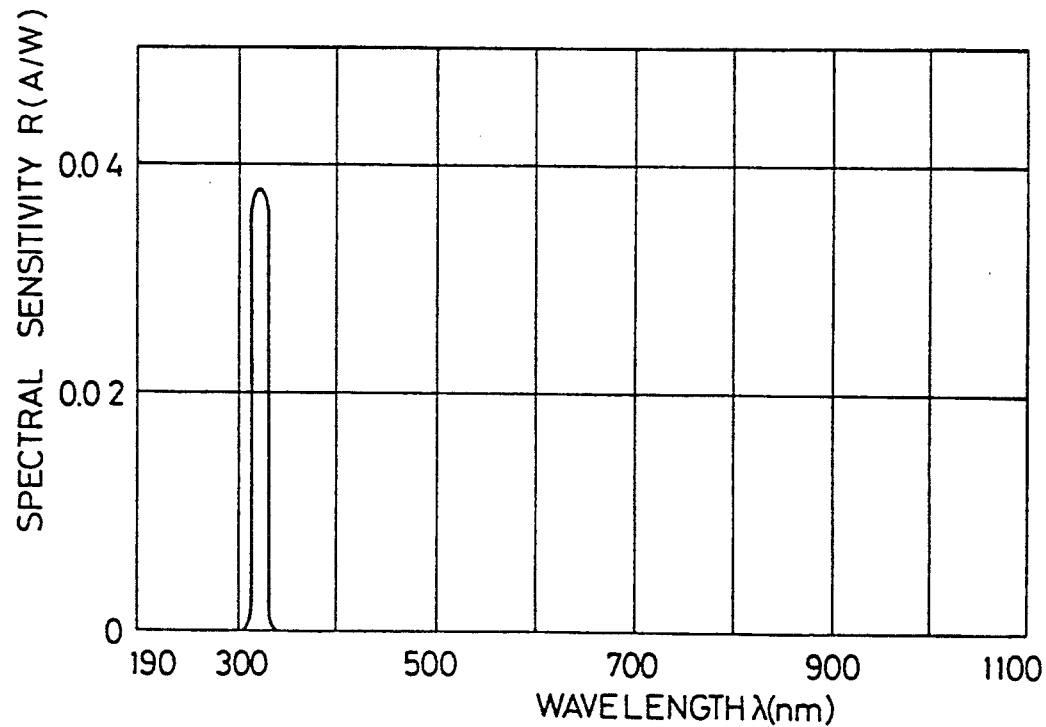
FIG. 15 is a graph illustrating the difference between the spectral sensitivities of the light receivers 10 and 20 shown in FIG. 10.

The difference between the outputs from the light receivers 10 and 20 is based only on the light component of the A wave since the output based on the spectral sensitivity originated from the light of the sub-transmitting band is canceled. The difference at this time is an output based on the spectral sensitivity associated with the A wave, as shown in FIG. 15.

In order to obtain the difference of the outputs of the light receivers, therefore, these outputs are amplified by an input circuit section 40 located at the subsequent stage, then are sent to the arithmetic operation circuit section 50 after A/D conversion to thereby provide the light intensity of the A wave band. The light intensity is accumulated as the time proceeds, and based on the values, various informations about the light intensity of the A wave band and its accumulated value are displayed on a liquid crystal display section 60, as in a preferred embodiment which will be described in detail later.

A colored glass filter, UV-32, manufactured by Hoya Corporation, which has such a spectral transmittance as shown in FIG. 11, is suitably used for the third optical filter 300. This third optical filter 300 can be detachably arranged to cover the light-receiving face of the second optical filter 30. When the filter 300 is mounted, it is possible to measure the intensity of only the A wave of the ultraviolet band, and the amount of its irradiation. With the filter 300 removed, it is possible to measure the intensity of, and the amount of irradiation of, the whole light of the ultraviolet band including the A, B and C waves.

Figure 16:
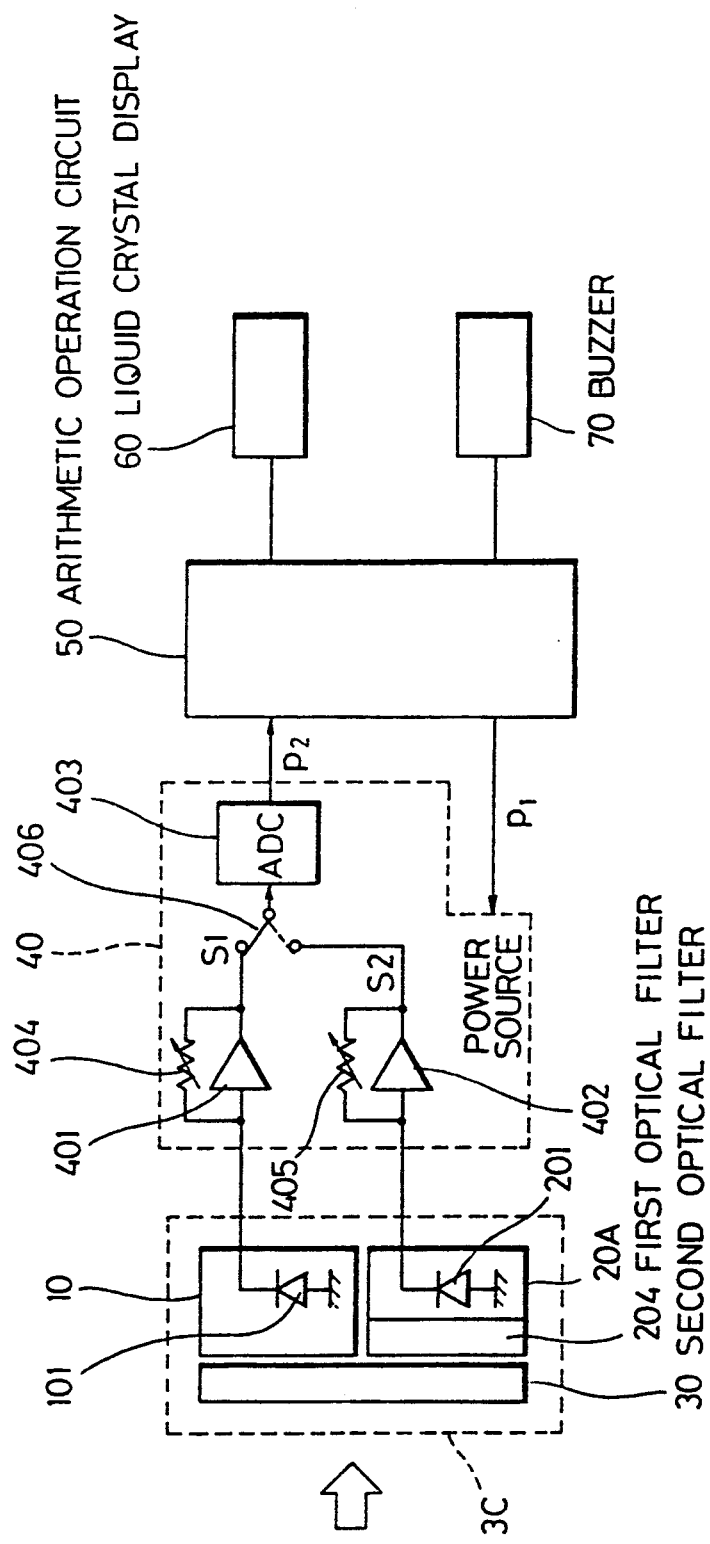
FIG. 16 is a block diagram illustrating the arrangement of an ultraviolet ray measuring apparatus of the fourth mode of the present invention.

FIG. 16 illustrates an ultraviolet ray measuring apparatus of the fourth mode of the present invention, which can measure the light intensity of the B wave in the sunlight. This apparatus includes a light-receiving circuit section 3C in which the first optical filter 202 of the light receiver 20 of the second mode apparatus shown in FIG. 5 is replaced with an optical filter 204, generally called a sharp-cut type colored glass filter, which shields only the B and C waves of the ultraviolet band and passes light of the other bands, as shown in FIG. 11. The other part of the section 3C is the same as that of the light-receiving circuit section of the second mode apparatus.

A colored glass filter, such as the aforementioned model UV-32, a product of Hoya Corporation, which shields the B and C waves, is suitably used for the first optical filter 204.

Figure 17:
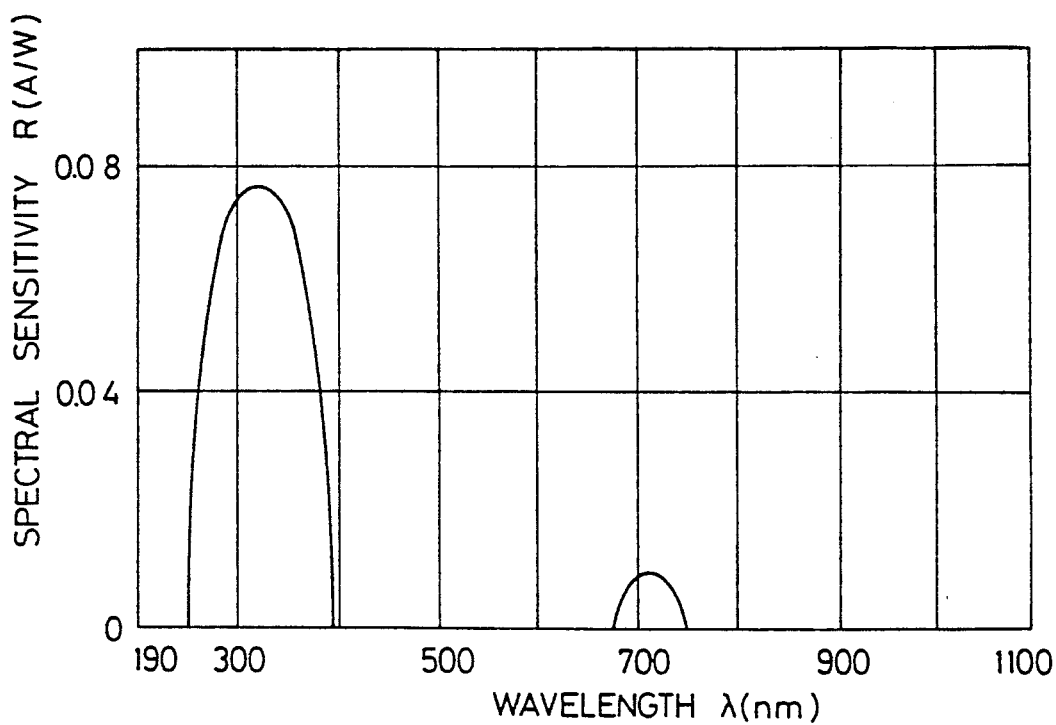
FIG. 17 is a graph illustrating the spectral sensitivity of a light receiver 20A on the referring side shown in FIG. 16.

In the light receiver 20A of the fourth mode apparatus, therefore, the second optical filter 30 selectively passes only the light of the profile shown in FIG. 6, or the light of the ultraviolet band and the light of the sub-transmitting band. Subsequently, only the light of the B and C waves is shielded by the first optical filter 204 arranged at the light-receiving face of the light-receiving element 201 of the light receiver 20A. The resultant light components are only the A wave and the light of the sub-transmitting band, which in turn reach the light-receiving element 201, passing through the first optical filter 204. Then, with regard to the the A wave and the light of the sub-transmitting band, the light receiver 20A outputs a signal corresponding to a spectral sensitivity given by the product of the spectral sensitivity of the light-receiving element 201 and the spectral transmittances of the first and second optical filters 204 and 30. The resultant spectral sensitivity would be as shown in FIG. 17.

In the light receiver 10, on the other hand, the light other than the ultraviolet band including the A, B and C waves and the sub-transmitting band is shielded by the second optical filter 30, and the light with the profile as shown in FIG. 6 reaches the light-receiving element 101. Then, the light receiver 10 outputs a signal corresponding to a spectral sensitivity given by the product of the spectral sensitivity of the light-receiving element 101 and the spectral transmittance of the second optical filter 30. The resultant spectral sensitivity would be as shown in FIG. 8.

Figure 18:
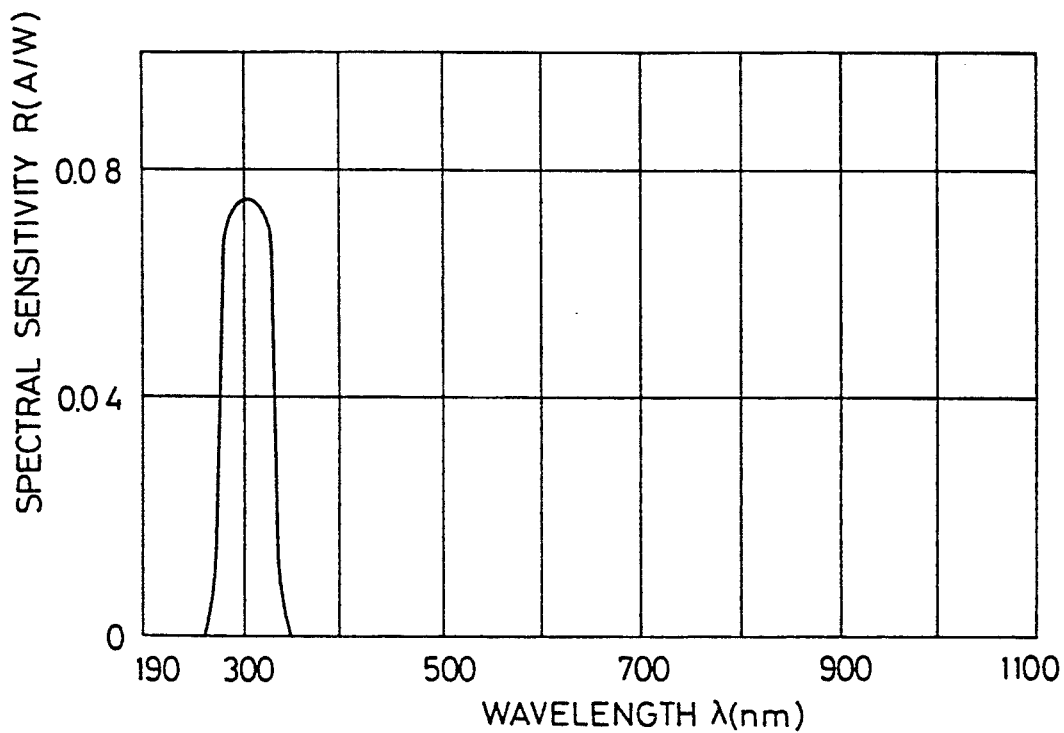
FIG. 18 is a graph illustrating the difference between the spectral sensitivities of a light receiver 10 and the light receiver 20A shown in FIG. 16.

The difference between the outputs from the light receivers 10 and 20A is based only on the light of the B wave and a part of the C wave, since the output based on the spectral sensitivity originated from the A wave and the light of the sub-transmitting band is canceled. The difference at this time is based on the spectral sensitivity as shown in FIG. 18.

In order to obtain the difference of the outputs of the light receivers, therefore, these outputs are amplified by an input circuit section 40 located at the subsequent stage, then are sent to the arithmetic operation circuit section 50 after A/D conversion to thereby provide the light intensity of mainly the B wave. The light intensity is accumulated as the time proceeds, and based on the values, various informations about the light intensity of the B wave and its accumulated value are displayed on a liquid crystal display section 60, as in a preferred embodiment which will be described in detail later.

The second mode apparatus shown in FIG. 5 will now be described in detail as one preferred embodiment of the present ultraviolet ray measuring apparatus.

Outline And Structure Of The Apparatus

Figure 19:
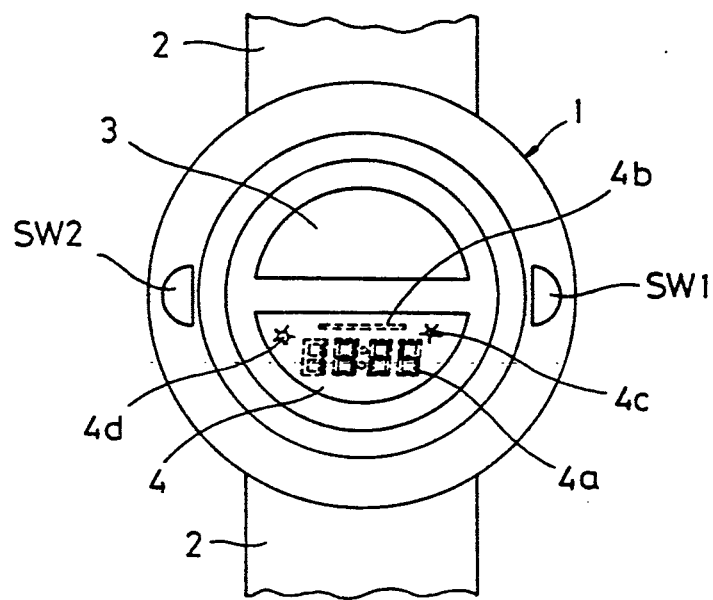
FIG. 19 is a plan view of a wrist watch type ultraviolet ray measuring apparatus of the second mode shown in FIG. 5 as one embodiment of the present invention.
Figure 20:
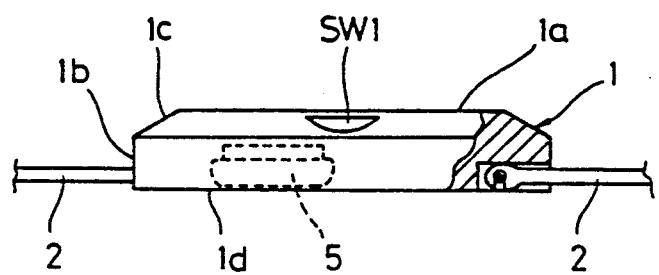
FIG. 20 is a partly cross-sectional side view of the apparatus shown in FIG. 19.

FIGS. 19 and 20 are a plan view and a side view, respectively, illustrating the outline of a wrist watch type ultraviolet ray measuring apparatus embodying this invention. This apparatus comprises a disk-shaped container (case) 1, which has an outer diameter of approximately 50 mm, slightly larger than ordinary wrist watches, and also a belt 2 attached to either side of the container 1. A user wears this apparatus around his or her wrist using the belt 2 for measuring the intensity of ultraviolet rays. The container 1 accommodates a light-receiving section for receiving that component in the sunlight which is of the ultraviolet band, an input circuit section for amplifying an output analog signal of the light-receiving section and converting the analog signal into a digital signal, an arithmetic operation circuit section for computing the light intensity of the ultraviolet band and its accumulated value based on the signals read from the input circuit section, and a liquid crystal display section for displaying the light intensity and the accumulated value computed by the arithmetic operation circuit section.

At a top surface 1a of the container 1, a semicircular light-receiving window 3 and a likewise semicircular display window 4 are provided. The light-receiving face of the light-receiving section (to be described later) is exposed through the window 3. Through the display window 4, a digital numerical display section 4a, a multi-step intensity display section 4b and measuring mode display sections 4c and 4d are visible. The display section 4a presents a 4-digit digital numerical display of the time, the light intensity of the ultraviolet band, an accumulated value of the light intensity, etc. The display section 4b comprises five segments and can display the light intensity of the ultraviolet band and the amount of its irradiation in the form of a bar graph in five steps, from No. 1 to No. 5. The display sections 4c and 4d display an intensity mode and an accumulation mode, respectively, at the time of measuring, as described later. A numeral at each digit of the display section 4a is indicated by a 7-segmented liquid crystal. Liquid crystals are also used for the other display sections 4b to 4d. The display sections 4a–4d may each be constituted by an LED(light emitting diode) instead of a liquid crystal.

An inclined surface 1c is formed between a side wall 1b and the top surface 1a of the container 1. Semicircular switches SW1 and SW2 are provided at the opposite sides on the inclined surface 1c. These switches SW1 and SW2 are push-button type, ON/OFF switches, and serve to selectivity switch computation modes of the arithmetic operation circuit section and set the time, as will be described later. Every time each switch SW1, SW2 is pressed, one pulse is generated and is input to the arithmetic operation circuit section.

Figure 21:
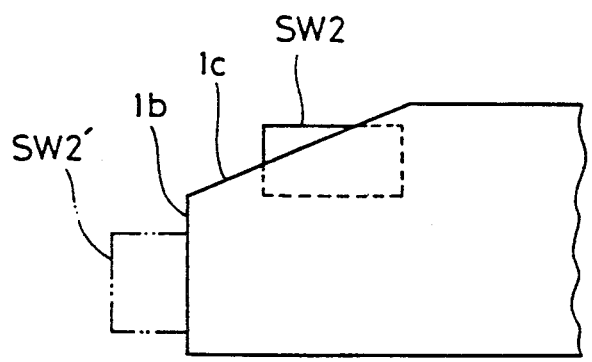
FIG. 21 is a partly enlarged side view of the apparatus shown in FIG. 19.

FIG. 21 is an enlarged side view of one of the switches, SW2. As the switches SW1 and SW2 are provided on the inclined surface 1c, they are prevented from malfunctioning. If the switches are attached on the side wall 1b of the container 1 as indicated by the imaginary line SW2' in this figure, because this ultraviolet ray measuring apparatus is a wrist watch type, the switch SW2' is likely to touch the wrist of the user when it is bent or touch an object. This may result in malfunction of the switch. Due to its general purpose of measuring and accumulating the light intensity of the ultraviolet band, this ultraviolet ray measuring apparatus is often operated for a long period of time, so that malfunction of the switches may undesirably erase stored data, such as an accumulated value of the light intensity of the ultraviolet band. Providing the switches SW1 and SW2 on the inclined surface 1c makes it difficult to cause such an undesirable event.

Figure 22:
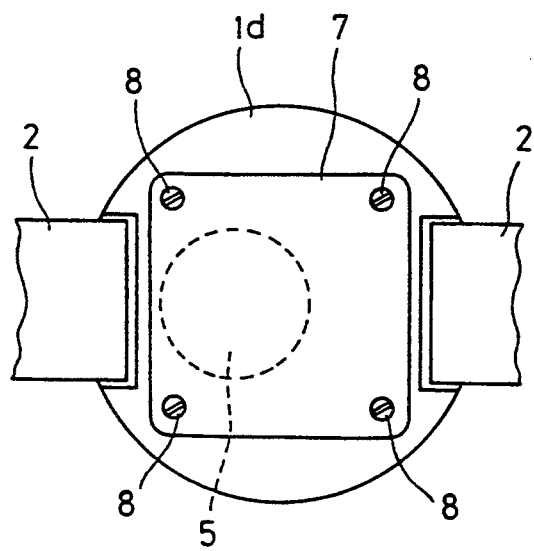
FIG. 22 is a rear view of the apparatus shown in FIG. 19.

FIG. 22 illustrates the back surface 1d of the ultraviolet ray measuring apparatus. A back cover 7 is attached, by screws 8, to the back surface 1d in such a water-tight manner as to provide a sufficient water-proof condition for ordinary use. With the back cover 7 open, a mercury battery 5 can easily be replaced. In other words, as the back cover 7, unlike in ordinary wrist watches, is attached to the container 1 by the screws 8, it requires no skilled person, such as a watch technician, to remove the screws 8 and open the back cover 7 for easy replacement of the battery 5.

Circuit Arrangement

The arrangement of the circuit accommodated in the container 1 of the present ultraviolet ray measuring apparatus will be described below, referring to FIGS. 5 and 23.

The general circuit comprises a light-receiving circuit section 3A, an input circuit section 40, and an arithmetic operation circuit section 50 including a driving circuit. The liquid crystal display section 60 comprising the aforementioned digital numeral display section 4a, and a buzzer 70 for generating an alarm are connected to the output side of the arithmetic operation circuit section 50.

The structure of the light-receiving circuit section 3A having already been given, its detailed description will be omitted.

A photodiode of the S1227 series, manufactured by Hamamatsu Photonics K. K., which has such a spectral sensitivity as shown in FIG. 2, is suitably used for the light-receiving element 101 of the light receiver 10 of this light-receiving circuit section 3A. Likewise, a photodiode having the same spectral sensitivity as the photodiode 101 may be used as the light-receiving element 201 of the light receiver 20. An ultraviolet-cut colored glass filter, such as a model L-39, manufactured by Hoya Corporation, which has such a spectral transmittance as shown in FIG. 3, is suitably used for the first optical filter 202. An ultraviolet-transmitting colored glass filter, such as a model U-340, also manufactured by Hoya Corporation, which has such a spectral transmittance as shown in FIG. 6 and passes the light of the ultraviolet band and the sub-transmitting band, is suitably used for the second optical filter 30 that covers both the light-receiving faces of the light receivers 10 and 20.

With regard to the light of the sub-transmitting band, the light receiver 20 outputs a signal corresponding to a spectral sensitivity given by the product of the spectral sensitivity of the photodiode 201 and the spectral transmittances of the first and second optical filters 202 and 30. The resultant spectral sensitivity would be as shown in FIG. 7.

The light receiver 10 outputs a signal corresponding to a spectral sensitivity given by the product of the spectral sensitivity of the photodiode 101 and the spectral transmittance of the optical filter 30. The resultant spectral sensitivity would be as shown in FIG. 8.

The input circuit section 40, which is an analog circuit, will now be described. This section 40 incorporates amplifiers 401 and 402, the former amplifier being connected to the photodiode 101 on the measuring side while the other one is connected to the photodiode 201 on the referring side. The amplifiers 401 and 402 each have the output side connected via a switch circuit 406 to an A/D converter (ADC) 403. The A/D converter 403 converts outputs $S_1$ and $S_2$, analog signals, of these amplifiers into digital signals which are in turn supplied to the arithmetic operation circuit section 50.

More specifically, the switch circuit 406 is switched between two contacts in accordance with a channel select signal from the arithmetic operation circuit section 50, and the output of the selected amplifier is supplied to the A/D converter 403. The A/D converter 403 outputs a digital signal corresponding to the received amplifier output to the arithmetic operation circuit section 50 in response to a sampling signal. Feedback variable resistors 404 and 405 are respectively connected in parallel to the amplifiers 401 and 402. The resistors 404 and 405 permit gain control of the amplifiers at the time of calibration of this apparatus. Because this input circuit section 40 has large power dissipation, the supply of power to the circuit and inhibition of the power supply are controlled by a control signal P1 from a power-saving circuit 503 which will be described later.

Figure 23B:
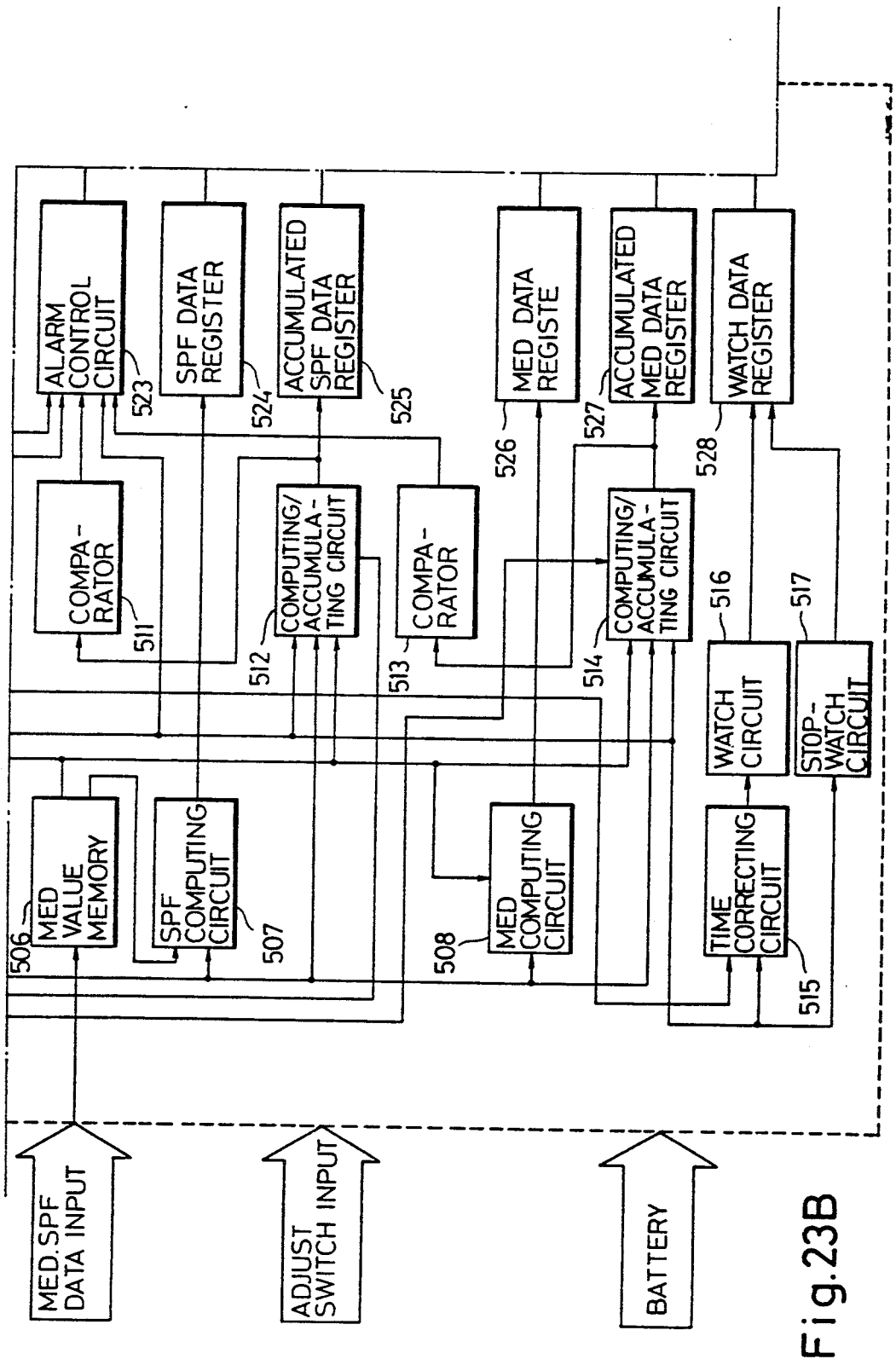

The detailed structure of the arithmetic operation circuit section 50 is illustrated in FIG. 23. Although the section 50 is illustrated as an equivalent circuit, actually it comprises a central processing unit (CPU), various storage devices (ROM, RAM and nonvolatile RAM) and a liquid crystal driver. This section 50 has a watch function (watch mode M1), a function (intensity mode M2) to compute the light intensity of the ultraviolet band based on a received light signal from the A/D converter 403 of the input circuit section 40, and predict MED-based sunburn from the computed light intensity and convert the prediction into bar graph intensity data, a function (accumulation mode M3) to accumulate the light intensity of the ultraviolet band to provide an accumulated value, alarm sunburn from the resultant accumulated value based on an MED value and convert it into bar graph data, a function (MED multiple mode M4) to convert the light intensity of the ultraviolet band to provide MED multiple values, a function (accumulated MED multiple mode M5) to convert the accumulated value of the light intensity of the ultraviolet band to provide MED multiple values, a function (SPF mode M6) to convert the light intensity of the ultraviolet band to provide SPF values, a function (accumulated SPF mode M7) to convert the accumulated value of the light intensity of the ultraviolet band to provide SPF values, and an alarm function to issue an alarm based on information about the light of the ultraviolet band acquired by these various arithmetic functions when a computed value exceeds a predetermined reference value.

The circuit for the watch function comprises a watch circuit 516, a stopwatch circuit 517, a watch data register 528 and time correction circuit 515. The watch circuit 516 sequentially counts up or down its count value by a frequency-divided clock pulse and updates time data for every 0.5 second. The stopwatch circuit 517 counts a lap time from the time at which a trigger signal is input and updates lap data for every 0.5 second. The watch data register 528, which is connected to the output sides of the watch circuit 516 and stopwatch circuit 517, stores the time data or lap data computed by these circuits. The time correction circuit 515, which is connected to the input side of the watch circuit 516, supplies a clock pulse to the watch circuit 516 in different frequency-divided periods through the switching operation of the mode select switches SW1 and SW2 (to be described later).

A circuit for the function of computing the light intensity of the ultraviolet band comprises an intensity computing circuit (visible light component compensation circuit) 501, an intensity data register 519, an MED value memory 506, a bar graph intensity computing/-comparing circuit 509, and a bar graph intensity data register 520. The intensity computing circuit 501 sequentially retrieves data S1 and S2 of light received by the light receivers 10 and 20, from the A/D converter 403, and computes the light intensity of the ultraviolet band, Xs (W/m$^2$), from the difference between the data (S1-S2). The intensity data register 519 stores the computed intensity Xs from the circuit 501. The MED value memory 506 stores predetermined reference data Xsm as a MED value. The bar graph intensity computing/-comparing circuit 509, which has its input side connected to the intensity computing circuit 501 and MED value memory 506, computes multi-step (five steps) bar graph intensity data (to be described in detail later) suitable for use as sunburn prediction information from the reference MED value Xsm stored in the memory 506 and the light intensity Xs computed by the circuit 501. The bar graph intensity data register 520 stores computed data from the circuit 509.

A circuit for the function of computing an accumulated value of the light intensity of the ultraviolet band comprises an accumulator 505, an accumulation data register 522, a bar graph accumulating/comparing circuit 510, and a bar graph accumulation data register 521. The accumulator 505 adds the computed light intensity Xs from the intensity computing circuit 501 for a predetermined period of time (e.g., 0.5 second) to provide its accumulated value Xa. The accumulation data register 522 stores the accumulated value Xa. The bar graph accumulating/comparing circuit 510, which has its input side connected to the accumulator 505 and MED value memory 506, computes multi-step (five steps) bar graph accumulation data (to be described in detail later) suitable for use as sunburn alarming information from the reference MED value Xsm stored in the memory 506 and the accumulated value Xa from the accumulator 505. The bar graph accumulation data register 521 stores computed data from the circuit 510. An alarm control circuit 523 is connected to the output side of the circuit 510, and the buzzer 70 is activated through this circuit 523 when the bar graph value computed by the circuit 510 exceeds a predetermined value.

A circuit for the function of computing an MED value comprises an MED value computing circuit 508 and an MED multiple data register 526. The MED value computing circuit 508, which has its input side connected to the intensity computing circuit 501 and MED value memory 506, computes an MED value Xm expected when bathing in the present light of the ultraviolet band is continued for a predetermined period of time, from the reference MED value Xsm stored in the memory 506 and the light intensity Xs computed by the circuit 501. The MED multiple data register 526 stores this MED value Xm.

A circuit for the function of computing an accumulated MED value comprises an MED value computing/accumulating circuit 514 and an accumulated MED multiple data register 527. The accumulated MED value computing/accumulating circuit 514, which has its input side connected to the intensity computing circuit 501 and MED value memory 506, accumulates the light intensity Xs computed by the intensity computing circuit 501 from the point of time at which a trigger signal from the mode select switch SW2 (to be described later) is received, and computes an MED value Xmr (to be described in detail later) of the light of the ultraviolet band exposure up to the present time, from the accumulated value and the reference MED value Xsm stored in the memory 506. The accumulated MED multiple data register 527 stores this MED value Xmr. The alarm control circuit 523 is connected via a comparator 513 to the output side of the circuit 514, and it activates the buzzer 70 when the MED value Xmr exceeds a predetermined value.

A circuit for the function of computing an SPF value comprises an SPF value computing circuit 507 and an SPF data register 524. The SPF value computing circuit 507, which has its input side connected to the intensity computing circuit 501 and MED value memory 506, computes an SPF value Xsp expected when bathing in the present light of the ultraviolet band is continued for a predetermined period of time, from the reference MED value Xsm stored in the memory 506 and the light intensity Xs computed by the circuit 501. The SPF data register 524 stores this SPF value Xsp.

A circuit for the function to compute an accumulated SPF value comprises an SPF value computing/accumulating circuit 512 and an accumulated SPF data register 525. The accumulated SPF value computing/accumulating circuit 512, which has its input side connected to the intensity computing circuit 501 and MED value memory 506, accumulates the light intensity Xs computed by the intensity computing circuit 501 from the point of time at which a trigger signal from the mode select switch SW2 (to be described later) is received, and computes an SPF value Xspr of the light of the ultraviolet band exposure up to the present time, from the accumulated value and the reference MED value Xsm stored in the memory 506. The accumulated SPF data register 525 stores this SPF value Xspr. The alarm control circuit 523 is connected via a comparator 511 to the output side of the circuit 512, and it activates the buzzer 70 when the SPF value Xspr exceeds a predetermined value.

The individual registers 522, 521, 527 and 525 have a hold function to hold the previous measuring result unless a new accumulating process is initiated by the switching operation of the switch SW2, as will be described later.

The arithmetic operation circuit section 50 is provided with a liquid crystal driver 530 and a battery-out detector 529. The liquid crystal driver 530 drives individual liquid crystal elements of the liquid crystal display section 60. The battery-out detector 529 detects a battery voltage falling below a given voltage and intermittently drives the liquid crystal driver 530 upon such a detection to cause blinking of the liquid crystal display section 60, thereby informing the user of the battery being out. The arithmetic operation circuit section 50 also has a mode select circuit 518 which switches and connects the liquid crystal driver 530 to one of the aforementioned registers. A switch element 518a of the mode select circuit 518 switches and connects the liquid crystal driver 530 to one of the registers through predetermined procedures every time the select switch SW1 or SW2 is operated. The mode selecting procedures performed by the mode selecting circuit 518 will be described in detail later.

The arithmetic operation circuit section 50 further has the aforementioned power-saving circuit 503 that performs the ON/OFF control of the power to the input circuit section 40. This power-saving circuit 503 is connected via an intensity measuring time counter 502 to the intensity computing circuit 501 as well as to the accumulator 505 via an accumulation time counter 504.

The operation of the thus constituted ultraviolet ray measuring apparatus will now be described.

Mode Selection

First, a description will be given of how to select a mode by sequentially pressing the switches SW1 and SW2. The first switch SW1 located on the right side of the container's top surface 1a generates a pulse signal which is mainly used for mode selection. The second switch SW2 located on the left side generates a pulse signal which is mainly used as a trigger signal to start accumulation or the like.

Immediately after the battery 5 is connected to the ultraviolet ray measuring apparatus, the watch mode M1 is selected and the watch data register 528 and the liquid crystal driver 530 are connected together by the switch element 518a. The liquid crystal driver 530 reads out time data stored in the register 528 and activates the liquid crystal elements of the digital numeral display section 4a of the liquid crystal display section 60 in accordance with the time data to display the time (FIG. 24A).

Subsequently, pressing the switch SW1 once selects the intensity mode M2, and the intensity data register 519 and the bar graph intensity data register 520 are connected to the liquid crystal driver 530 by the switching element 518a. At this time, the digital numeral display section 4a displays the light intensity of the ultraviolet band, Xs, stored in the register 519, the bar graph display section 4b displays the bar graph data stored in the register 520, and the measuring mode display section 4c on the right is blinked to indicate that the display is for the intensity mode (FIG. 24B).

Further pressing the switch SW1 once selects the accumulation mode M3, and the bar graph accumulation data register 521 and the accumulation data register 522 are connected to the liquid crystal driver 530. At this time, the digital numeral display section 4a displays the accumulated value of the light intensity of the ultraviolet band, Xa, stored in the register 522, the bar graph display section 4b displays the bar graph data stored in the register 521, and the measuring mode display section 4d on the left is blinked to indicate that the display is for the accumulation mode (FIG. 24C).

Similarly, every time the switch SW1 is pressed once, the mode is switched to the MED mode M4, accumulation MED mode M5, SPF mode M6 and accumulation SPF mode M7 in the named order. Further pressing the switch SW1 causes the mode to return to the watch mode M1 shown in FIG. 24A.

The pulse signals of the switches SW1 and SW2 are also supplied to the aforementioned alarm control circuit 523. The pulse signals activate the buzzer 70 through the alarm control circuit 523 to generate a buzzer sound, thereby informing the user of whether the switch operation is properly executed.

Main Routine

The control procedures of the main routine executed by the arithmetic operation circuit section 50 will be described below referring to FIG. 25.

Figure 25:
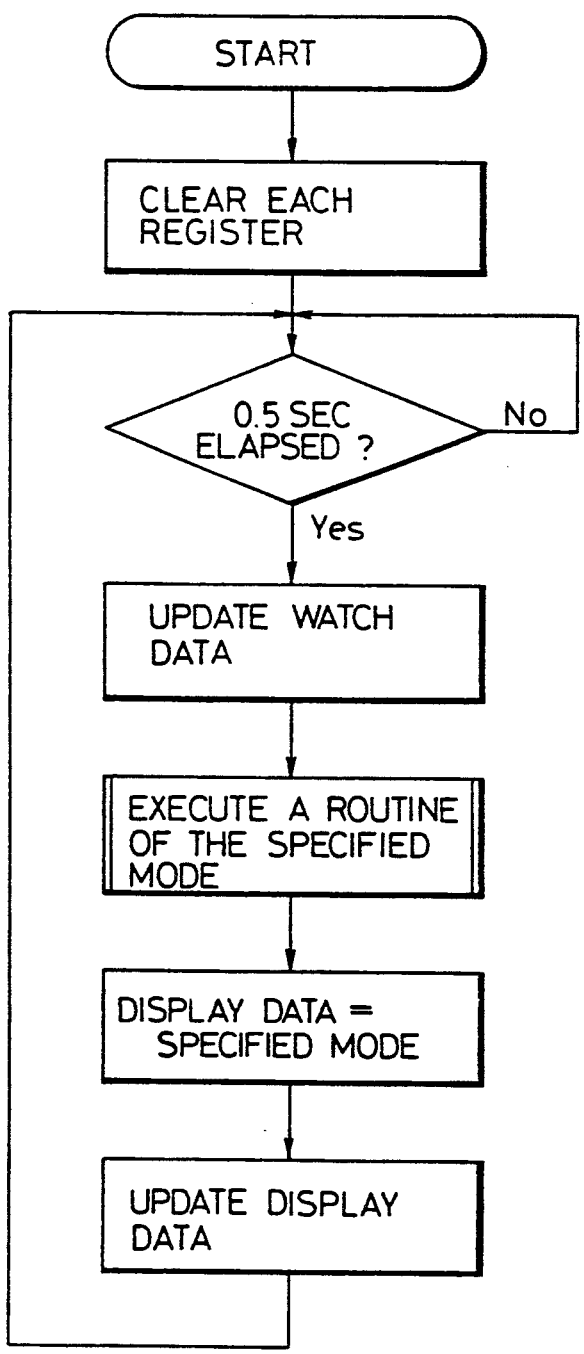
FIG. 25 is a flowchart for explaining the control sequence of a main routine executed by the arithmetic operation circuit section 50 shown in FIG. 5.

The main routine shown in FIG. 25 is repeatedly executed in the period of 0.5 second from the point at which the battery 5 is mounted in the container 1 until the battery 5 is removed, or until the energy of the battery 5 is reduced below a predetermined level. First, after the individual registers are cleared immediately upon mounting of the battery 5, the flow enters a repeating loop and it is determined whether or not a predetermined period, 0.5 second, has elapsed since the previous execution of this loop. If the time has not elapsed yet, the operation is in a hold state. Immediately after 0.5 second elapses, the data of the watch data register 528 is updated. This action corresponds to an operation of counting a predetermined value corresponding to 0.5 second by the watch circuit 516 and updating the data in the watch data register 528 every time the predetermined value is counted. Then, a routine corresponding to the mode selected by the switches SW1 and SW2 is executed; a detailed description of this routine will be given later.

Upon completion of the execution of the routine corresponding to the selected mode, display data is specified by the selected mode and display data of the liquid crystal display section 60 is updated. This action corresponds to an operation of causing the mode selecting circuit 518 to switch the switching element 518a to connect the register associated with the selected mode to the liquid crystal driver 530, retrieving the data of the connected register into the driver 530 and activating the liquid crystal elements of the liquid crystal display section 60 in accordance with the retrieved data.

With regard to the accumulation mode M3, accumulation MED mode M5 and accumulation SPF mode M7, even if another mode (e.g., the watch mode or intensity mode) is being carried out by the mode selection, accumulation and measurement should continue unless the measuring terminating operation is performed using the switch SW2 or the measurement is automatically terminated when the measurement time exceeds a predetermined time (e.g., 12 hours). If each of the three accumulation modes (M3, M5 and M7) is selected again by the mode selection, the values of the continuing accumulation and measurement will be displayed on the display section 60.

Watch Mode

When the mode is set to the watch mode M1, an M1 routine (not illustrated) is executed. In this routine, a time correcting procedure and a stopwatch procedure are executed; in the case of normal time display, nothing is done and the flow returns to the main routine shown in FIG. 25.

Figure 26:
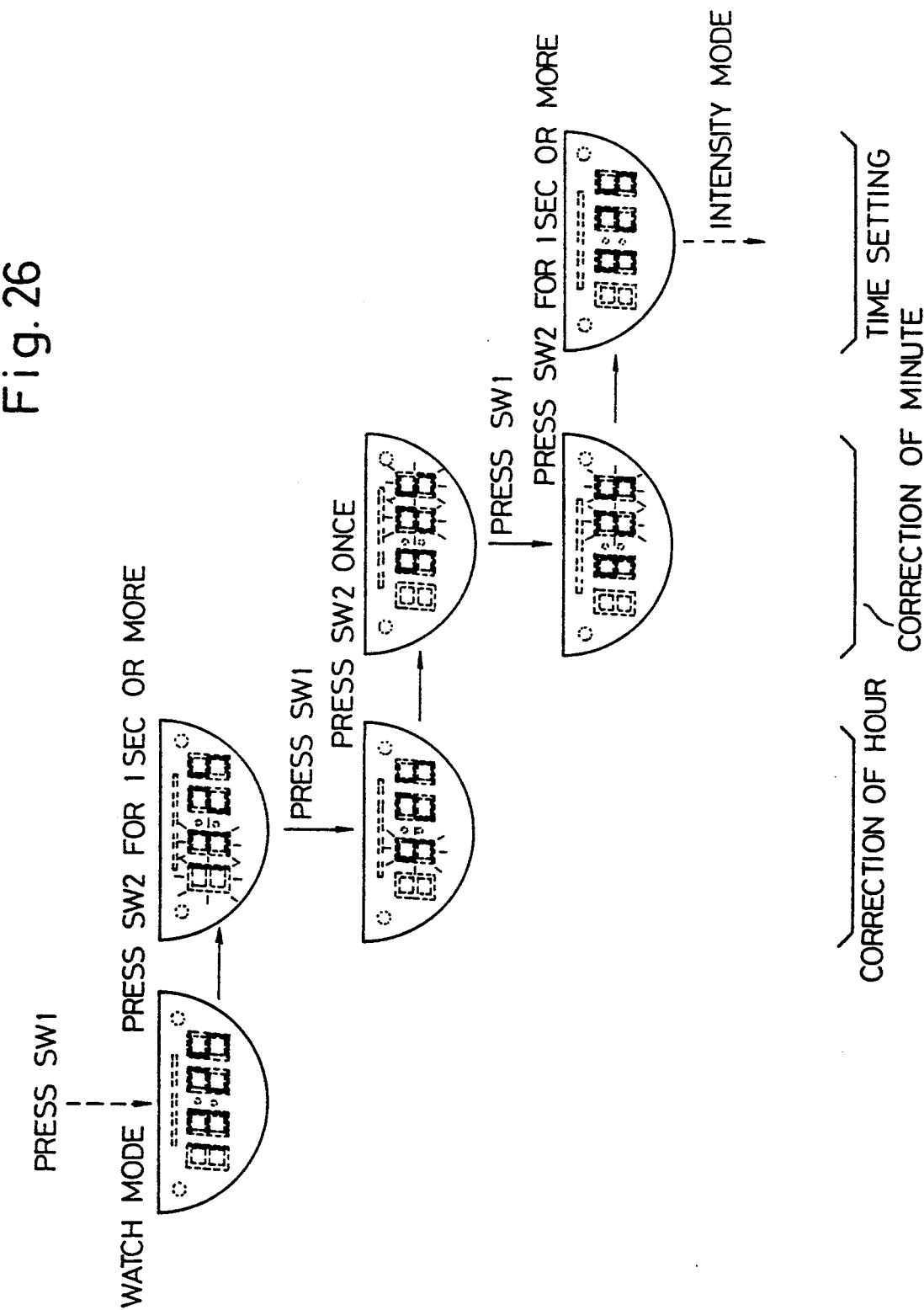
FIG. 26 is a diagram illustrating the status of a digital numeral display section 4a which varies in accordance with time correction procedures.

FIG. 26 illustrates the time correcting procedures executed in the M1 routine. When the second switch SW2 is kept pressed for a predetermined period of time (e.g., 1 second), the liquid crystal element at the "hour" portion of the digital numeral display section 4a blinks to indicate that correction is possible. At this time, the time correcting circuit 515 stops supplying a clock pulse, and in the watch circuit 516, only the upper bit (hour bit) is ready for counting. Pressing the first switch SW1 once increases the display at the "hour" portion of the display section 4a by one, and when the pressing of the switch SW1 continues, the incrementing is quickened. That is, the time correcting circuit 515 supplies a clock pulse to increment the upper bit by one to the watch circuit 516, and when the switch SW1 is held down, the clock pulse is continuously supplied to the watch circuit 516.

When the "hour" portion of the display section 41 is set to the desired value, the switch SW2 is pressed once. Consequently, a "minute" portion of the display section 4a blinks to indicate that correction is possible. At this time, in the watch circuit 516, the lower bit (minute bit) is ready for counting. As in the "hour" setting, pressing the first switch SW1 once increases the display at the "minute" portion of the display section 4a by one, and when the pressing of the switch SW1 continues, the incrementing is quickened.

When the "hour" and "minute" portions of the display section 4a are set to the desired values in the above manner, the second switch SW2 is held down for a predetermined period of time (1 second) as is done at the beginning, the mode is set back to the watch mode. When the mode returns to the watch mode, the watch circuit 516 starts counting by the clock pulse supplied from the time correcting circuit 515, and the digital numeral display section 4a of the liquid crystal display section 60 displays the time.

A description will now be given of the stopwatch procedures executed in the M1 routine. When the second switch SW2 is successively pressed twice after the watch mode is selected by the operation of the first switch SW1, the stopwatch circuit 517 becomes ready for action. Although the watch circuit 516 keeps counting the clock pulse, it stops outputting time data and the stopwatch circuit 517 starts outputting lap data instead. When the second switch SW2 is pressed again, the stopwatch circuit 517 starts counting the clock pulse and updates the lap data. The lap data is updated for each predetermined time (0.5 second) and stored in the watch data register 528, and the lap time is displayed on the display section 4a.

To use the ultraviolet ray measuring apparatus used as a sunburn monitor, the apparatus needs to measure an accumulated value of the light intensity of the ultraviolet band. That is, measurement of the light intensity does not involve a time factor, but measurement of the accumulated value (amount of irradiation) involves a time factor, namely, the time of measurement, and the measured period.

For instance, in a case where the user measures the amount of irradiated light of the ultraviolet band for a certain time period to judge how far the sunburn is advanced, it is very convenient for the user to know the time of the measurement and the time period of irradiation by the apparatus itself. Based on the data displayed by the apparatus, the user can use a cosmetic with the proper SPF value to prevent further sunburn.

With the above situation in mind, the present ultraviolet ray measuring apparatus is provided with the ordinary watch function and the stopwatch function, so that the user can acquire the light intensity of the ultraviolet band and its accumulated value as well as an MED value and SPF value from those data, and compare the information with the time during which the user is exposed to the sunlight or will be exposed to it, thus permitting the user to properly deal with the sunburn.

Intensity Mode

Figure 27:
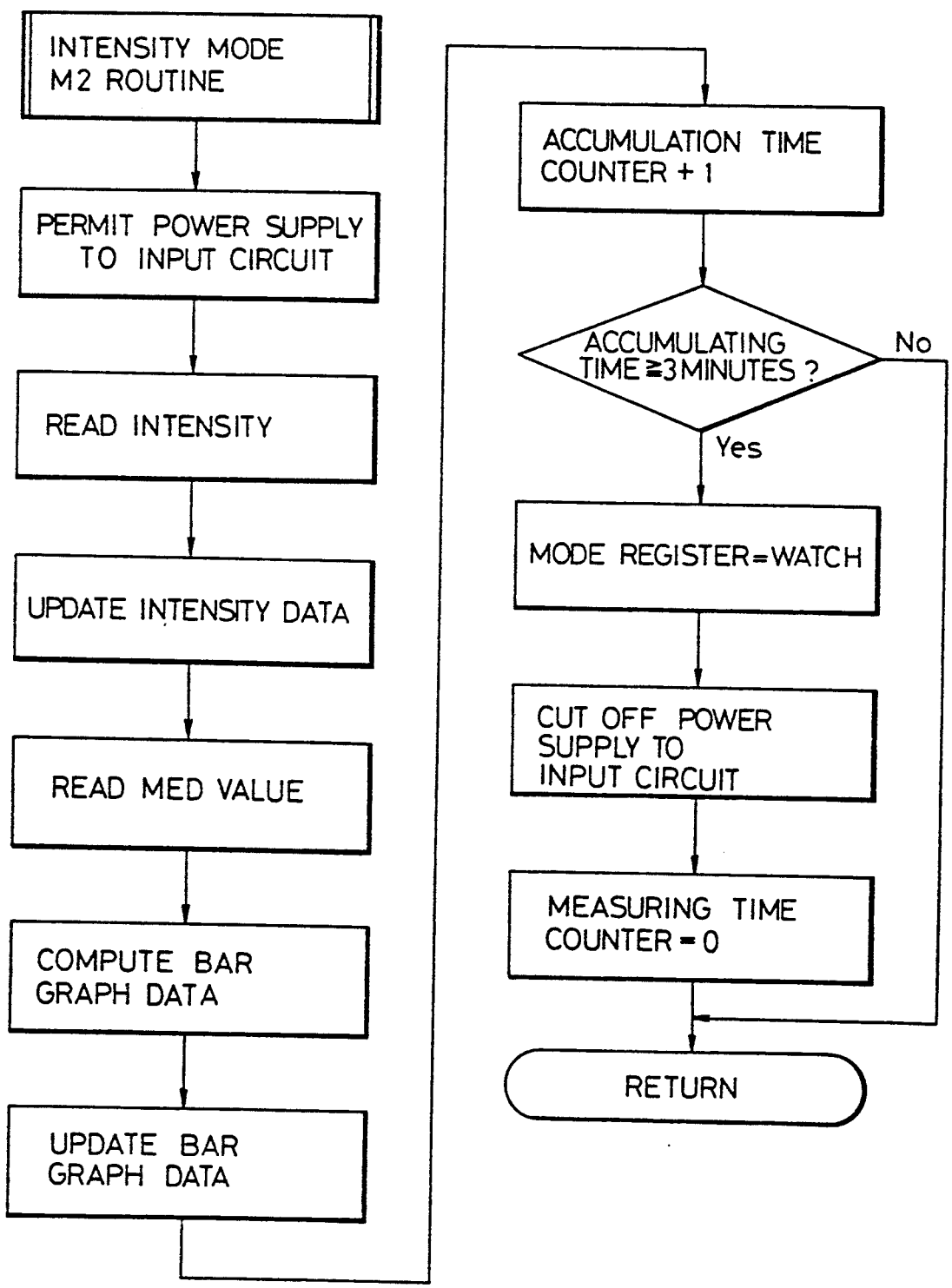
FIG. 27 is a flowchart illustrating the arithmetic operation sequence in a routine in intensity mode executed by the arithmetic operation circuit section 50 shown in FIG. 5.

When the intensity mode M2 is selected by the first switch SW1, the routine for the intensity mode M2 as shown in FIG. 27 is repeatedly executed for each aforementioned predetermined period of time (0.5 second).

When this mode is selected, the power-saving circuit 503 issues the control signal P1 to allow the supply of power to the input circuit section 40. Then, as described earlier, digital signals S1 and S2 representing the light intensity from the light receivers 10 and 20 converted by the A/D converter 403, are sequentially retrieved by the intensity computing circuit 501 and the light intensity Xs is computed from the difference between the received light data (S1-S2). The computed light intensity Xs is stored in the intensity data register 519 to update the old data.

Meantime, the bar graph intensity computing/comparing circuit 509 computes bar graph intensity data from the following equation (1) using the light intensity Xs computed by the circuit 501 and the reference MED value Xsm stored in the MED value memory 506.

Lighting No. $=(Xs \times Ts)/(Xsm \times n)$      (1)

Xsm is set to, for example, an averaged MED for Japanese (90,000 J/m$^2$). This value Xsm may be changed to another value as needed according to the skin type of the user. Ts in the equation is a constant time, e.g., two hours (7200 seconds), and n is a natural number 1, 2, 3, ... and determines the number of liquid crystal elements forming each bar graph to be displayed. For instance, with n=2, the liquid crystal elements forming each bar graph are displayed one by one for each 2 MED increment, from the one corresponding to the No. 1 lighting element. As should be obvious from the equation (1), the light No. indicates how many times the reference MED value Xsm the user is exposed to the light of the ultraviolet band if the user keeps bathing in the light with the light intensity Xs presently detected for the predetermined time Ts. The lighting No. is given by a natural number not exceeding the value computed from the equation (1) and is expressed in the steps of 1 to 5. The Table 1 below shows the relation between the light intensity of ultraviolet band, Xs, and the bar graph intensity data, with Xsm, Ts and n being respectively set to 90,000 J/m$^2$, 2 hours (7200 seconds) and 1.

TABLE 1

| No. | Intensity Xs |
|---|---|
| 1 | 13 W/m$^2$ or greater |
| 2 | 25 W/m$^2$ or greater |
| 3 | 38 W/m$^2$ or greater |
| 4 | 50 W/m$^2$ or greater |
| 5 | 63 W/m$^2$ or greater |

The bar graph intensity data computed in the above manner is stored and updated in the bar graph intensity data register 520. The measuring time counter value stored in the intensity measuring time counter 502 is incremented by 1 and it is determined from the incremented value whether the time of measuring the light intensity of the ultraviolet band exceeds a predetermined time (e.g., 3 minutes). If the measuring time does not exceeds the predetermined time, this routine is repeated to continue the measuring of the light intensity Xs. If another mode is selected in the main routine before the measurement time reaches the predetermined time, the power is cut off and the measurement time counter is reset to zero, thus terminating the measurement operation.

Individual data stored and updated in the registers 519 and 520 are displayed on the liquid crystal display section 60 in the main routine, as described earlier.

FIG. 28 illustrates a correlation table provided in the present apparatus. The table shows correlation between the skin types 1, 2, 3, 4, ... and light intensities A, B, C, D, ...; the skin types are indices properly classified in accordance with whether the skin color is black or white, the skin is strong or weak for sunburn, etc., and values of the light intensity are registered in A, B, C, D, ... in the proper scales. Information about the degree of danger and sunburn to skin is registered in each blank. For instance, the information indicates that for a certain type of skin, exposure to light of the ultraviolet band with a certain level or greater of intensity is likely to excessively advance sunburn. Confirming his or her own skin type, the user can judge whether or not the light currently bathed in advances sunburn of the skin by reading the correlation table.

Upon lapse of the predetermined time (3 minutes), the mode specified by the switch SW1 is set back to the watch mode and the outputting of the control signal P1 from the power-saving circuit 503 is stopped to cut off the power to the input circuit section 40. Further, the measuring time counter value of the intensity measuring time counter 502 is reset to zero and this routine is terminated. This can prevent the input circuit section 40 having large power dissipation from being left activated for a long period of time, providing a significant power-saving effect.

In the intensity mode, as described above, since the light intensity of the ultraviolet band, Xs, is displayed in a digital numeral and the amount of received light of the ultraviolet band after a predetermined time is displayed as a bar graph, the degree of the future sunburn can be predicted based on the light intensity Xs so that the user can use a cosmetic with the proper SPF value to prevent further excessive sunburn.

Accumulation Mode

Figure 29:
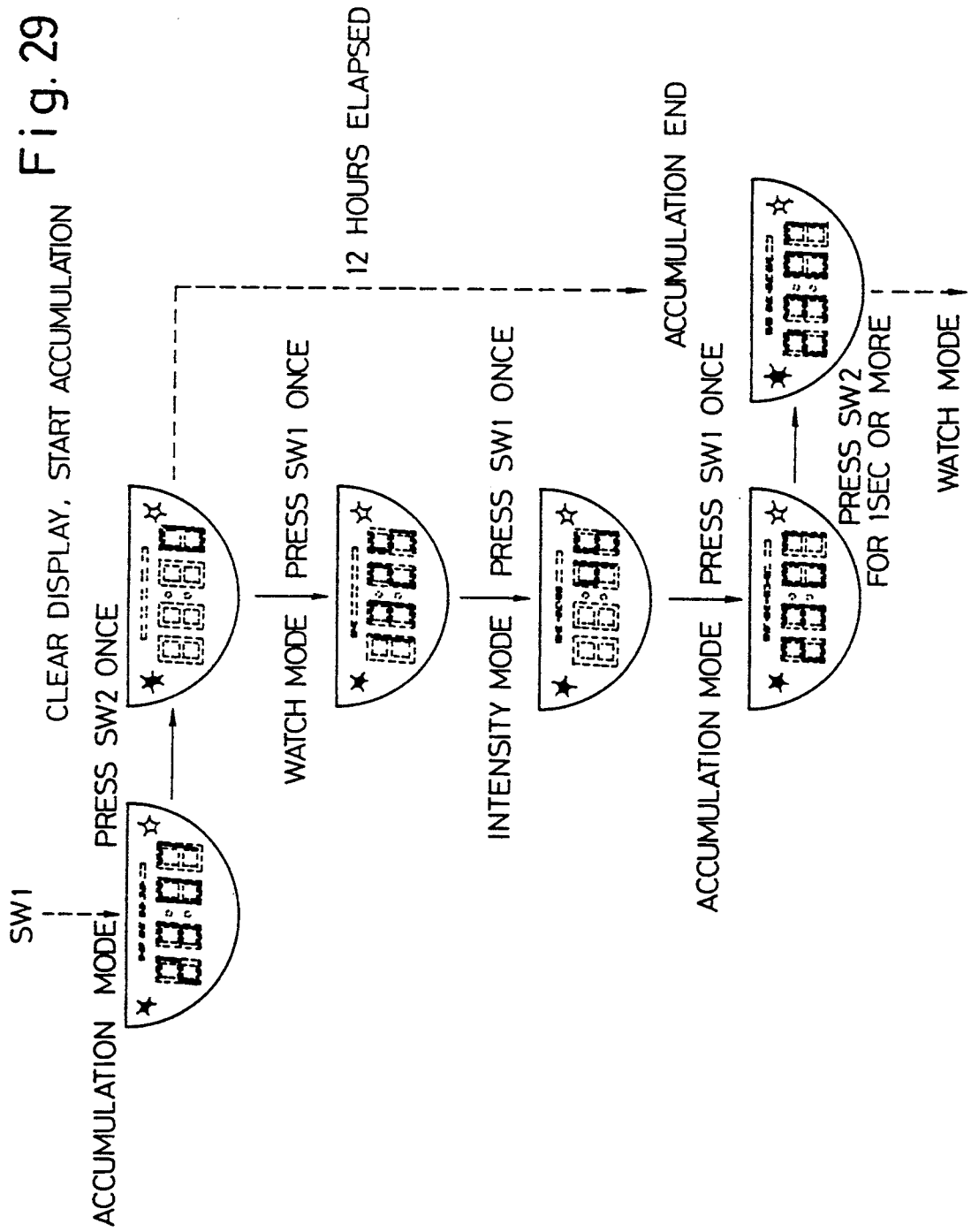
FIG. 29 is a flowchart illustrating a sequence of procedures in a routine in accumulation mode executed by the arithmetic operation circuit section 50 shown in FIG. 5.

FIG. 29 illustrates the procedures in the accumulation mode executed in the M3 routine. Pressing the first switch SW1 a predetermined number of times selects the accumulation mode and the liquid crystal display section 60 displays the previous measuring results stored in the accumulation data register 522 and bar graph accumulation data register 521. Under this condition, pressing the second switch SW2 once resets the accumulated data stored in these registers 522 and 521 to zero and the accumulation of the light intensity of the ultraviolet band starts. If the measuring time since the beginning of the accumulation continues for a predetermined time (maximum accumulation time, e.g., 12 hours), the accumulation is automatically terminated by the power-saving circuit 503 and the mode returns to the watch mode. To terminate the accumulating measurement before the predetermined time elapses, the switch SW2 should be kept pressed for a predetermined time (e.g., 1 second) with the liquid crystal display section being set for the accumulation mode. This action terminates the accumulation and returns the mode to the watch mode. In either case of terminating the measurement, the measuring results are kept stored in the data registers 522 and 521 by their holding function unless an action for a new measurement is initiated. If the user wishes to display the measuring results on the display section 60 at a later time, therefore, the user simply needs to select the accumulation mode by operating the switch SW1. Under this condition, pressing the switch SW2 once erases the contents of the data registers 521 and 522 and clears the display on the liquid crystal display section 60 and a new accumulation is started.

As described above, if another mode (e.g., watch mode or intensity mode) is executed during the accumulation mode, the accumulation is continued.

Figure 30A:
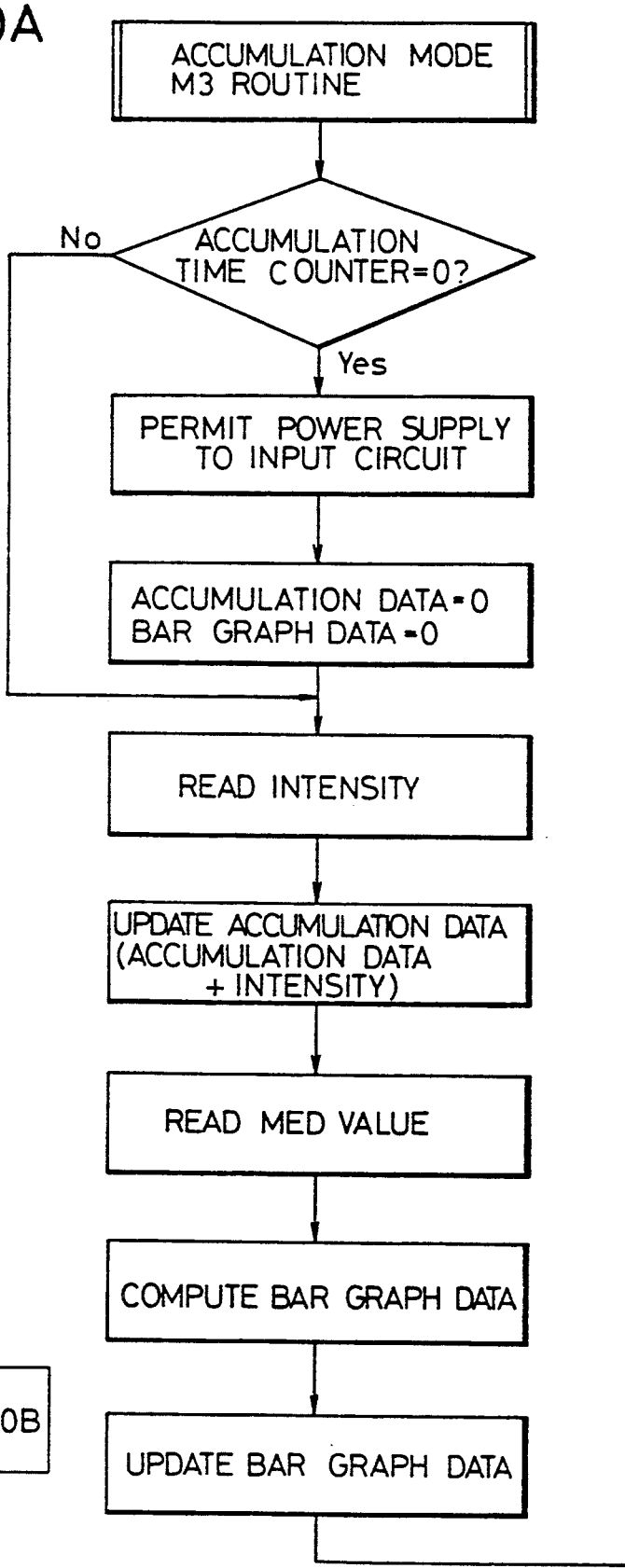
FIGS. 30A and 30B are flowcharts illustrating the arithmetic operation sequence in a routine in the accumulation mode.
Figure 30:
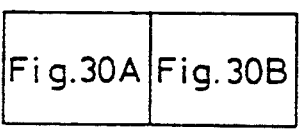

When the accumulation mode M3 is selected by the first switch SW1, then the second switch SW2 is pressed, the routine for the accumulation mode M3 as shown in FIG. 30 is executed and the aforementioned accumulation of the light intensity of the ultraviolet band starts.

First, it is determined whether or not the value of the accumulation time counter 504 is 0. Since the decision is affirmative (YES) immediately after the accumulation has started, the power supply to the input circuit section 40 is permitted by the power-saving circuit 503, and the contents of both the data registers 511 and 522 are reset to 0. Once such a process is executed, the value of the accumulation time counter becomes greater than 0 so that the process will not be repeated until this routine is terminated through the operation of the switch SW2 or is automatically terminated. If another mode (e.g., watch mode or intensity mode) is executed during execution of this routine in the main routine, therefore, execution of the accumulation routine can continue.

Then, as in the intensity mode, the intensity computing circuit 501 computes the light intensity of the ultraviolet band, Xs, and supplies it to the accumulator 505. The accumulator 505 adds the presently computed light intensity Xs to the previous accumulated value to update the accumulated value Xa, and stores it in the accumulation data register 522 to be updated. As the accumulated value Xa (J/m$^2$) of the light intensity of the ultraviolet band is obtained by adding the light intensity Xs (W/m$^2$) detected for every predetermined time (0.5 second), it can be expressed by the following equation (2).

$$Xa = Xs \times \text{time (s)} \quad (2)$$

This accumulated value Xa equals the total amount of irradiated light of the ultraviolet band and simply represents the degree of sunburn progressed up to the present time.

Meantime, the bar graph accumulating/comparing circuit 510 computes bar graph accumulation data from the following equation (3) using the accumulated value Xa computed by the accumulator 505 and the reference MED value Xsm stored in the MED value memory 506.

$$\text{Lighting No.} = Xa/(Xsm \times n) \quad (3)$$

Xsm is set to, for example, an averaged MED for Japanese (90,000 J/m$^2$). This value Xsm may be changed to another value as needed according to the skin type of the user, as per the case of the bar graph intensity data. The letter is a natural number 1, 2, 3, . . . and determines the number of liquid crystal elements forming each bar graph to be displayed. For instance, with n=2, the liquid crystal elements forming each bar graph are displayed one by one for each 2 MED increment, from the one corresponding to the No. 1 lighting element. The light No. indicates how many times the reference MED value Xsm the total amount of irradiated light of the ultraviolet band to which the user has been exposed corresponds to. The light No. is given by a natural number not exceeding the value computed from the equation (3) and is expressed in the steps of 1 to 5. The Table 2 presented below shows the relation between the accumulated value of the light intensity of ultraviolet band, Xa, and the bar graph accumulation data, with Xsm being set to 90,000 J/m$^2$, and n=1.

TABLE 2

| No. | Accumulated Value Xa |
|---|---|
| 1 | 90 kJ/m$^2$ or greater |
| 2 | 180 kJ/m$^2$ or greater |
| 3 | 270 kJ/m$^2$ or greater |
| 4 | 360 kJ/m$^2$ or greater |
| 5 | 450 kJ/m$^2$ or greater |

The bar graph accumulation data computed in the above manner is stored and updated in the bar graph accumulation data register 521, and is compared with a predetermined value $k_n$ ($k_n$=1, 2, 3, . . . ). If the computed bar graph accumulation data coincides with the predetermined value $k_n$, i.e., every time the value of the bar graph accumulation data is incremented by 1, the buzzer 70 is activated by the alarm control circuit 523 to generate an alarm. This can inform the user that the amount of irradiation exposure has exceeded the predetermined value $k_n$ and the inflammation is reaching a dangerous degree.

The accumulation time counter value stored in the accumulation time counter 504 is incremented by 1 and it is determined whether or not the measuring termination operation (pressing the switch SW2 for more than 1 second) is performed. If the decision is negative (NO), it is then determined from the incremented value of the accumulation time counter 504 whether the time of accumulating the light intensity of the ultraviolet band exceeds a predetermined time (e.g., 12 hours). If the time does not exceed the predetermined time, this routine is repeated to continue the accumulation of the light intensity.

Individual data stored and updated in the registers 521 and 522 are displayed on the liquid crystal display section 60 in the main routine, as described earlier.

Figure 31:
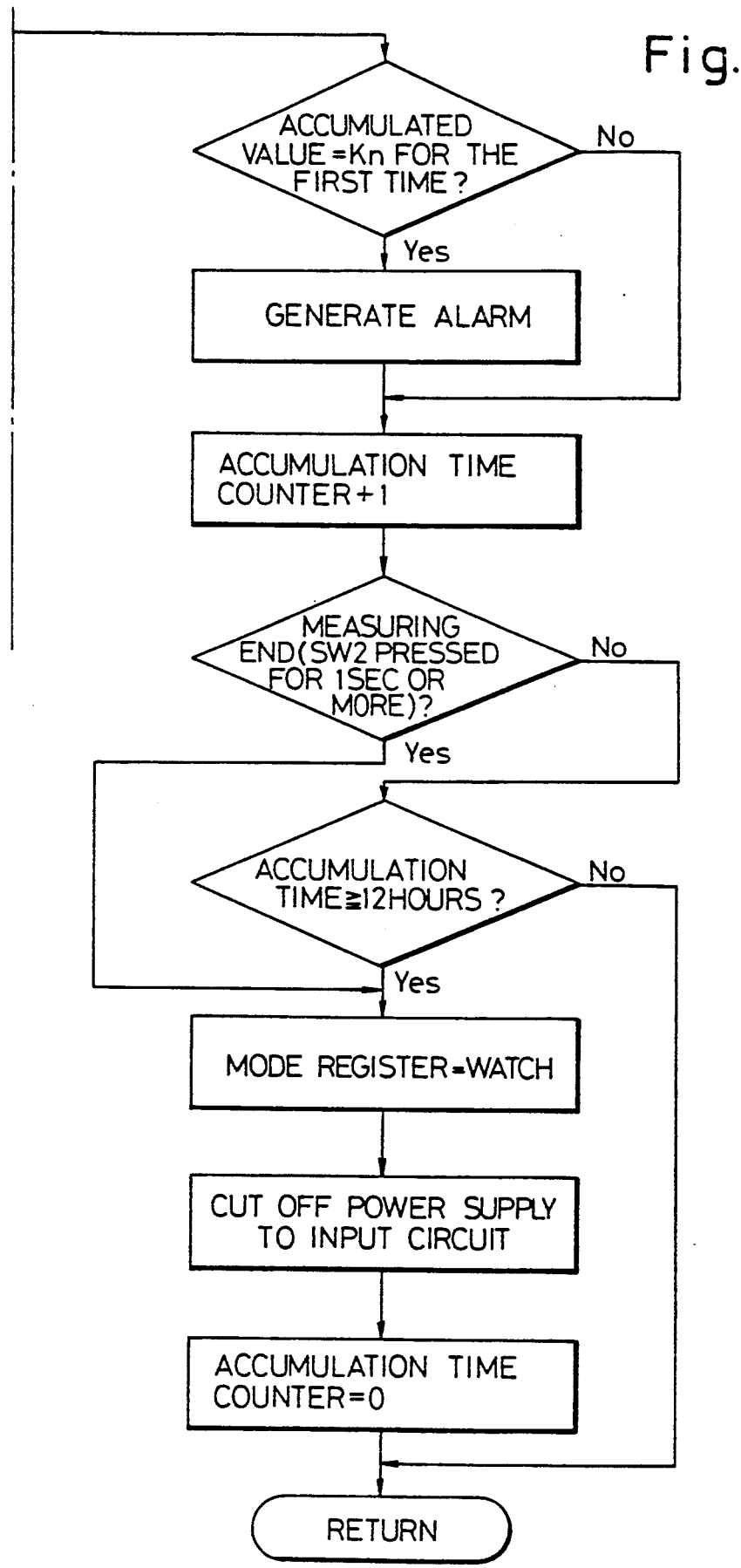
FIG. 31 is a diagram showing a correlation table for providing the degree of skin inflammation from the accumulated value of the light intensity and the skin type.

FIG. 31 illustrates a correlation table between the skin types and accumulated values of light intensity J, K, L, M, . . . . As in the correlation table between the skin types and light intensities shown in FIG. 28, information about the degree of danger and sunburn to skin is registered in each blank. For instance, the information indicates that for a certain type of skin, exposure to light of the ultraviolet band with a certain level or greater of accumulated intensity is likely to advance sunburn to the dangerous degree. In other words, the information represents a numeral that informs the user that some measures should be taken to prevent sunburn. Confirming the numeral on the liquid crystal display section 60, the user can understand the meaning of the numeral read from the correlation table.

The individual registers 521 and 522 have a hold function to hold the previous measuring results unless a new measuring process is initiated, as described earlier. This can permit the user to display the amount of irradiation exposure from a previous day on the display section 60, as needed.

Upon initiation of the measuring termination operation or upon lapse of the predetermined time (12 hours), the mode specified by the switch SW1 is set back to the watch mode and the outputting of the control signal P1 from the power-saving circuit 503 is stopped to cut off the power to the input circuit section 40. Further, the value of the accumulation time counter 505 is reset to zero and this routine is terminated. This can prevent the input circuit section 40 having large power dissipation from being left activated for a long period of time, providing a significant power-saving effect.

In the accumulation mode, as described above, since the accumulated value of the light intensity of the ultraviolet band, Xa, is displayed as a digital numeral as well as a bar graph, the actual degree of sunburn can be determined in contrast to the total amount of the irradiated light of the ultraviolet band and the user can promptly use a cosmetic with the proper SPF value to prevent further excessive sunburn.

MED Multiple Mode M4

Figure 32:
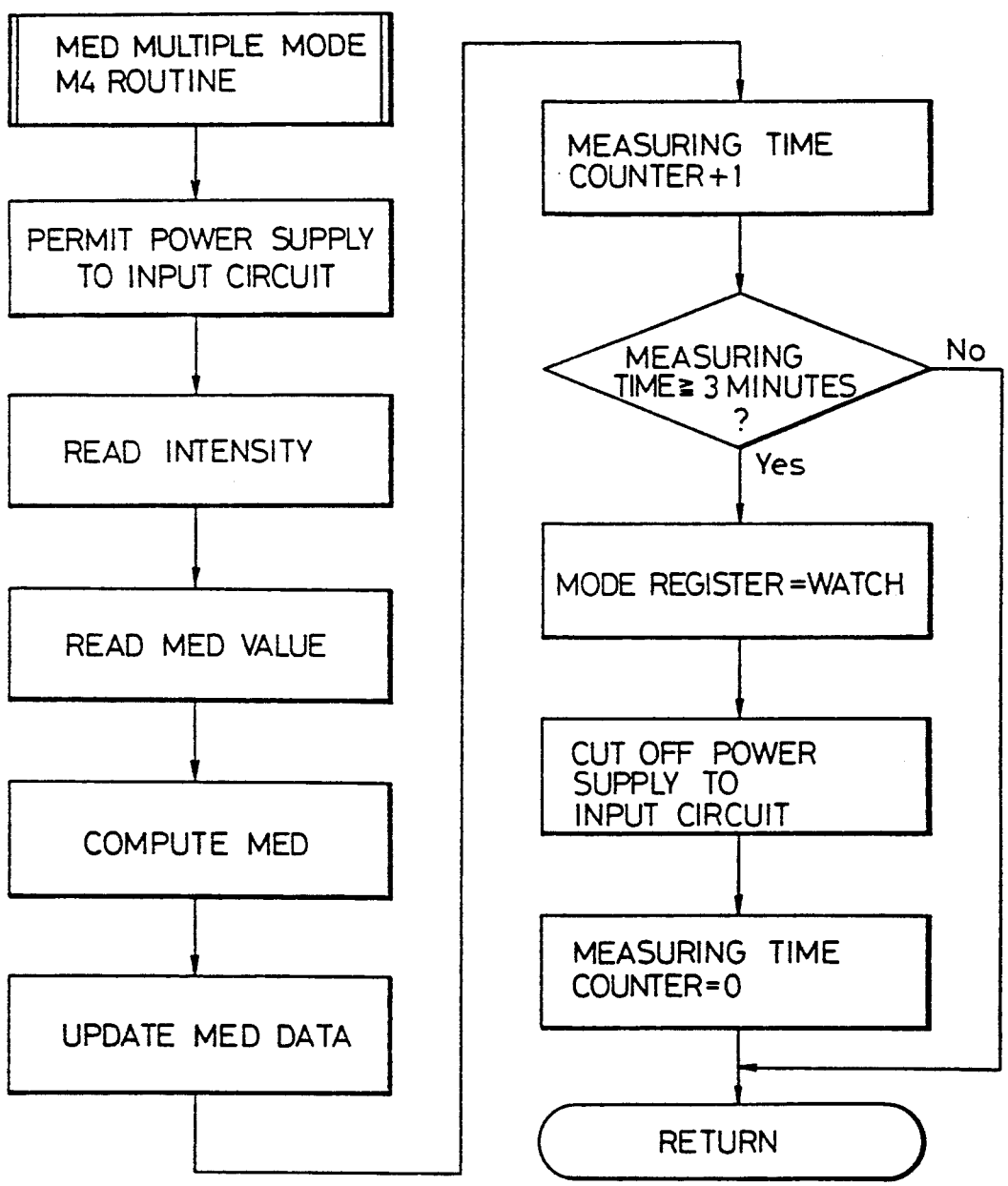
FIG. 32 is a flowchart illustrating the arithmetic operation sequence in a routine in MED multiple mode executed by the arithmetic operation circuit section 50 shown in FIG. 5.

When the MED multiple mode is selected by pressing the first switch SW1 a predetermined number of times, the routine shown in FIG. 32 is repeatedly executed for each predetermined period (0.5 second) mentioned above. This MED multiple mode is for predicting, from the measured light intensity of the ultraviolet band, Xs, how many times the reference MED value the total amount of irradiated light of the ultraviolet band to which the user will be exposed corresponds to if the user keeps bathing in light of the ultraviolet band with the same intensity for a predetermined period of time (e.g., 1 hour).

First, when the MED multiple mode is selected by pressing of the first switch SW1, the power-saving circuit 503 outputs the control signal P1 to permit the power to be supplied to the input circuit section 40. The intensity computing circuit 501 computes the light intensity of the ultraviolet band, Xs, and sends it to the MED computing circuit 508. The MED computing circuit 508 computes a MED multiple value from the following equation (4) using the received light intensity Xs and the reference MED value Xsm stored in the MED value memory 506.

$$\text{MED multiple value} = (Xs \times Tm)/Xsm \quad (4)$$

Tm is a predetermined time and is set to, for example, 3600 seconds (1 hour). As should be obvious from the equation (4), the computed MED multiple value indicates how many times the reference MED value (90,000 J/m$^2$) to which the user is exposed upon lapse of 1 hour. The reference MED value (90,000 J/m$^2$) used in the equation (4) may also take the proper value depending on the skin type of the user (type of the skin, the race, etc.).

The MED multiple value computed by the MED computing circuit 508 is stored and updated in the MED multiple data register 526. The value stored in the intensity measuring time counter 502 is incremented by 1 and it is determined from the incremented value whether or not the time of measuring the light intensity of the ultraviolet band exceeds a predetermined time (e.g., 3 minutes). If the measuring time does not exceed the predetermined time, this routine is repeated in order to continue the computation of the light intensity Xs and MED multiple value. If another mode is selected in the main routine before the measurement time reaches the predetermined time, the power is cut off and the measurement time counter is reset to zero, thus terminating the measurement operation.

The MED multiple value stored and updated in the MED multiple data register 526 is displayed on the liquid crystal display section 60 by executing the main routine, as described earlier. At this time, the MED multiple value may be displayed in the digital numeral display section 4a digitally or in the bar graph display section 4b as a bar graph in multi-step manner. Since the MED multiple value and bar graph displayed on the display sections are a multiple value of the reference MED value stored in association with the types of skin, the user can quickly determine if sunburn is excessively progressing or the degree of the sunburn from the numeral or bar graph displayed on the display section of this apparatus.

Upon lapse of the predetermined time (3 minutes), the mode specified by the switch SW1 is set back to the watch mode and the outputting of the control signal P1 from the power-saving circuit 503 is stopped to cut off the power to the input circuit section 40. Further, the value of the intensity measuring time counter 502 is reset to zero and this routine is terminated.

Accumulated MED Multiple Mode

Figure 33A:
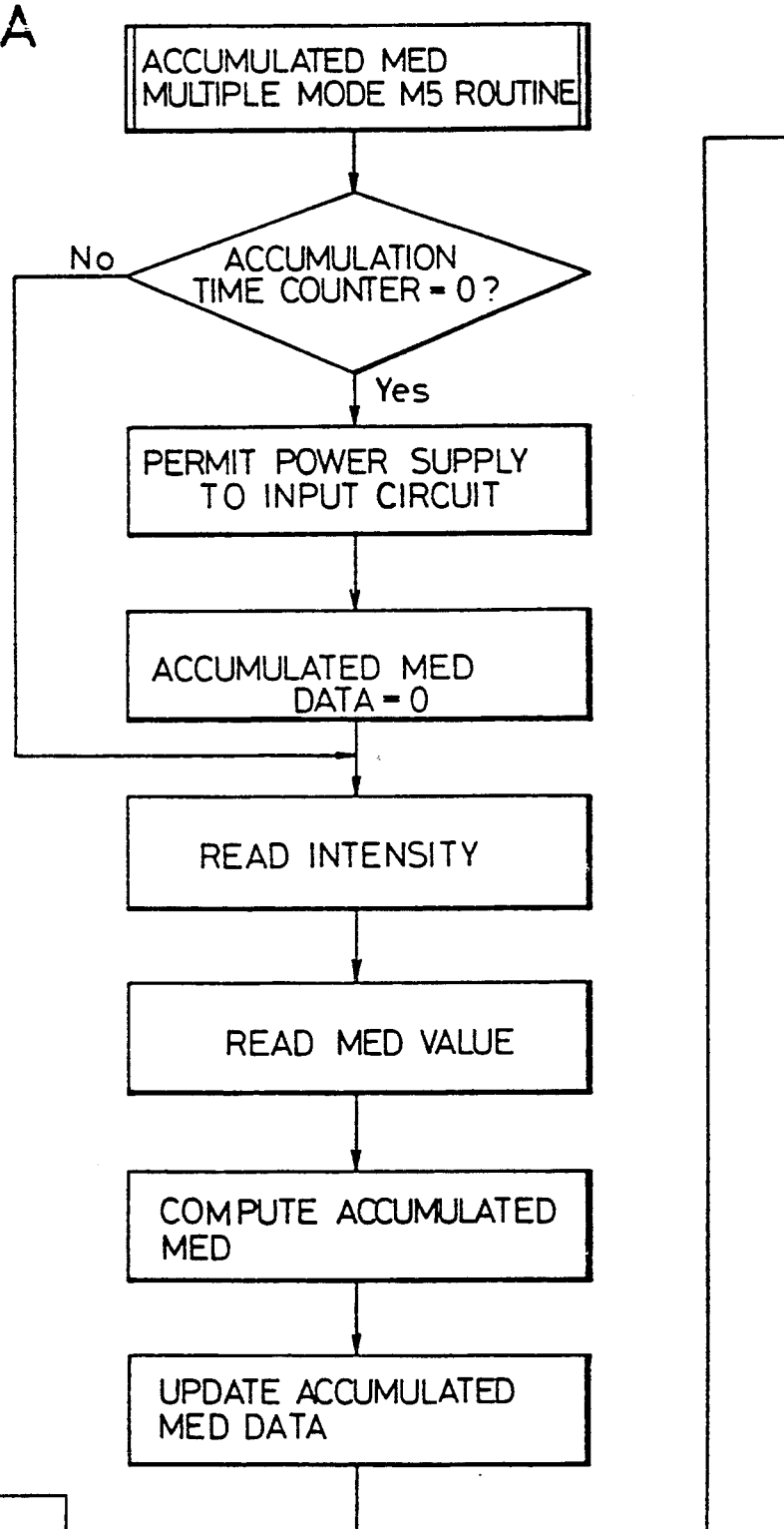
FIGS. 33A and 33B are flowcharts illustrating the arithmetic operation sequence in a routine in accumulated MED multiple mode executed by the arithmetic operation circuit section 50 shown in FIG. 5.
Figure 33:
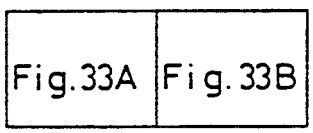
Figure 33B:
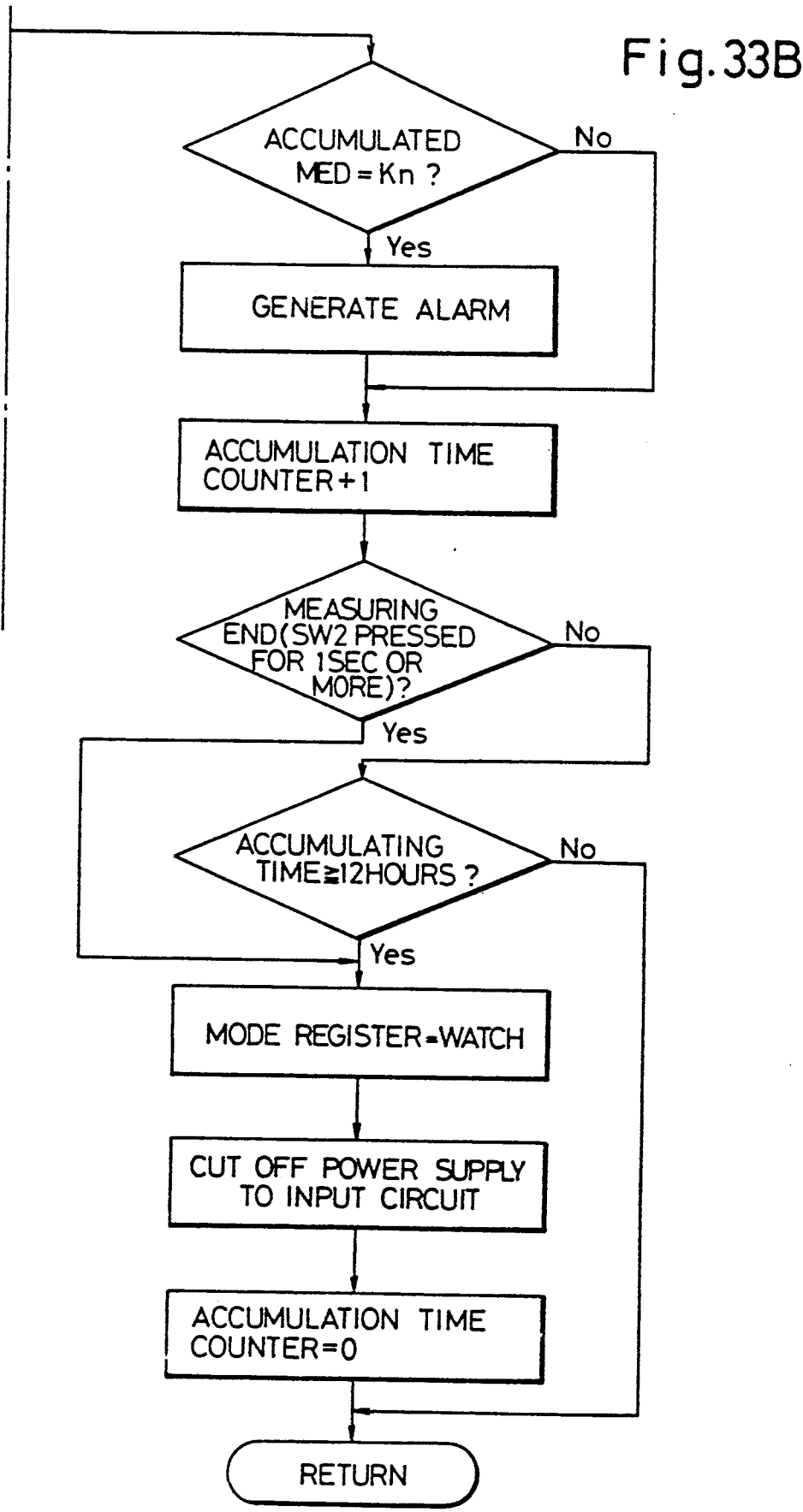

When the accumulated MED multiple mode M5 is selected by pressing the first switch SW1 a predetermined number of times, the M5 routine shown in FIG. 33 is repeatedly executed for each predetermined period (0.5 second). This routine is for indicating how many times the reference MED value the accumulated value of the light intensity of the ultraviolet band is.

When the accumulated MED multiple mode is selected by pressing the first switch SW1, first, it is determined whether or not the value of the accumulation time counter 504 is 0. Since this count value is 0 (the decision being affirmative) immediately after the selection of this mode, the power-saving circuit 503 permits the power to be supplied to the input circuit section 40 and resets the content of the accumulated MED multiple data register 527 to 0. Once such a process is executed, the value of the accumulation time counter becomes greater than 0, so that the process will not be executed again until the termination operation is initiated by the operation of the switch SW2 or this routine is automatically terminated. If another mode (e.g., watch mode or intensity mode) is executed during execution of this routine, therefore, the accumulating routine continues.

The intensity computing circuit 501 computes the light intensity of the ultraviolet band, Xs, and sends it to the MED value computing/accumulating circuit 514, as per the case of the intensity mode. The circuit 514 computes an accumulated MED multiple value from the following equation (5) using the received light intensity Xs and the reference MED value Xsm stored in the MED value memory 506.

$$\text{Accumulated MED multiple value} = \Sigma Xs/Xsm \quad (5)$$

ΣXs is a value obtained by sequentially adding the light intensity of the ultraviolet band, Xs, computed for each predetermined time (0.5 second). As should be obvious from the equation (5), the accumulated MED multiple value computed indicates how many times the reference MED value (90,000 J/m$^2$) of light of the ultraviolet band to which the user has been exposed up to the present time. The reference MED value (90,000 J/m$^2$) used in the equation (5) may also take the proper value depending on the skin type of the user.

The accumulated MED multiple value computed by the computing/accumulating circuit 514 is stored and updated in the accumulated MED multiple data register 527, and is also sent to the comparator 513 for comparison with a predetermined value $k_a$. When it is detected for the first time that the accumulated MED multiple value computed has exceeded the predetermined value $k_a$, the buzzer 70 is activated by the alarm control circuit 523 to generate an alarm. This can inform the user that the amount of irradiation exposure has reached a dangerous degree.

The value stored in the accumulation time counter 504 is incremented by 1 and it is determined whether or not the operation for terminating the measuring operation (pressing the switch SW2 for 1 second or more) is initiated. If the decision is NO, it is then determined from the incremented counter value whether or not the time of accumulating the light intensity of the ultraviolet band exceeds a predetermined time (12 hours). If the time does not exceed the predetermined time, this routine is repeated to continue the computation of the accumulated MED multiple value.

The accumulated MED multiple value stored and updated in the accumulated MED multiple data register 527 is displayed on the liquid crystal display section 60 by executing the main routine, as described earlier. At this time, the accumulated MED multiple value may be displayed in the digital numeral display section 4a digitally or in the bar graph display section 4b as a bar graph in multi-step manner. Since the accumulated MED multiple value and bar graph displayed on the display sections are a multiple value of the reference MED value stored in association with the types of skin, the user can quickly determine if sunburn is excessively progressing or the degree of the sunburn from the numeral or bar graph displayed on the display section of this apparatus.

Upon initiation of the measuring termination or upon lapse of the predetermined time (12 hours), the mode specified by the switch SW1 is set back to the watch mode and the outputting of the control signal P1 from the power-saving circuit 503 is stopped to cut off the power to the input circuit section 40. Further, the value of the accumulation time counter 504 is reset to zero and this routine is terminated.

SPF Mode M6

Figure 34:
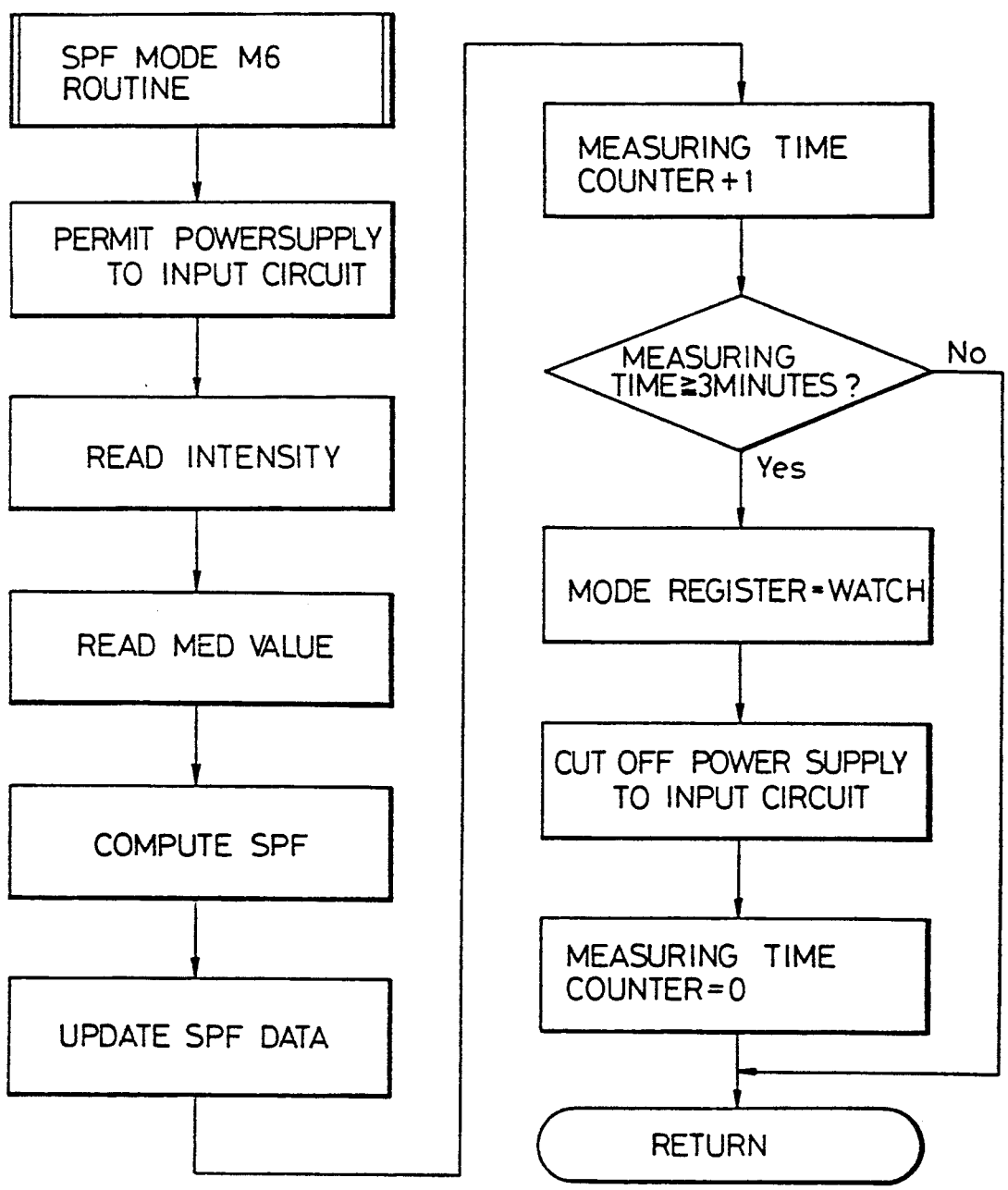
FIG. 34 is a flowchart illustrating the arithmetic operation sequence in a routine in SPF mode executed by the arithmetic operation circuit section 50 shown in FIG. 5.

When the SPF mode is selected by pressing the first switch SW1 a predetermined number of times, the routine shown in FIG. 34 is repeatedly executed for each predetermined period (0.5 second) mentioned above. This SPF mode is for indicating, from the measured light intensity of the ultraviolet band, Xs, what SPF value cosmetic should be used in order to avoid sunburn (the aforementioned "slight erythem") even if the user continues exposure to light of the ultraviolet band with the same intensity for a predetermined period of time (e.g., 1 hour).

First, when the SPF mode is selected by pressing the first switch SW1, the power-saving circuit 503 permits the power to be supplied to the input circuit section 40. The intensity computing circuit 501 computes the light intensity of the ultraviolet band, Xs, and sends it to the SPF value computing circuit 507 as in the case of the intensity mode. The SPF value computing circuit 507 computes an SPF value from the following equation (6) using the received light intensity Xs and the reference MED value Xsm stored in the MED value memory 506.

$$\text{SPF value} = (Xs \times Tm)/Xsm \quad (6)$$

Tm is the aforementioned predetermined time and is set to, for example, 3600 seconds (1 hour). As should be obvious from the equation (6), the computed SPF value indicates how many times the reference MED value (90,000 J/m$^2$) the total amount of irradiated light of the ultraviolet band the user will be exposed to becomes upon lapse of 1 hour. The reference MED value (90,000 J/m$^2$) used in the equation (6) may also take the proper value depending on the skin type of the user.

The SPF value computed by the SPF value computing circuit 507 is stored and updated in the SPF data register 524. The value stored in the intensity measuring time counter 502 is incremented by 1 and it is determined from the incremented value of the intensity measuring counter 501 whether or not the time of measuring the light intensity of the ultraviolet band exceeds a predetermined time (e.g., 3 minutes). If the measuring time does not exceed the predetermined time, this routine is repeated to continue the computation of the light intensity Xs and SPF value. If another mode is selected in the main routine before the measurement time reaches the predetermined time, the power is cut off and the measurement time counter is reset to zero, thus terminating the measurement operation.

The SPF value stored and updated in the SPF data register 524 is displayed on the liquid crystal display section 60 by executing the main routine, as described earlier. At this time, the SPF value may be displayed in the digital numeral display section 4a digitally or in the bar graph display section 4b as a bar graph in multi-step manner. Since the SPF value displayed on the display section directly represents an SPF value of a cosmetic necessary to prevent sunburn, it is very convenient for the user.

Upon lapse of the predetermined time (3 minutes), the modes specified by the switch SW1 is set back to the watch mode and the outputting of the control signal P1 from the power-saving circuit 503 is stopped to cut off the power to the input circuit section 40. Further, the value of the intensity measuring time counter 502 is reset to zero and this routine is terminated.

Accumulated SPF Mode

Figures 35, 35A:
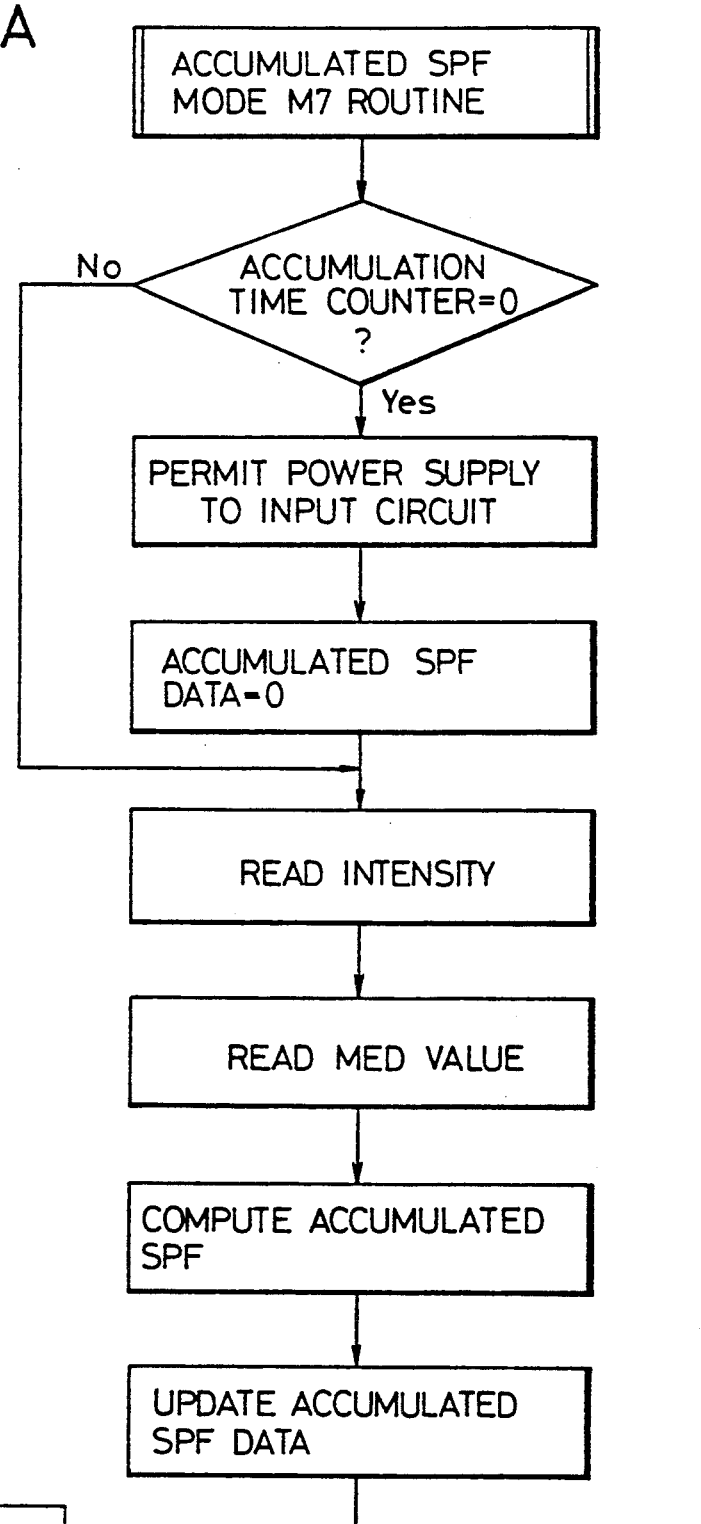
FIGS. 35A and 35B are flowcharts illustrating the arithmetic operation sequence in a routine in accumulated SPF mode executed by the arithmetic operation circuit section 50 shown in FIG. 5.
Figure 35B:
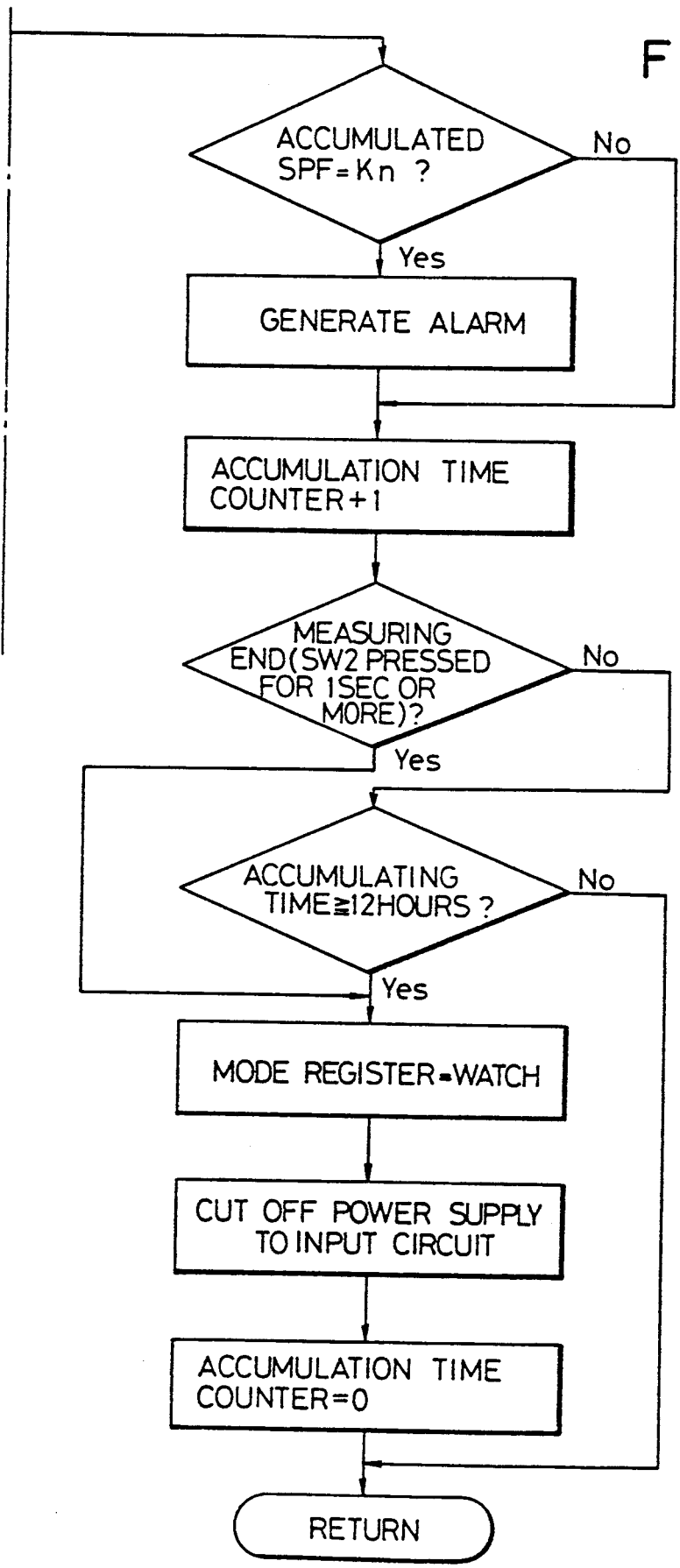

When the accumulated SPF mode M7 is selected by pressing the first switch SW1 a predetermined number of times, the M7 routine shown in FIG. 35 is repeatedly executed for each predetermined period (0.5 second). This routine is for indicating, from the accumulated value of the light intensity of the ultraviolet band, i.e., the total amount of the irradiated light of the ultraviolet band, what SPF value cosmetic should be used in order to avoid sunburn even if the user exposes himself to this amount of irradiation. For instance, this feature is convenient in determining a cosmetic to be used today from the amount of the irradiated ultraviolet ray exposure yesterday.

When the accumulated SPF mode is selected by pressing the first switch SW1, first, it is determined whether or not the value of the accumulation time counter 504 is 0. Since this count value is 0 (the decision being affirmative) immediately after the selection of this mode, the power-saving circuit 503 permits the power to be supplied to the input circuit section 40 and resets the content of the accumulated SPF data register 525 to 0. Once such a process is executed, the value of the accumulation time counter becomes greater than 0, so that the process will not be executed again until the termination operation is initiated by the operation of the switch SW2 or this routine is automatically terminated. If another mode (e.g., watch mode or intensity mode) is executed during execution of this routine, therefore, the accumulating routine continues.

The intensity computing circuit 501 computes the light intensity of the ultraviolet band, Xs, and sends it to the SPF value computing/accumulating circuit 512, as per the case of the intensity mode. The circuit 512 computes an accumulated SPF value from the following equation (7) using the received light intensity Xs and the reference MED value Xsm stored in the MED value memory 506.

Accumulated SPF value $= \Sigma Xs/Xsm$ (7)

$\Sigma Xs$ is a value obtained by sequentially adding the light intensity of the ultraviolet band, Xs, computed for each predetermined time (0.5 second). The reference MED value (90,000 J/m$^2$) used in the equation (7) may also take the proper value depending on the skin type of the user.

The accumulated SPF value computed by the computing/accumulating circuit 512 is stored and updated in the accumulated SPF data register 525, and is also sent to the comparator 511 for comparison with a predetermined value $k_b$. When it is detected for the first time that the accumulated SPF value computed has exceeded the predetermined value $k_b$, the buzzer 70 is activated by the alarm control circuit 523 to generate an alarm. This can inform the user that the amount of the light of the ultraviolet band irradiation to which the user has been exposed, has reached the amount of irradiation that requires the use of a cosmetic having a larger SPF value.

The value stored in the accumulation time counter 504 is incremented by 1 and it is determined whether or not the operation for terminating the measuring operation (pressing the switch SW2 for 1 second or more) is initiated. If the decision is NO, it is then determined from the incremented counter value whether or not the time of accumulating the light intensity of the ultraviolet band exceeds a predetermined time (12 hours). If the time does not exceed the predetermined time, this routine is repeated to continue the computation of the accumulated SPF value.

The accumulated SPF value stored and updated in the accumulated SPF data register 525 is displayed on the liquid crystal display section 60 by executing the main routine, as described earlier. At this time, the accumulated SPF value may be displayed in the digital numeral display section 4a digitally or in the bar graph display section 4b as a bar graph in multi-step manner. Since the accumulated SPF value displayed on the display section directly represents an SPF value of a cosmetic necessary to prevent sunburn, it is very convenient for the user.

Upon initiation of the measuring termination or upon lapse of the predetermined time (12 hours), the mode specified by the switch SW1 is set back to the watch mode and the outputting of the control signal P1 from the power-saving circuit 503 is stopped to cut off the power to the input circuit section 40. Further, the value of the accumulation time counter 504 is reset to zero and this routine is terminated.

Calibration Of The Apparatus

Figure 36:
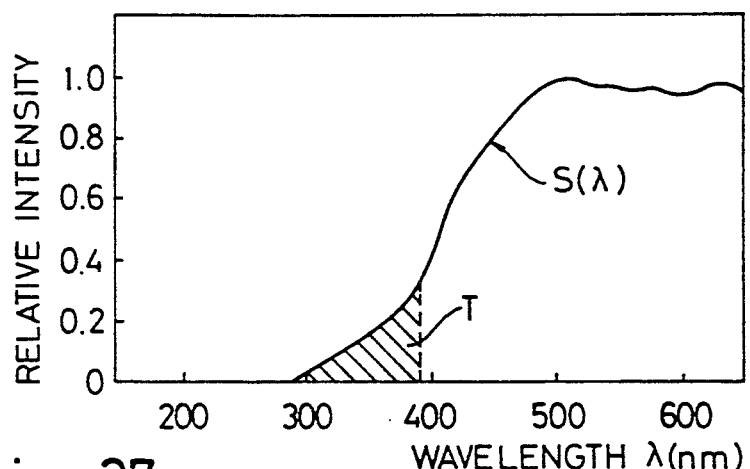
FIG. 36 is a graph illustrating a spectral distribution curve S (λ) of sunlight.

To measure the light intensity of the ultraviolet band is to integrate the relative intensity over the range from 180 to 390 μm of the wavelength (λ) in the spectrum distribution curve S(λ) of the sunlight as shown in FIG. 36.

Given that the integral is T, it is expressed as follows:

$$T = \int_{180}^{390} S(\lambda) d\lambda$$

and the integral is to acquire the area of the shaded portion in FIG. 36.

According to the present apparatus, the spectral transmittance of the second optical filter 30 used in the light-receiving section 3A has a mountain-like profile in the ultraviolet band as shown in FIG. 6, and has no specific boundary between the ultraviolet band and visible light band. Thus, the output obtained from the measurement apparatus is a value corresponding to an intensity integral value which corresponds to $$T' = \int_{180}^{390} R(\lambda) \cdot S(\lambda) d\lambda$$

where R(λ) is a relative spectral sensitivity of the measurement apparatus.

Figure 37:
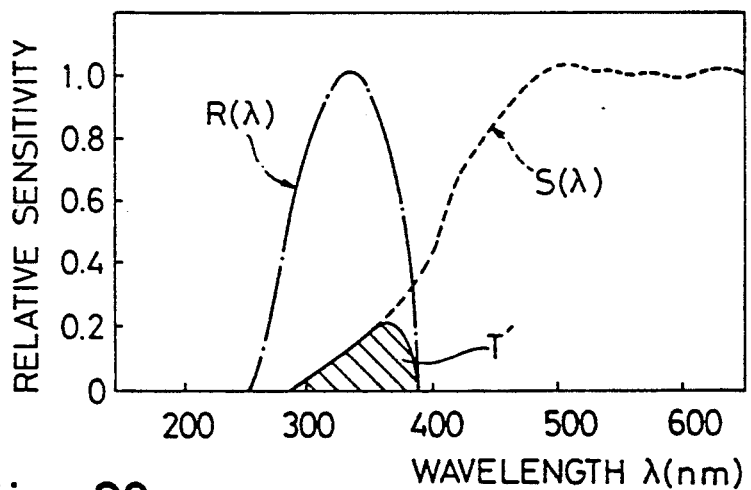
FIG. 37 is a graph illustrating the intensity (T') of ultraviolet rays of sunlight detected by the measuring apparatus shown in FIG. 5.

As indicated by the shaded portion in FIG. 37, T' is smaller than the area T in FIG. 36. The ratio T/T' is 1.39. In other words, if no compensation is performed in the present apparatus, of the shaded areas shown in FIGS. 36 and 37, that portion with the intensity corresponding to T−T' will not be measured.

In this respect, according to the present apparatus, the relative spectral sensitivity of the apparatus is multiplied by 1.39 to compensate the measurement.

Thus, $$T = 1.39 \times T' = \int_{180}^{390} 1.39 R(\lambda) S(\lambda) d\lambda$$

Letting $R'(\lambda) = 1.39 R(\lambda)$, then $$T = \int_{180}^{390} R'(\lambda) S(\lambda) d\lambda$$

Figure 38:
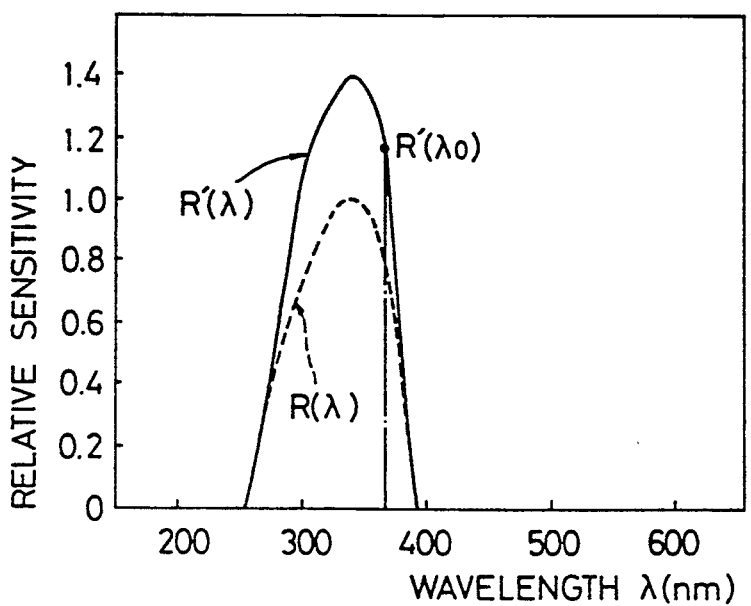
FIG. 38 is a graph illustrating a relative spectral sensitivity when the relative spectral sensitivity of the measuring apparatus is set to 1.39 times the actual value.

FIG. 38 shows a graph of the relative spectral sensitivity R' (λ).

In other words, if the output of the measuring apparatus is adjusted to correspond to the relative spectral sensitivity R' (λ) shown in FIG. 38, the value measured by the apparatus is compensated to be a value based on T, not T'.

Such compensation is executed by first selecting single-wavelength light with a predetermined wavelength $\lambda_0$ and a reference intensity $T_0$, then reading the relative spectral sensitivity (compensation coefficient) $R'(\lambda_0)$ at the value $\lambda_0$ from the graph shown in FIG. 38.

Then, the feedback variable resistor 404 of the input circuit section 40 is adjusted to control the gain of the amplifier 401 so that the measured intensity $T''$ when this single-wavelength light is irradiated onto the light receiver on the measuring side should satisfy the following equation:

$$T'' = R'(\lambda_0)T_0.$$

If the compensation is executed using single-wavelength having a wavelength of 365 nm and a reference intensity $T_0$, then it should be obvious from FIG. 38 that $R'(365) = 1.14$. Therefore, the gain of the amplifier has only to be controlled by the feedback variable resistor 404 to make the measured value equal to $1.14 \times T_0$. Finally, the same amount of the light of the sub-transmitting band with the proper intensity is irradiated on both light receivers and the feedback variable resistor 405 is adjusted to control the gain of the amplifier 402 so that the difference between the outputs of the light receivers becomes zero.

This compensating operation simply needs to be executed upon completion of assembling the present apparatus.

The aforementioned calibration of the apparatus value would be more accurate if the spectral transmittance of the second optical filter 30 used in the light-receiving section 3A for light of the ultraviolet band has a trapezoidal or recutangular profile, instead of the mountain-like one as shown in FIG. 6. At the present, however, there is no optical filter known which has the mentioned spectral transmittance for the wavelengths of the ultraviolet band. This trapezoid profile can however be provided by using a composite filter described below.

Figure 40:
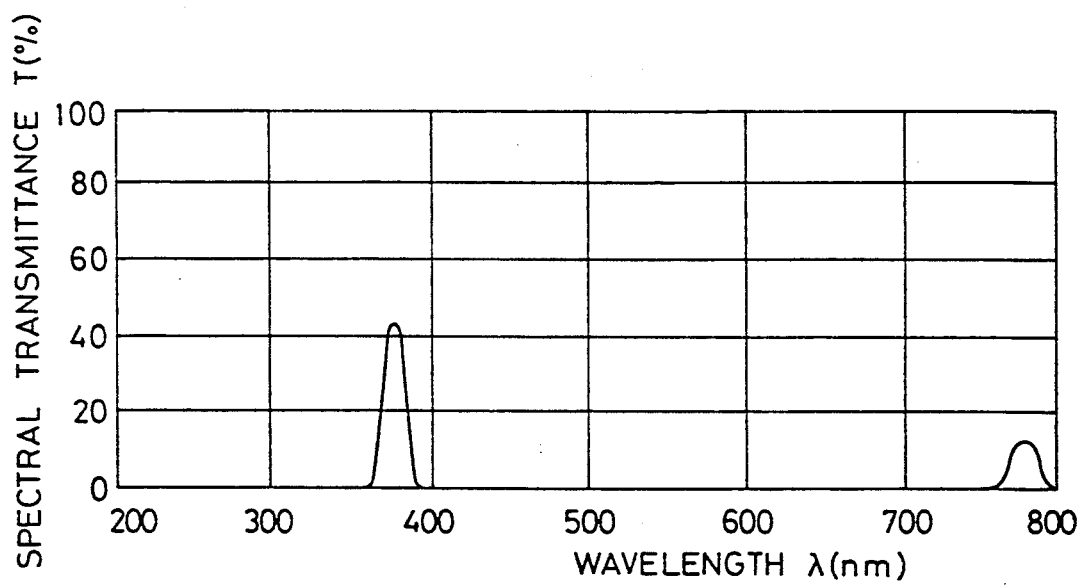
FIG. 40 is a graph illustrating the spectral transmittance of an interference filter of the apparatus shown in FIG. 39.

An interference filter having a main transmitting band with a half width of from 10 to 20 nm in the ultraviolet band and a low-order of a sub-transmitting band in the wavelength region twice as longer side as the ultraviolet band, as shown in FIG. 40, is formed integrally with a quartz diffusion plate or concave lens, which passes light of the ultraviolet band and is arranged in close contact on the light-receiving face of the interference filter, thereby providing a composite filter. This composite filter is used as the second optical filter.

The incident light to be quartz diffusion plate or quartz concave lens can be changed in evenly defused state by properly controlling the minute upheavals of the quartz diffusion plate or properly controlling the focus distance of the quartz concave lens. Accordingly, the light entering the diffusion plate or concave lens from an arbitrary direction would enter the interference filter at the back thereof at various incident angles.

Figure 41:
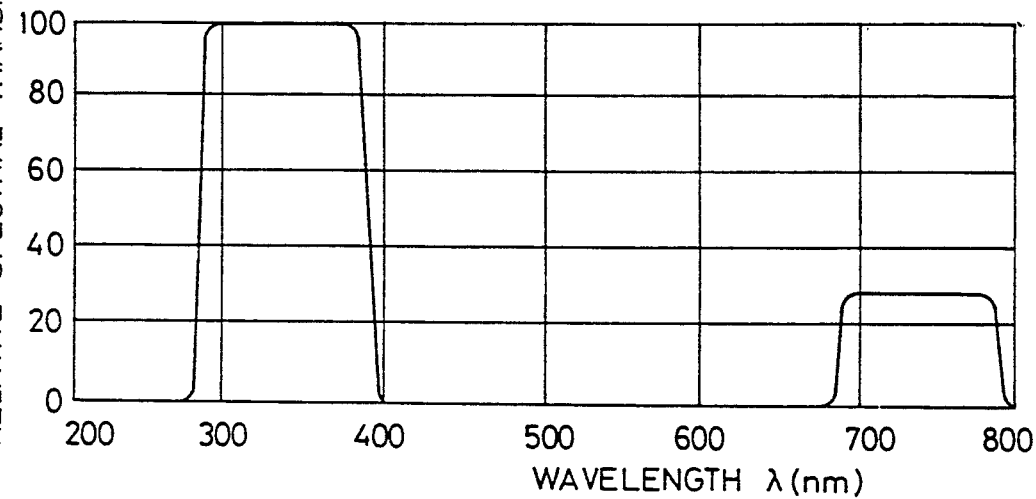
FIG. 41 is a graph illustrating a profile of a relative spectral transmittance of the composite filter of the apparatus.

Since the interference filter has such a characteristic that as the incident angle of light increases, the main transmitting band shifts toward the short wavelength side, the light which has been altered to have various incident angles by the quartz diffusion plate or quartz concave lens and has passed through the interference filter, has such a trapezoidal profile that the main transmitting band and the sub-transmitting band each have a trapezoidal shape extended toward the short wavelength side, as shown in FIG. 41.

In other words, light after passing this composite filter would have a trapezoidal profile, not a mountain-shaped one in the ultraviolet band. So does the spectral sensitivity of the apparatus which is based on that light.

Figure 39:
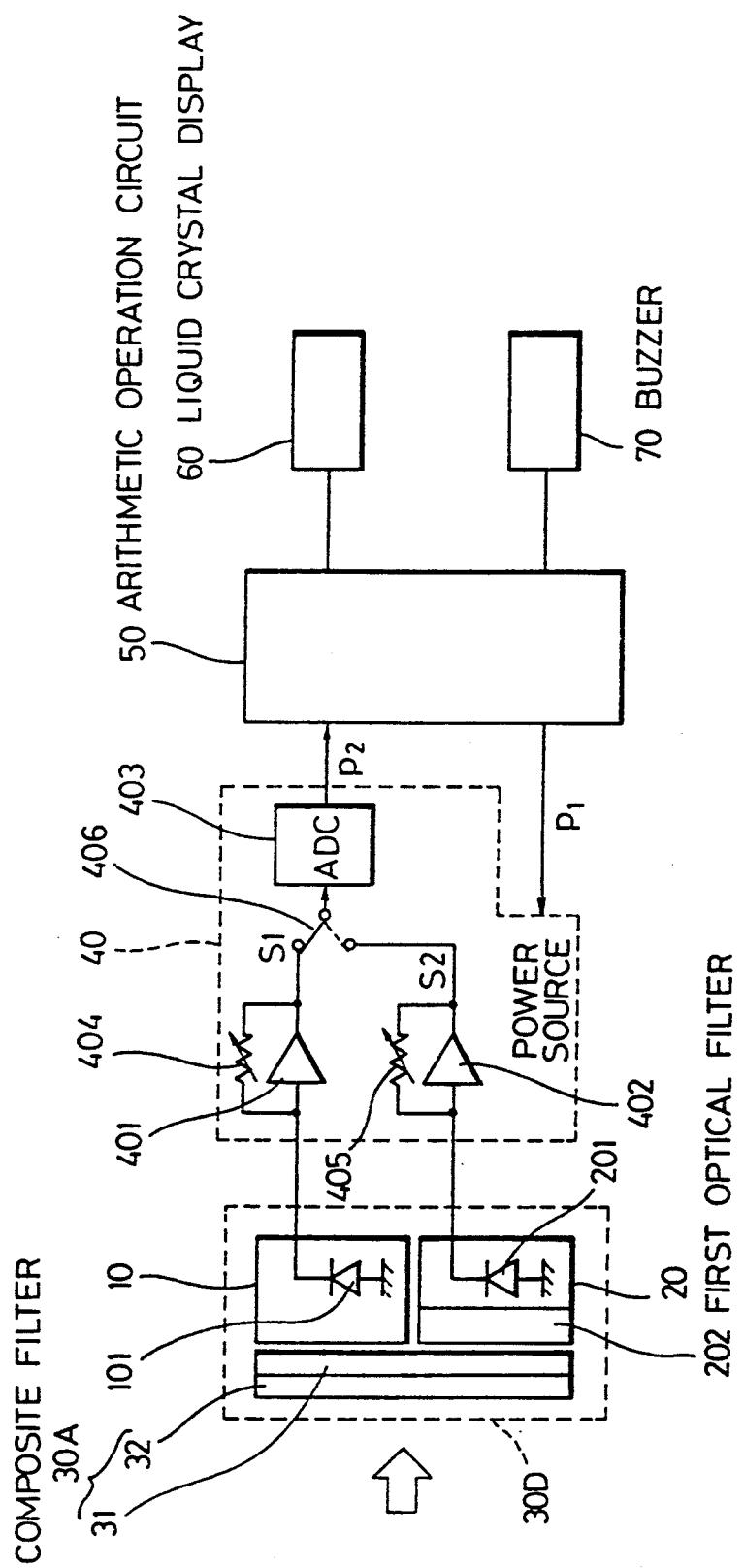
FIG. 39 is a block diagram illustrating the arrangement of a modification of the ultraviolet ray measuring apparatus in which a composite filter is used as the second optical filter.

FIG. 39 illustrates an ultraviolet ray measuring apparatus using such a composite filter 30A, which is arranged on the light-receiving faces of both light receivers 10 and 20 of a light-receiving section 3D.

This composite filter 30A comprises an interference filter 31 (IF-W, a product of Nippon Vacuum Optics Corporation) having a half width of 20 nm and a mean value of transmissible width of 390 nm, and a quartz diffusion plate 32, which is arranged in close contact on the light-receiving face of the former filter 31 and can evenly diffuse incident light within a range of from $-70°$ to $+70°$. This composite filter 30A passes ultraviolet rays of from 290 to 390 nm and light of the sub-transmitting band and shields light of the other bands. When the sunlight passes through the composite filter and enters the light receiver on the measuring side, an output corresponding to the light of the sub-transmitting band is approximately 150% of an output corresponding to the light of the ultraviolet band (main transmitting band). Referring to FIGS. 40 and 41, $\lambda$ is a wavelength, T a spectral transmittance, and RT a relative spectral transmittance.

Figure 42:
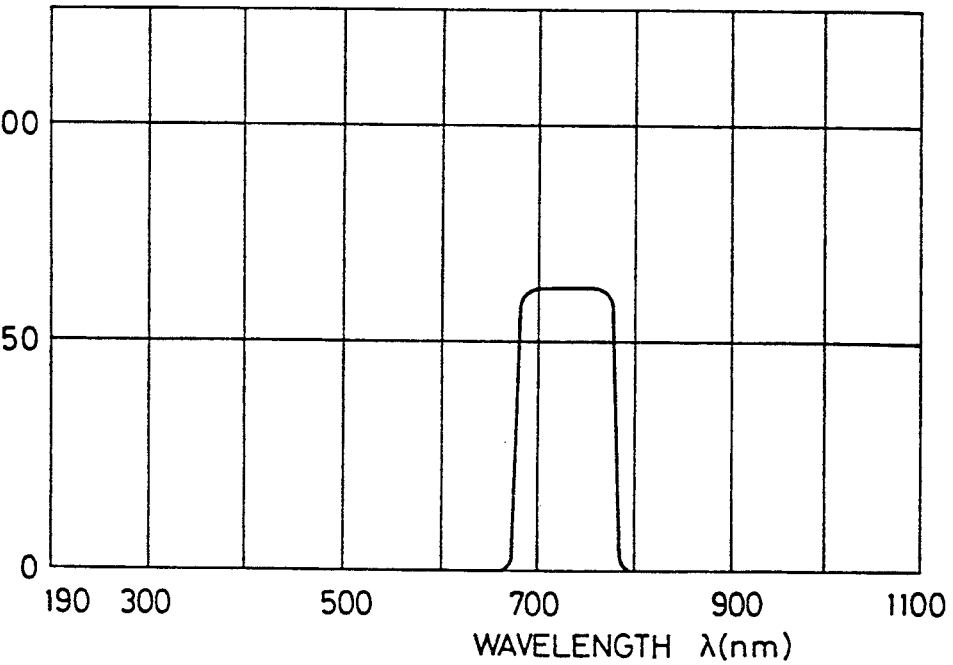
FIG. 42 is a graph illustrating a profile of a relative spectral sensitivity of a light receiver on the referring side of the apparatus.

In the light receiver 20 on the referring side, therefore, the composite filter 30A selectively passes only the light of the ultraviolet band and of the sub-transmitting band, each having a trapezoidal profile as shown in FIG. 41. Subsequently, only the light of the ultraviolet band is shielded by the first optical filter 202 arranged at the light-receiving face of the photodiode 201 of the light receiver 20, while the light of the sub-transmitting band reaches the photodiode 201, passing through this first optical filter 202. Then, with regard to the light of the sub-transmitting band, the light receiver 20 provides an output corresponding to a spectral sensitivity given by the product of the spectral sensitivity of the photodiode 201 and the spectral transmittances of the first optical filter 202 and the second optical filter or composite filter 30A. The relative spectral sensitivity in this case would be as shown in FIG. 42.

Figure 43:
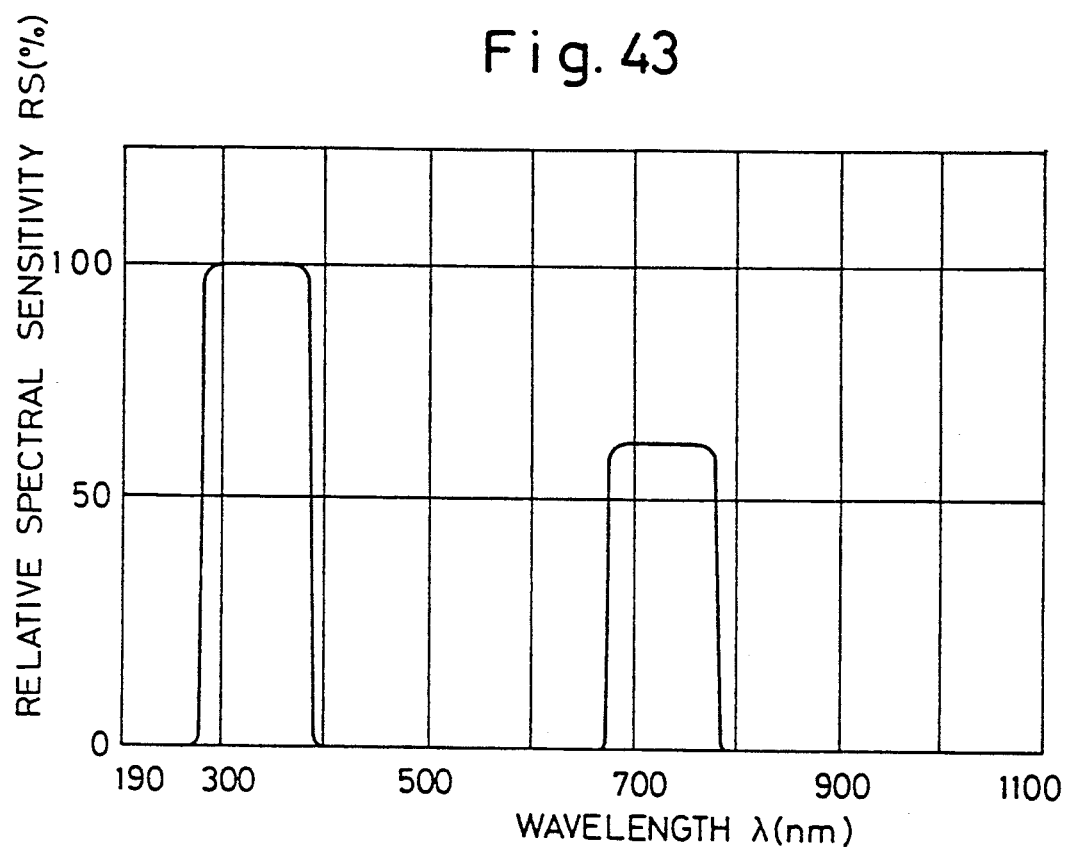
FIG. 43 is a graph illustrating a profile of a relative spectral sensitivity of a light receiver on the measuring side of the apparatus.

In the light receiver 10, on the other hand, the light of other bands than the ultraviolet band and the sub-transmitting band is shielded by the composite filter 30A, and the light with the profile as shown in FIG. 41 reaches the photodiode 101. Then, the light receiver 10 outputs a signal corresponding to a spectral sensitivity given by the product of the spectral sensitivity of the photodiode 101 and the spectral transmittance of the composite filter 30A. The relative spectral sensitivity in this case would be as shown in FIG. 43.

Figure 44:
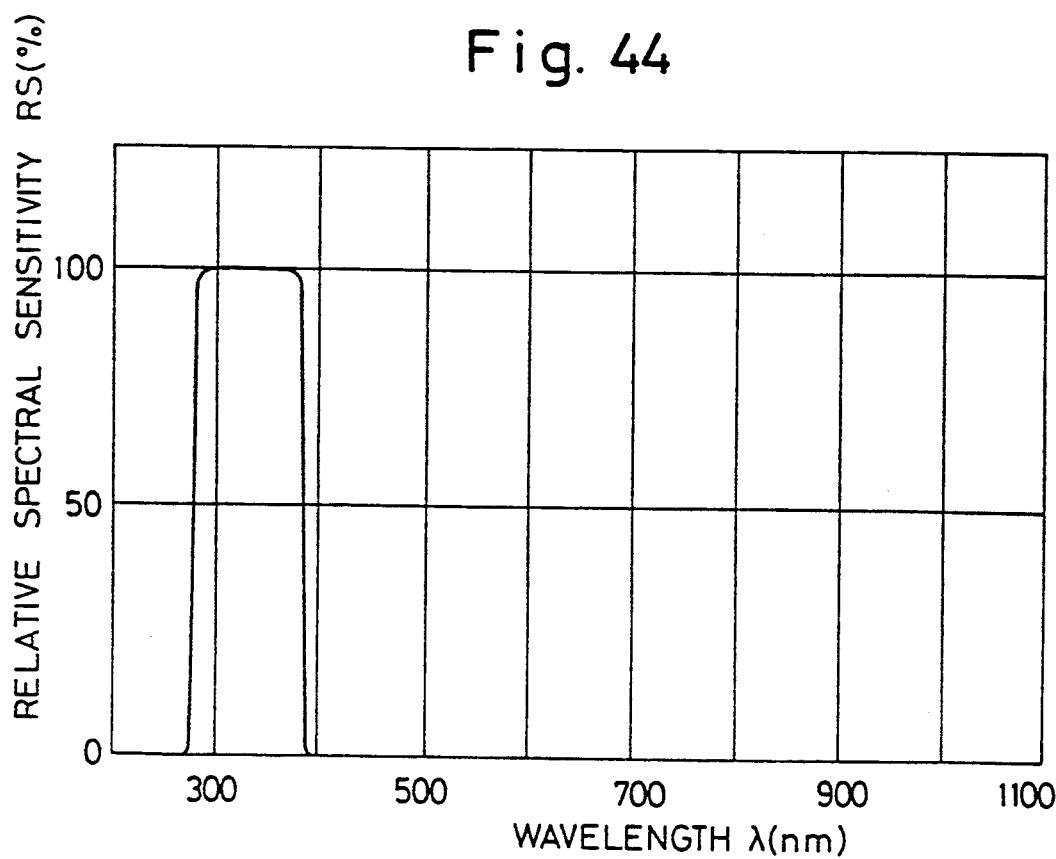
FIG. 44 is a graph illustrating a profile of the difference between the relative spectral sensitivities of the light receivers on the measuring and referring sides.
Figure 45:
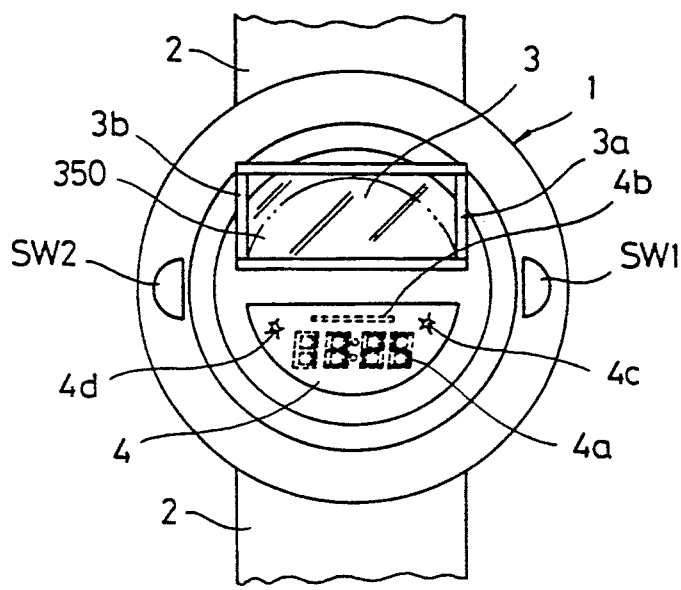
FIG. 45 is a plan view of an ultraviolet ray measuring apparatus with a light transmitting plate mounted thereto.

The difference between the outputs from the light receivers 10 and 20 is based only on the light of the ultraviolet band since the output based on the spectral sensitivity originated from the light of the sub-transmitting band is canceled. The difference would be an output based on the relative spectral sensitivity as shown in FIG. 44. In order to obtain the difference between the outputs of the individual light receivers, therefore, these outputs are amplified by an input circuit section 40 located at the subsequent stage, then are sent to the arithmetic operation circuit section 50 after A/D conversion to thereby provide the light intensity of the ultraviolet band.

In this apparatus, since the above-described composite filter is arranged on the light-receiving face, the relative spectral sensitivity of the apparatus has a trapezoidal profile, as shown in FIG. 44, not a mountain-shaped one. Therefore, the integral value of the intensity relating to the wavelength will not be a value which covers the shaded portion T' shown in FIG. 37, but a value which covers all the shaded portion T in FIG. 36, thus providing a more accurate measured value.

In the above embodiment, the reference MED value necessary to provide a bar graph display of the intensity of the ultraviolet rays and compute the MED multiple value, is set in advance in the MED value memory 506. Instead of using such a preset value, however, a design modification may be made so that the desired value can be input by the operation of the first and second switches SW1 and SW2. The MED value in this case may be input by a method similar to the one described with reference to the aforementioned time adjustment.

In selecting a cosmetic to be put on the skin in order to prevent excessive sunburn, one may wish to know information about what SPF value the cosmetic should have. Further, cosmetic manufacturers need to measure the SPF values when developing cosmetics, and need in some cases to indicate the SPF values to customers, which may contribute to sales of the cosmetics.

In the above case, it is very advantageous and effective if the SPF value of a cosmetic can be presented while ultraviolet rays are being measured by the ultraviolet ray measuring apparatus.

FIGS. 45 through 48 illustrate an improvement of the ultraviolet ray measuring apparatus shown in FIG. 5 which is made to meet the above demand; in the improved apparatus, a light transmitting plate, which has a light transmitting band at least in the ultraviolet band and is adapted to be applied with an ultraviolet-ray shielding agent thereon when in use, is detachably arranged in front of the light-receiving face of the apparatus.

Figure 46:
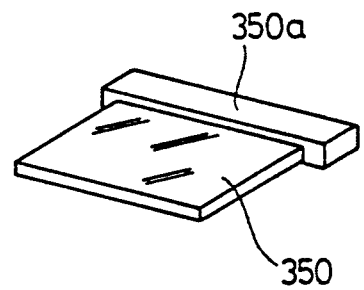
FIG. 46 is a perspective view of the light transmitting plate.
Figure 47:
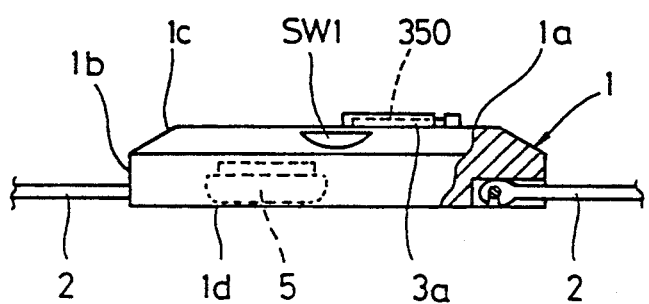
FIG. 47 is a partly cross-sectional side view of the ultraviolet ray measuring apparatus with the light transmitting plate mounted thereto.
Figure 48:
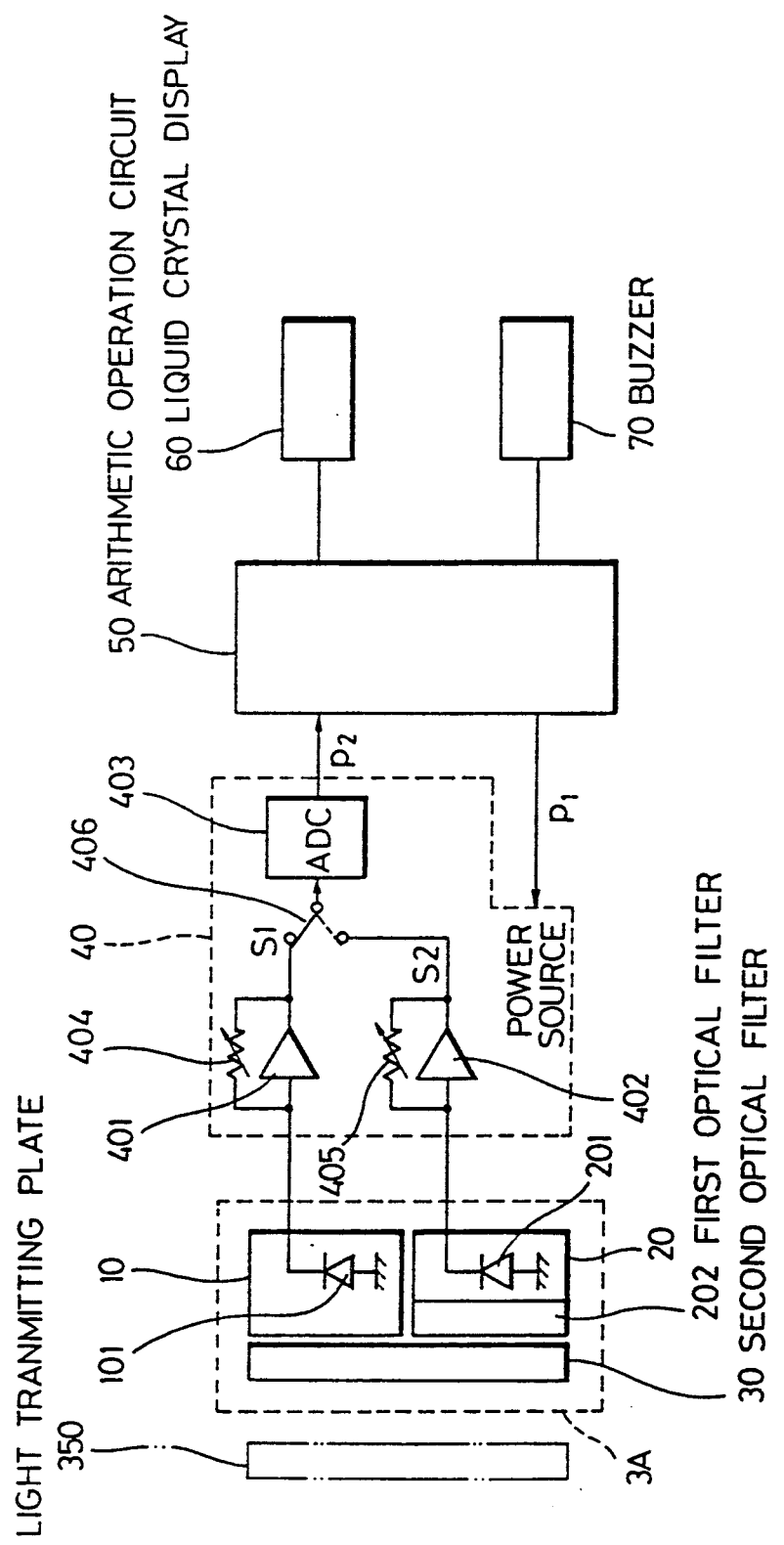
FIG. 48 is a block diagram illustrating the arrangement of the ultraviolet ray measuring apparatus with the light transmitting plate mounted thereto.
Figure 49:
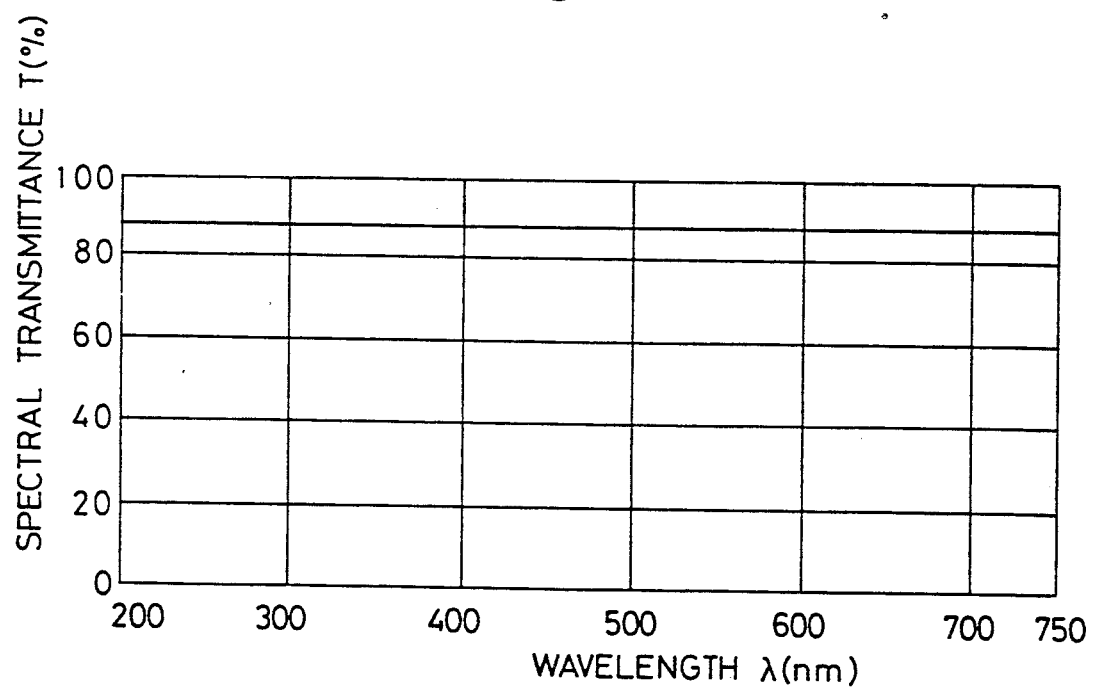
FIG. 49 is a graph illustrating the spectral transmittance of the light transmitting plate.

More specifically, U-shaped rubber frames 3a and 3b each having a groove formed in the lengthwise direction are attached to both sides of the light-receiving face 3 of the container 1, and a light transmitting plate 350 as shown in FIG. 46 is placed in detachable manner in the grooves. The light transmitting plate 350 has a transmitting band at least in the ultraviolet band and may be a quartz plate having the spectral transmittance as shown in FIG. 49, for example. When the SPF value of a cosmetic needs to be measured, this cosmetic is applied to the glass surface of the light transmitting plate 350, then attached to the rubber frames 3a and 3b. To measure the light intensity of the ultraviolet band or the like when no cosmetic is to be used, the user should detach this light transmitting glass 350 from the grooves of the rubber frames 3a and 3b by pulling a stopper 350a, so that the sunlight can directly enter the light-receiving face.

Since the improved apparatus can permit the light transmitting plate to be detachably attached to the light-receiving face, if the user wants to know the SPF value of an ultraviolet-ray shielding agent or cosmetic sample, the user simply puts the sample on the light transmitting plate and attach the plate to the light-receiving face to measure the light intensity or the accumulated value of the light intensity. In this way, the user can easily obtain the SPF value of that cosmetic. That is, this apparatus can also be used as a simple SPF examining apparatus for cosmetics. With the light transmitting plate removed, this improved apparatus can serve as both an ultraviolet ray measuring apparatus and a sunburn monitor, and is very useful.

In the ultraviolet ray measuring apparatus of the embodiment shown in FIG. 5, as the optical filter 202 approximately 2.5-mm thick is arranged at the light-receiving face of the light-receiving element 201 in the light receiver 20, the angle of receiving the sunlight is not so wide.

Figure 50:
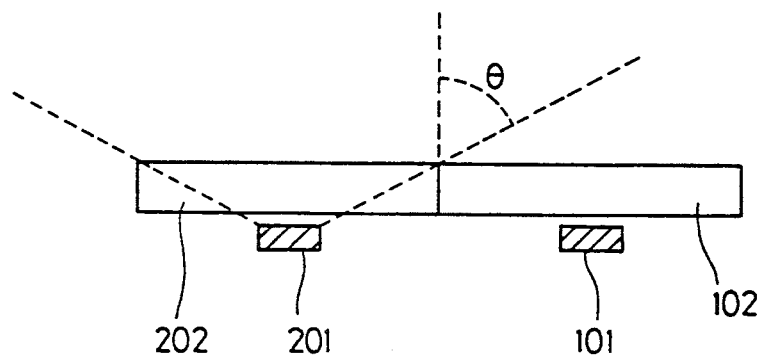
FIG. 50 is a schematic structural diagram for explaining the degree of the light-receiving angle of the apparatus shown in FIG. 5.

In other words, as illustrated in the schematic side cross section in FIG. 50, the light-receiving section on the referring side of this apparatus comprises the light-receiving element 201 and the optical filter 202 which is arranged on the light-receiving face of the element 201 and shields only light of the ultraviolet band, while the light-receiving section on the measuring side comprises the light-receiving element 101 and the quartz glass filter 102, which is arranged as a spacer at the light-receiving face of the element 101 and passes all the light. Accordingly, the light receiving angle of the light-receiving element 201 on the referring side is defined only by the thickness of the optical filter 202, and falls within the range indicated by the dotted lines in FIG. 50 with the side edge of the optical filter 202 being the boundary. The incident angle $\theta$ is about from 50° to 60°.

As the light receiving angle becomes narrower, the sunlight incident range which is unmeasurable gets wider. When the user wears this apparatus as, for example, a sunburn monitor, however, the sunlight incident angle varies depending on where the apparatus is worn, so that no measurement may be acquired depending on the location of the apparatus. The greater the light receiving angle, therefore, the more useful the apparatus is. In this respect, there is a strong demand of an ultraviolet ray measuring apparatus with a wider light receiving angle.

FIG. 51 illustrates the arrangement of an ultraviolet ray measuring apparatus with a wider sunlight incident range. This apparatus comprises a light-receiving section 3E provided with two light receivers 10 and 20B, the former on the measuring side and the latter on the referring side. The light receiver 10 is constituted by a light-receiving element 101, e.g., silicon photodiode, as in the apparatus shown in FIG. 5. The light receiver 20B comprises a light-receiving element 201, which may comprise a silicon photodiode having the same spectral sensitivity as the light-receiving element 101, and a thin resin layer 206 to cover the light-receiving face of the light-receiving element 201.

An optical filter 30 is arranged at the light-receiving faces of the two light receivers, i.e., the light-receiving face of the light-receiving element 101 used in the light receiver 10 and that of the thin resin layer 206.

The light-receiving elements 101 and 102 used in the light receivers 10 and 20B, like those used in the apparatus shown in FIG. 5, have a spectral sensitivity over a range extending from the ultraviolet band to the infrared band, as shown in FIG. 2. In contrast, the thin resin layer 206, coated on the light-receiving face of the light-receiving element 201 of the light receiver 20B by molding or the like, has a characteristic similar to the spectral transmittance property as shown in FIG. 3, and shields only the light of the ultraviolet band and passes light of other bands. This thin layer 206 can also serve as a protection film for the light-receiving element 201.

Such a resin may be an epoxy-based resin, polystyrene-based resin, polycarbonate-based resin, or acrylic-based resin (e.g., polymethyl methacrylate resin). In consideration of its function as a protection film for the light-receiving element 201, the thin layer 206 has a thickness of approximately from 300 to 600 μm.

The optical filter 30 commonly arranged at the light-receiving faces of the two light receivers is the same type as the one used in the apparatus shown in FIG. 5, and passes only the light of the ultraviolet band and the light of the sub-transmitting band in the wavelength range of from 650 to 1000 mm, and shields the light of the other bands.

In the light receiver 20B, therefore, the above optical filter selectively passes only the light of the profile as shown in FIG. 6, i.e., the light of the ultraviolet band and the light of the sub-transmitting band. Subsequently, only the light of the ultraviolet band is shielded by the thin resin layer 206, which cover the light-receiving face of the light-receiving element 201 of the light receiver 20B, and the light of the sub-transmitting band reaches the light-receiving element, passing through this thin resin layer 206. Then, with regard to the light of the sub-transmitting band, the light receiver 20B outputs a signal corresponding to a spectral sensitivity given by the product of the spectral sensitivity of the light-receiving element 201 and the spectral transmittances of the thin resin layer 206 and optical filter 30. The resultant spectral sensitivity is similar to the one shown in FIG. 7.

In the light receiver 10, on the other hand, light other than the light of the ultraviolet band and the light of the sub-transmitting band is shielded by the optical filter 30, and the light with the profile as shown in FIG. 6 reaches the light-receiving element 101. Then, the light receiver 10 provides an output corresponding to a spectral sensitivity given by the product of the spectral sensitivity of the light-receiving element 101 and the spectral transmittance of the optical filter 30. The resultant spectral sensitivity would be as shown in FIG. 8.

The difference between the outputs from the light receivers is based only on the light of the ultraviolet band since the output based on the spectral sensitivity originated from the light of the sub-transmitting band is canceled. The difference is based on a spectral sensitivity similar to the one shown in FIG. 9.

Figure 52:
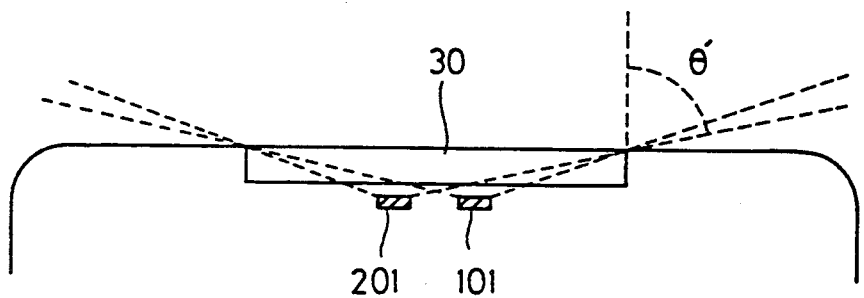
FIG. 52 is a schematic structural diagram for explaining the degree of the light-receiving angle of the apparatus shown in FIG. 51.

According to this apparatus, since the thin resin layer 206 is as significantly thin as from 300 to 600 μm, the light-receiving elements 201 and 101 can be arranged very close to the optical filter 30, as shown in FIG. 52. Moreover only one optical filter is arranged on both light-receiving elements. This can permit the distance between the light-receiving elements 201 and 101 to be shortened and permit the light-receiving angle to take the range indicated by the dotted lines in the FIG. 52 with the side edge of the optical filter 30 being a boundary. The incident angle θ' would be approximately from 70° to 80°. As a result, due to its very wide light-receiving angle, this apparatus when used as a sunburn monitor can measure the light intensity of the ultraviolet band irrespective of where the user wears it.

The apparatus of this invention can be worn by belts or a chain as in the case of a wrist watch or pendant, or may be attached to clothes by a clip or the like.

As the present apparatus has the above-described effects, it is suitable as a sunburn monitor. The apparatus can also be used in selecting a cosmetic such as an anti-sunburn cream or determining when to use it, or in checking the effect of cutting ultraviolet rays after putting this cosmetic on the light-receiving face. This apparatus may also be used to check or control the amount of exposure, uneven exposure, a variation in exposure with the time, etc. at the time when a fine pattern for a large scale integrated circuit or the like is formed using a semiconductor exposing apparatus. Further, the present apparatus may be used as an ultraviolet-ray monitor used for the keeping of materials, such as a printing material, which, when receiving light of the ultraviolet band, are likely to be adversely influenced. Furthermore, the present apparatus may be used by those workers who are likely to, be exposed to ultraviolet rays in order to monitor the ultraviolet rays.

What is claimed is:

1. An ultraviolet ray measuring apparatus comprising:
    first photoelectric converting means having a first light-receiving face and a spectral sensitivity at least in an ultraviolet band of light received from said first light-receiving face, for outputting an electric signal according to an intensity of received light;
    second photoelectric converting means having a second light-receiving face and substantially the same spectral sensitivity as said first photoelectric converting means, for outputting an electric signal according to an intensity of received light;
    first optical filter means, arranged in front of said second light-receiving face of said second photoelectric converting means, for shielding only light of at least a part of said ultraviolet band;
    second optical filter means, arranged in front of said first and second light-receiving faces and having a main transmitting band in said ultraviolet band and a sub-transmitting band on a longer wavelength side than said ultraviolet band, for passing only light having a wavelength of said main transmitting band and sub-transmitting band;
    means for receiving a light shielding substance, said receiving means comprising a light transmitting plate detachably arranged in front of said second optical filter means and having a transmitting band at least in said ultraviolet band, for passing light having a wavelength of said transmitting band;
    arithmetic operation means for computing at least a light intensity in accordance with a difference between said electric signals of said first and second photoelectric converting means; and
    display means for displaying a computation result supplied from said arithmetic operation means.

2. The ultraviolet ray measuring apparatus according to claim 1, wherein said display means displays said light intensity computed by said arithmetic operation means.

3. The ultraviolet ray measuring apparatus according to claim 2, which further comprises a correlation table showing degrees of skin inflammation which is probably caused when light with said light intensity of said ultraviolet band is kept bathed, in association with types of skins and light intensities of said ultraviolet band and information of a degree of skin inflammation is acquired from said correlation table based on said light intensity displayed by said display means and a type of a measurer's skin.

4. The ultraviolet ray measuring apparatus according to claim 1, wherein said arithmetic operation means includes accumulating means for accumulating computed light intensity for each lapse of a predetermined time, and said display means displays an accumulated value of the light intensities obtained by said accumulating means.

5. The ultraviolet ray measuring apparatus according to claim 4, which further comprises a correlation table showing degrees of skin inflammation which is probably caused when light with said accumulated value of the light intensity of said ultraviolet band is kept bathed, in association with types of skins and accumulated values of said light intensity of said ultraviolet band, and information of a degree of skin inflammation is acquired from said correlation table based on said accumulated value of said light intensity displayed by said display means and a type of a measurer's skin.

6. The ultraviolet ray measuring apparatus according to claim 1, wherein said display means comprises multistep bar graph display means having a plurality of light-emittable segments, so as to present a bar graph display of a computation result supplied from said arithmetic operation means, by lighting those segments which correspond to said computation result.

7. The ultraviolet ray measuring apparatus according to claim 6, wherein said display means further includes alarm means for generating an alarm every time one of said plurality of segments is lit.

8. The ultraviolet ray measuring apparatus according to claim 1, wherein said arithmetic operation means includes converting means for converting said computed light intensity into an index representing a relation between a degree of skin inflammation caused by exposure to light of said ultraviolet band and an amount of irradiated ultraviolet rays.

9. The ultraviolet ray measuring apparatus according to claim 8, wherein said converting means accumulates said computed light intensity for each lapse of a predetermined time and converts a resulting accumulated value into an index value associated with an reference MED value.

10. The ultraviolet ray measuring apparatus according to claim 1, wherein said apparatus further comprises pulse generating means for generating a clock pulse at a given period and counting means for counting said clock pulse from said pulse generating means, and said display means displays a count value counted by said counting means as a time or lap time.

11. The ultraviolet ray measuring apparatus according to claim 1, further comprising third optical filter means, arranged in front of said second optical filter means, for shielding only those ultraviolet rays in said ultraviolet band which have an intermediate and short wavelength of 315 nm or below, said first optical filter means comprising a filter for shielding all light of said ultraviolet band, whereby said apparatus measures those ultraviolet rays in said ultraviolet band which have a long wavelength longer than 315 nm.

12. The ultraviolet ray measuring apparatus according to claim 1, wherein said first optical filter means comprises a filter for shielding only those ultraviolet rays in said ultraviolet band which have an intermediate and short wavelength of 315 nm or below, whereby said apparatus measures those ultraviolet rays in said ultraviolet band which have an intermediate and short wavelength of 315 nm or below.

13. The ultraviolet ray measuring apparatus according to claim 1, wherein said arithmetic operation means includes gain control means for controlling gains of said first and second photoelectric converting means, spectral compensation coefficient curve is obtained in advance by multiplying a relative spectral sensitivity of said apparatus by a predetermined number so as to make light intensity of said ultraviolet band acquired from said apparatus coincide with an actual light intensity, whereby said gains are controlled by said gain control means in such a way that an output from said apparatus acquired by allowing calibration light of said ultraviolet band having a known light intensity and an arbitrary single wavelength to be irradiated on a side of said first photoelectric converting means becomes a value obtained by multiplying said light intensity of said calibration light by said spectral compensation coefficient which corresponds to said single wavelength of said calibration light.

14. The ultraviolet ray measuring apparatus according to claim 1, wherein said second optical filter means comprises an interference filter having a main transmitting band in said ultraviolet band and a sub-transmitting band in a region of a wavelength twice that of said main transmitting band, and at least one of a quartz diffusion plate and a quartz concave lens for evenly diffusing received light, whereby the spectral transmittance of the second optical filter means for light passing therethrough with respect to wavelength has a trapezoidal profile.

15. The ultraviolet ray measuring apparatus according to claim 1, wherein said first optical filter means comprises a resin layer coated on said second light-receiving face which permits close arrangement between said second optical filter means and said first and second light-receiving faces.

* * * * *